United States Patent
Ji et al.

(10) Patent No.: US 12,114,296 B2
(45) Date of Patent: Oct. 8, 2024

(54) METHOD AND APPARATUS FOR TRANSMITTING CONTROL INFORMATION FOR NETWORK COOPERATIVE COMMUNICATION

(71) Applicant: Samsung Electronics Co., Ltd., Suwon-si (KR)

(72) Inventors: Hyoungju Ji, Suwon-si (KR); Jinhyun Park, Suwon-si (KR); Hoondong Noh, Suwon-si (KR); Youngrok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 17/170,870

(22) Filed: Feb. 8, 2021

(65) Prior Publication Data

US 2021/0250944 A1 Aug. 12, 2021

(30) Foreign Application Priority Data

Feb. 7, 2020 (KR) ........................ 10-2020-0015085

(51) Int. Cl.
*H04W 72/0446* (2023.01)
*H04L 1/1812* (2023.01)
*H04L 5/00* (2006.01)
*H04W 72/21* (2023.01)
*H04W 72/23* (2023.01)

(52) U.S. Cl.
CPC ....... *H04W 72/0446* (2013.01); *H04L 1/1816* (2013.01); *H04L 5/0055* (2013.01); *H04W 72/21* (2023.01); *H04W 72/23* (2023.01)

(58) Field of Classification Search
CPC ........... H04W 72/0446; H04W 72/042; H04W 72/1278; H04W 72/046; H04L 1/1816; H04L 5/0055; H04L 1/08; H04L 1/1854; H04L 5/0094; H04L 5/0053; H04L 1/1812; H04L 5/0035; H04B 7/024; H04B 7/0617
See application file for complete search history.

(56) References Cited

U.S. PATENT DOCUMENTS 10,396,940 B1 * 8/2019 Nammi ................. H04L 5/0055
10,856,280 B2 * 12/2020 Noh ....................... H04W 76/27
(Continued)

FOREIGN PATENT DOCUMENTS

| EP | 2 637 344 A2 | 9/2013 |
| EP | 3 512 277 A1 | 7/2019 |
| WO | WO-2021142802 A1 * | 7/2021 |

OTHER PUBLICATIONS

International Search Report and Written Opinion of the International Searching Authority in connection with International Application No. PCT/KR2021/001613 issued Apr. 22, 2021, 7 pages.

(Continued)

*Primary Examiner* — Mounir Moutaouakil

(57) ABSTRACT

The disclosure relates to a communication technique and a system for fusing a 5G communication system with IoT technology to support a higher data rate after a 4G system. The disclosure can be applied to intelligent services (e.g., smart homes, smart buildings, smart cities, smart cars or connected cars, healthcare, digital education, retail business, security and safety-related services, etc.), based on 5G communication technology and IoT-related technology.

15 Claims, 28 Drawing Sheets

(56) References Cited

U.S. PATENT DOCUMENTS

| | | | |
|---|---|---|---|
| 11,265,044 B2* | 3/2022 | Jung | H04B 7/0695 |
| 2013/0230030 A1 | 9/2013 | Papasakellariou et al. | |
| 2019/0268929 A1* | 8/2019 | Lee | H04W 72/0446 |
| 2019/0334660 A1* | 10/2019 | Nammi | H04L 1/1812 |
| 2019/0373613 A1* | 12/2019 | Harada | H04W 72/0413 |
| 2020/0107331 A1* | 4/2020 | Tsai | H04B 7/088 |
| 2020/0163079 A1* | 5/2020 | Choi | H04B 7/0695 |
| 2020/0205150 A1* | 6/2020 | Cheng | H04W 72/0413 |
| 2020/0314722 A1* | 10/2020 | Kyung | H04W 36/305 |
| 2020/0383105 A1* | 12/2020 | Park | H04L 1/1896 |
| 2022/0053483 A1* | 2/2022 | Yoshioka | H04W 72/21 |
| 2023/0077264 A1* | 3/2023 | Gao | H04L 5/0098 |

OTHER PUBLICATIONS

Huawei et al., "Draft CR for 38.101-1: On/off mask", 3GPP TSG-RAN WG4 Meeting #91, R4-1907431, Reno, USA, May 13-17, 2019, 8 pages.

Skyworks Solutions, Inc., "RF Transient Times Requirements, Use Cases and Testability", 3GPP TSG-RAN WG4 Meeting 92, R4-1909940, Ljubljana, Slovenia, Aug. 26-30, 2019, 8 pages.

Qualcomm Incorporated, "Remaining Issues on DL/UL Scheduling, Processing Time and HARQ management", 3GPP TSG-RAN WG1 Meeting #92bis, R1-1804807, Sanya, China, Apr. 16-20, 2018, 12 pages.

Supplementary European Search Report dated Dec. 5, 2022, in connection with European Patent Application No. 21 75 0092, 10 pages.

* cited by examiner 11-05 ON-OFF transient time for FR1

11-10 ON-OFF transient time for FR2

12-05 Transient time, SRS sounded on the same antenna with PUSCH/PUCCH 12-10 Transient time, SRS sounded on the different antenna with PUSCH/PUCCH 12-15 Transient time between long and short subslots 12-20 Transient time between short subslots. Numerology < 60kHz 12-25 Transient time between short subslots. Numerology = 60kHz 13-05 Transient time, with PUSCH/PUCCH/SRS 13-10 Transient time between long and short subslots 13-15 Transient time between short subslots. Numerology < 120kHz 13-20 Transient time between short subslots. Numerology = 120kHz

METHOD AND APPARATUS FOR TRANSMITTING CONTROL INFORMATION FOR NETWORK COOPERATIVE COMMUNICATION

CROSS-REFERENCE TO RELATED APPLICATION

This application is based on and claims priority under 35 U.S.C. 119 to Korean Patent Application No. 10-2020-0015085 filed on Feb. 7, 2020 in the Korean Intellectual Property Office, the disclosure of which is herein incorporated by reference in its entirety.

BACKGROUND

1. Field

The disclosure relates to a wireless communication system and, more specifically, to a method and an apparatus wherein a terminal transmits control information to multiple transmission points/panels/beams for the purpose of cooperative communication between multiple transmission points/panels/beams.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 gigahertz (GHz) bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

The above information is presented as background information only to assist with an understanding of the disclosure. No determination has been made, and no assertion is made, as to whether any of the above might be applicable as prior art with regard to the disclosure.

SUMMARY

The disclosure provides a method wherein a terminal transmits control information to multiple transmission points/panels/beams for the purpose of network coordination in a wireless communication system.

The disclosure for solving the above problems provides a method performed by a terminal in a communication system, the method including: receiving, from a base station, information on a physical uplink control channel (PUCCH) and information on a physical downlink shared channel (PDSCH); receiving, from the base station, downlink control information (DCI) including resource allocation information; receiving, from the base station, data on a resource determined based on the information on the PDSCH and the resource allocation information; identifying a PUCCH resource for transmitting hybrid automatic repeat request acknowledge (HARQ ACK) information based on the information on the PUCCH; and transmitting, to the terminal, the HARQ ACK information repeatedly, based on offset information included in the information on the PUCCH, in case that a symbol length of the PUCCH resource is equal to or less than 2 and repetitive transmission is configured for at least one transmission and reception point (TRP) for the PUCCH resource. In addition, the method of the terminal in the disclosure may further include transmitting terminal capability information including whether the terminal supports the repetitive transmission to the base station.

In addition, the disclosure for solving the above problems provides a method performed by a base station in a communication system, the method including: transmitting, to a terminal, information on a physical uplink control channel (PUCCH) and information on a physical downlink shared channel (PDSCH); transmitting, to the terminal, downlink control information (DCI) including resource allocation information; transmitting, to the terminal, data on a resource determined based on the information on the PDSCH and the resource allocation information; and receiving, from the terminal, hybrid automatic repeat request acknowledge (HARQ ACK) information on a PUCCH resource determined based on the information on the PUCCH, wherein, in case that a symbol length of the PUCCH resource is equal to or less than 2 and repetitive transmission is configured for at least one transmission and reception point (TRP) for the PUCCH resource, the HARQ ACK information is transmitted repeatedly, based on offset information included in the information on the PUCCH. In addition, the method of the base station in the disclosure may further include receiving terminal capability information including whether the terminal supports the repetitive transmission from the terminal.

In addition, the disclosure for solving the above problems provides a terminal in a communication system, the terminal including a transceiver; and a controller coupled to the transceiver and configured to: receive, from a base station, information on a physical uplink control channel (PUCCH) and information on a physical downlink shared channel (PDSCH) from; receive, from the base station, downlink control information (DCI) including resource allocation information; receive, from the base station, data on a resource determined based on the information on the PDSCH and the resource allocation information; identify a PUCCH resource for transmitting hybrid automatic repeat request acknowledge (HARQ ACK) information based on the information on the PUCCH; and transmit, to the terminal, the HARQ ACK information repeatedly, based on offset information included in the information on the PUCCH, in case that a symbol length of the PUCCH resource is equal to or less than 2 and repetitive transmission is configured for at least one transmission and reception point (TRP) for the PUCCH resource. In addition, the controller of the terminal in the disclosure may transmit terminal capability information including whether the terminal supports the repetitive transmission to the base station.

In addition, the disclosure for solving the above problems provides a base station in a communication system, the base station including a transceiver; and a controller coupled to the transceiver and configured to: transmit, to a terminal, information on a physical uplink control channel (PUCCH) and information on a physical downlink shared channel (PDSCH); transmit, to the terminal, downlink control information (DCI) including resource allocation information; transmit, to the terminal, data on a resource determined based on the information on the PDSCH and the resource allocation information; and receive, from the terminal, hybrid automatic repeat request acknowledge (HARQ ACK) information on a PUCCH resource determined based on the information on the PUCCH, wherein, in case that a symbol length of the PUCCH resource is equal to or less than 2 and repetitive transmission is configured for at least one transmission and reception point (TRP) for the PUCCH resource, the HARQ ACK information is transmitted repeatedly, based on offset information included in the information on the PUCCH. In addition, the controller of the base station in the disclosure may receive terminal capability information including whether the terminal supports the repetitive transmission from the terminal.

The disclosure is advantageous in that, when network coordination is used is a wireless communication system, a terminal transmits control information to respective transmission points/panels/beams such that the reliability can be improved compared with a case in which control information is transmitted to a single transmission point/panel/beam.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
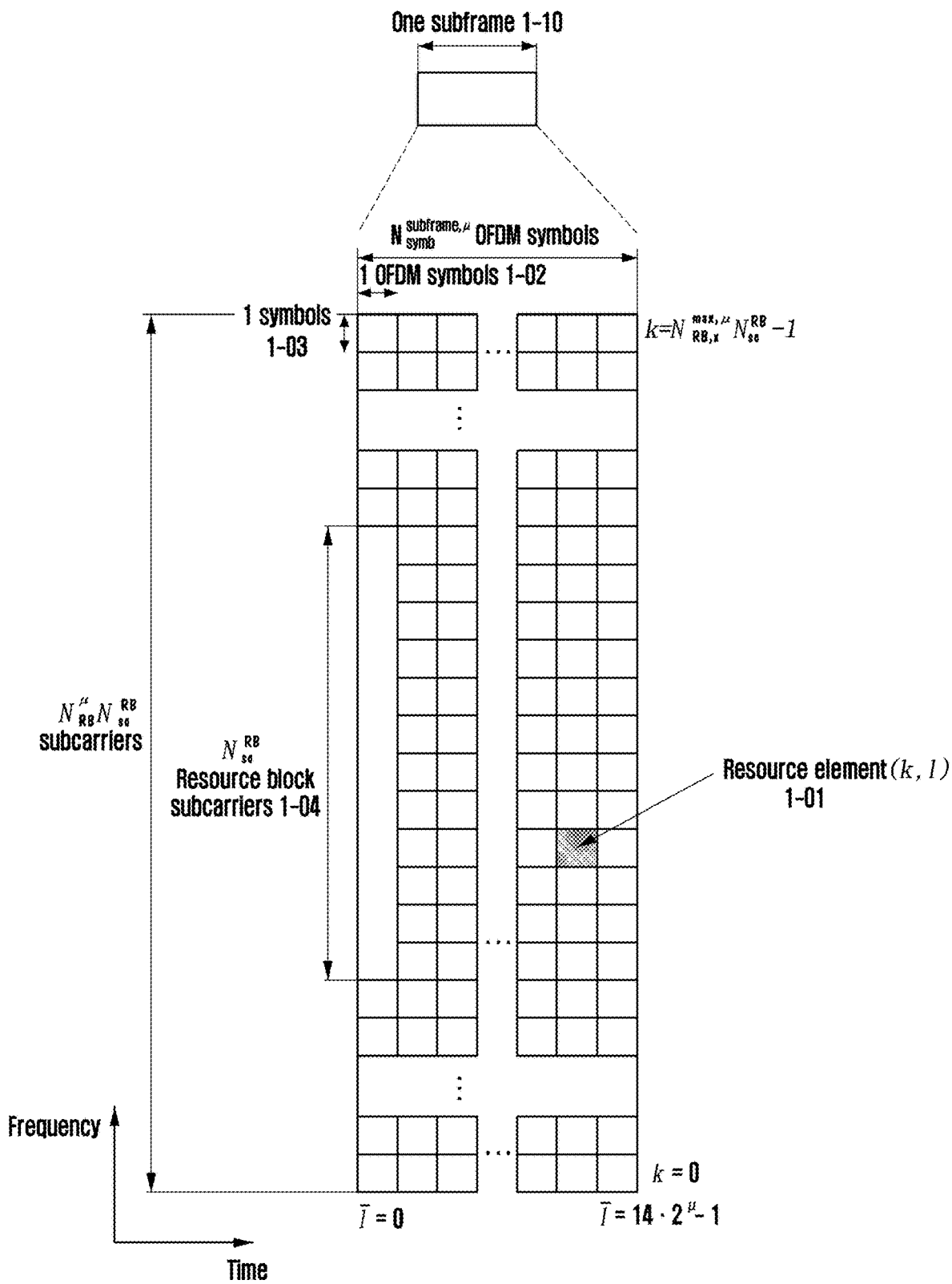
FIG. 1 is a view of a basic structure of a time-frequency domain of a mobile communication system according to an embodiment.

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Examples of the base station and the terminal are not limited thereto. In the following description of the disclosure, a technology for receiving broadcast information from a base station by a terminal in a wireless communication system will be described. The disclosure relates to a communication technique for converging IoT technologies with a 5G communication system designed to support a higher data transfer rate beyond the 4G system, and a system therefor. The disclosure may be applied to intelligent services (e.g., smart homes, smart buildings, smart cities, smart cars or connected cars, healthcare, digital education, retail business, security and safety-related services, etc.) on the basis of 5G communication technologies and IoT-related technologies.

In the following description, terms referring to broadcast information, terms referring to control information, terms related to communication coverage, terms referring to state changes (e.g., event), terms referring to network entities, terms referring to messages, terms referring to device elements, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards.

Wireless communication systems are evolving from the initial voice-oriented service to a broadband wireless communication system that provides high-speed and high-quality packet data services such as high speed packet access (HSPA) of 3GPP, long term evolution (LTE) or evolved universal terrestrial radio access (E-UTRA), LTE-Advanced (LTE-A), LTE-Pro, high rate packet data (HRPD) of 3GPP2, ultra-mobile broadband (UMB), and IEEE 802.16e communication standards.

In the LTE system, as a representative example of a broadband wireless communication system, an orthogonal frequency division multiplexing (OFDM) scheme is employed in a downlink (DL), and a single carrier frequency division multiple access (SC-FDMA) scheme is employed in an uplink (UL). Uplink refers to a radio link through which a terminal (user equipment: UE) or mobile station (MS) transmits data or control signals to a base station (eNode B or base station (BS)), and downlink refers to a radio link through which a base station transmits data or control signals to a terminal. The multiple access method as described above divides the data or control information of each user by assigning and operating time-frequency resources to carry data or control information for each user so that they do not overlap with each other, that is, orthogonality is established.

A future communication system after the LTE system, that is, a 5G communication system, has to be able to freely reflect various requirements such as users and service providers, so that services satisfying various requirements should be supported. Services considered for the 5G communication system include enhanced mobile broad band (eMBB), massive machine type communication (mMTC), and ultra-reliability low latency communication (URLLC), etc.

According to some embodiments, the eMBB aims to provide a more improved data transmission rate than the data transmission rate supported by the existing LTE, LTE-A, or LTE-Pro. For example, in a 5G communication system, the eMBB should be able to provide a maximum transmission rate of 20 gigabits per second (Gbps) in downlink and 10 Gbps in uplink from the viewpoint of one base station. At the same time, it is necessary to provide an increased user perceived data rate of the terminal. In order to satisfy these requirements, it is required to improve transmission and reception technologies, including a more advanced multi-input multi-output (MIMO) transmission technology. In addition, by using a frequency bandwidth wider than 20 MHz in a frequency band of 3 to 6 GHz or 6 GHz or higher instead of the 2 GHz band used by the current LTE, the data transmission speed required by the 5G communication system can be satisfied.

At the same time, the mMTC has been considered to support application services such as internet of thing (IoT) in 5G communication systems. In order to efficiently provide the Internet of Things, the mMTC may require large-scale terminal access support within a cell, improved terminal coverage, improved battery time, and reduced terminal cost. The IoT is attached to various sensors and various devices to provide communication functions, so the IoT should be able to support a large number of terminals (e.g., 1,000,000 terminals/square kilometer ($km^2$)) within a cell. In addition, because the terminal supporting mMTC is highly likely to be located in a shaded area not covered by the cell, such as the basement of a building due to the characteristics of the service, the terminal supporting mMTC may require wider coverage than other services provided by the 5G communication system. The terminal supporting mMTC should be configured as a low-cost terminal, and since it is difficult to frequently exchange the battery of the terminal, a very long battery lifetime may be required.

Finally, in the case of URLLC, which id a cellular-based wireless communication service used for a specific purpose (mission-critical), the URLLC has to provide communication with ultra-low latency and ultra-reliability as a service used for remote control of robots or machinery, industrial automation, and as unmanned aerial vehicles, remote health care, emergency alerts, etc. For example, a service supporting URLLC should satisfy an air interface latency of less than 0.5 milliseconds, and at the same time have a requirement of a packet error rate of $10^{-5}$ or less. Therefore, for a service supporting URLLC, a 5G system should provide a smaller transmit time interval (TTI) than other services, and at the same time, a design requirement to allocate a wide resource in a frequency band is required. However, the above-described mMTC, URLLC, and eMBB are only examples of different service types, and service types to which the disclosure is applied are not limited to the above-described example.

Services considered in the above-described 5G communication system should be provided by fusion with each other based on one framework. That is, for efficient resource management and control, it is preferable that each service is integrated into one system, controlled and transmitted rather than independently operated.

In addition, although an embodiment of the disclosure will be described below as an example of an LTE, LTE-A, LTE Pro, or NR system, the embodiment of the disclosure may be applied to other communication systems having a similar technical background or channel type. In addition, the embodiments may be applied to other communication systems through some modifications without significantly departing from the scope of the disclosure, as determined by a person having skilled technical knowledge.

The disclosure relates to a method and apparatus for reporting channel state information for enhancing power saving efficiency of a terminal in a wireless communication system.

According to the disclosure, when a terminal operates in a power saving mode in a wireless communication system, a power saving effect may be further improved by optimizing a method for reporting channel state information accordingly.

Hereinafter, the frame structure of the 5G system will be described in more detail with reference to the figures.

FIG. 1 is a view illustrating a basic structure of a time-frequency domain of a mobile communication system according to an embodiment.

Referring to FIG. 1, the horizontal axis represents the time domain and the vertical axis represents the frequency domain. The basic units of a resource in the time and frequency domains are resource element (RE) 1-01, 1 orthogonal frequency division multiplexing (OFDM) symbol 1-02 on the time axis and 1 subcarrier on the frequency axis 1-03 may be defined. In the frequency domain, $N_{sc}^{RB}$ (e.g., 12) consecutive REs may constitute one resource block (RB) 1-04. In an embodiment, a plurality of OFDM symbols may constitute one subframe 1-10.

Figure 2:
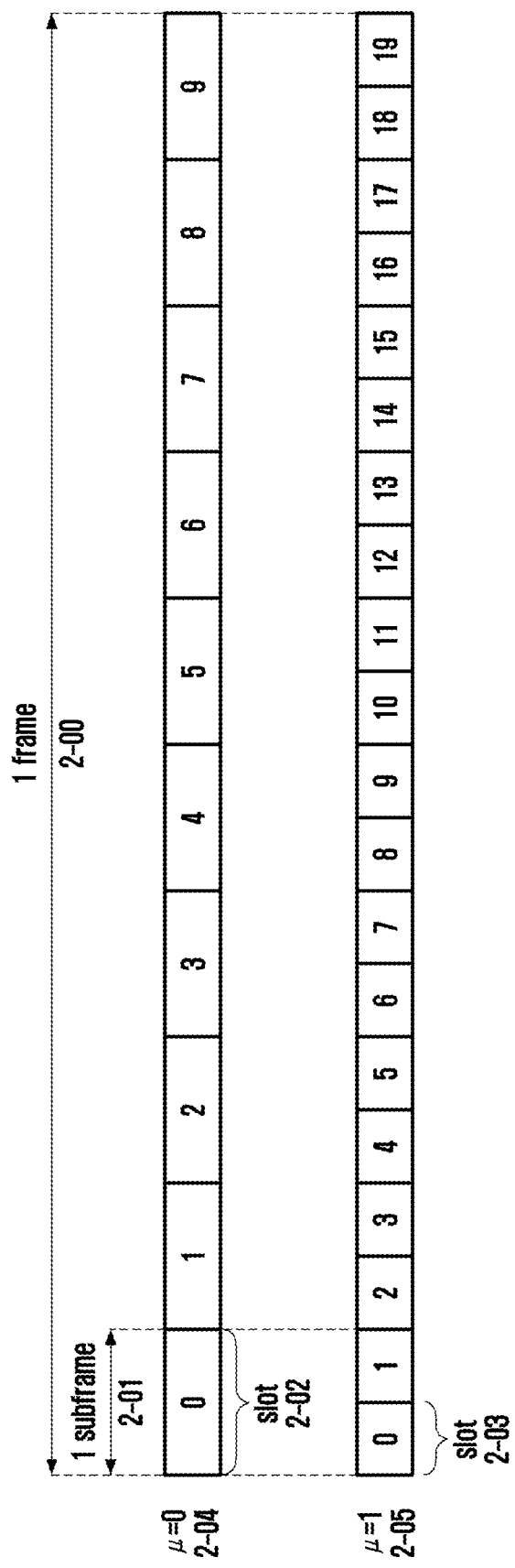
FIG. 2 is a view illustrating structures of a frame, subframes, and slots of a mobile communication system according to an embodiment.

FIG. 2 is a view illustrating structures of a frame, subframes, and slots of a mobile communication system according to an embodiment.

Referring to FIG. 2, one frame 2-00 may be composed of one or more subframes 2-01, and one subframe may be composed of one or more slots 2-02. For example, one frame 2-00 may be defined as 10 milliseconds (ms). One subframe 2-01 may be defined as 1 ms, and in this case, one frame 2-00 may be composed of a total of 10 subframes 2-01. One slot 2-02 or 2-03 may be defined as 14 OFDM symbols (i.e., the number of symbols per slot ($N_{symb}^{slot}$)=14). One subframe 2-01 may be composed of one or a plurality of slots 2-02 and 2-03, and the number of slots 2-02 and 2-03 per subframe 2-01 may differ according to the setting value 2-04, 2-05 for the subcarrier spacing.

In the example of FIG. 2, a case of μ=0 (2-04) and a case of =1 (2-05) as subcarrier spacing setting values are illustrated. When μ=0 (2-04), 1 subframe 2-01 may be composed of one slot 2-02, and when μ=1 (2-05), 1 subframe 2-01 may be composed of two slots 2-03. That is, the number of slots per subframe $N_{slot}^{subframe,\mu}$ may vary according to the setting value for slot the subcarrier spacing, and accordingly, the number of slots per frame $N_{slot}^{frame,\mu}$ may vary. According to each subcarrier spacing setting value, $N_{slot}^{subframe,\mu}$ and $N_{slot}^{subframe,\mu}$ may be defined as shown in [Table 1] below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the NR system, one component carrier (CC) or serving cell may be composed of up to 250 or more RBs. Therefore, when the terminal always receives the entire serving cell bandwidth like LTE, the power consumption of the terminal can be extreme, and to solve this, the base station configures one or more bandwidth parts (BWP) to the terminal. Thus, it is possible to support the terminal to change the reception area within the cell. In the NR, the base station may set the 'initial BWP', which is the bandwidth of CORESET #0 (or common search space (CSS)), to the terminal through the MIB. Thereafter, the base station may set an initial BWP (first BWP) of the terminal through RRC signaling, and may notify at least one or more BWP configuration information that may be indicated through downlink control information (DCI) in the future. Thereafter, the base station may indicate which band the terminal will use by notifying the BWP ID through DCI. If the terminal does not receive DCI in the currently allocated BWP for more than a specific time, the terminal returns to the 'default BWP' and attempts DCI reception.

Figure 3:
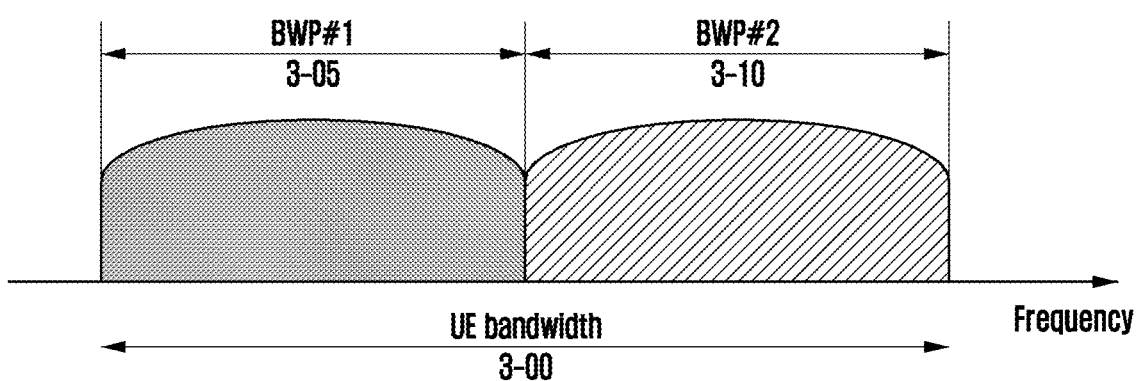
FIG. 3 is a view illustrating an example of a configuration of a bandwidth part (BWP) in a wireless communication system according to an embodiment.

FIG. 3 is a view illustrating an example of a configuration of a bandwidth part (BWP) in a wireless communication system according to an embodiment.

Referring to FIG. 3, FIG. 3 illustrates an example in which the terminal bandwidth 3-00 is configured as two bandwidth portions, that is, bandwidth portion #1 3-05 and bandwidth portion #2 3-10. The base station may set one or a plurality of bandwidth portions to the terminal, and may set information as shown in [Table 2] below for each bandwidth portion.

TABLE 2

| | |
|---|---|
| BWP ::= | SEQUENCE |
| bwp-Id | BWP-Id |
| locationAndBandwidth | INTEGER (1..65536) |
| subcarrierSpacing | ENUMERATED {n0, n1, n2, n3, n4, n5} |
| cyclicPrefix | ENUMERATED {extended} |
| } | |

It is not limited to the above-described example, and various parameters related to the bandwidth portion may be configured to the terminal in addition to the above-described configuration information. The above-described information may be delivered from the base station to the terminal through higher layer signaling, for example, RRC signaling. At least one bandwidth portion among the set one or a plurality of bandwidth portions may be activated. Whether to activate the configured bandwidth portion may be transmitted from the base station to the terminal in a semi-static manner through RRC signaling, or may be dynamically transmitted through a MAC control element (CE) or DCI.

According to an embodiment, a terminal before a radio resource control (RRC) connection may receive an initial bandwidth part (BWP) for initial access from a base station through a master information block (MIB). More specifically, in order to receive system information (may correspond to remaining system information (RMSI) or system information block 1 (SIB1)) required for initial access through the MIB in the initial access step, the terminal may receive setting information on a control region (control resource set (CORESET)) in which the PDCCH can be transmitted and a search space. The control region and the search space set as the MIB may be regarded as identifiers (IDs) 0, respectively.

The base station may notify the terminal of configuration information such as frequency allocation information, time allocation information, and numerology for control region #0 through the MIB. In addition, the base station may notify the terminal of the setting information for the monitoring period and occasion for the control region #0, that is, the setting information for the search space #0 through the MIB. The terminal may consider the frequency domain configured to control region #0 obtained from the MIB as an initial bandwidth part for initial access. In this case, the identifier (ID) of the initial bandwidth part may be regarded as 0.

Configuring of the bandwidth part supported by the above-described next-generation mobile communication system (5G or NR system) may be used for various purposes.

For example, when the bandwidth supported by the terminal is smaller than the system bandwidth, the bandwidth supported by the terminal may be supported through the setting of the bandwidth portion. For example, in Table 2, the frequency position of the bandwidth portion (configuration information 2) is configured to the terminal, so that the terminal can transmit and receive data at a specific frequency position within the system bandwidth.

As another example, for the purpose of supporting different neurology, the base station may set a plurality of bandwidth portions to the terminal. For example, in order to support both transmission and reception of data using a subcarrier spacing of 15 kilohertz (kHz) and a subcarrier spacing of 30 kHz to an arbitrary terminal, two bandwidth portions may be configured to use subcarrier spacings of 15 kHz and 30 kHz, respectively. Different bandwidth portions may be frequency division multiplexed (FDM), and when data is transmitted/received at a specific subcarrier spacing, a bandwidth part set at the corresponding subcarrier spacing may be activated.

As another example, for the purpose of reducing power consumption of the terminal, the base station may set a bandwidth portion having a different size of bandwidth to the terminal. For example, if the terminal supports a very large bandwidth, such as 100 MHz, and always transmits and receives data through the corresponding bandwidth, very large power consumption may occur. In particular, it is very inefficient in terms of power consumption for the terminal to monitor an unnecessary downlink control channel for a large bandwidth of 100 MHz in a situation where there is no traffic. Therefore, for the purpose of reducing the power consumption of the terminal, the base station may set a bandwidth part of a relatively small bandwidth to the terminal, for example, a bandwidth part of 20 megahertz (MHz). In a situation where there is no traffic, the terminal may perform a monitoring operation in the 20 MHz bandwidth part, and when data is generated, the terminal may transmit and receive data using the 100 MHz bandwidth part according to the instruction of the base station.

In the above-described method of configuring the bandwidth part, terminals before RRC connection may receive configuration information on an initial bandwidth part through a master information block (MIB) in an initial access step. More specifically, the terminal may be configured with a control resource set (CORESET) for a downlink control channel through which DCI scheduling a system information block (SIB) can be transmitted from the MIB of the physical broadcast channel (PBCH). The bandwidth of the control region set as the MIB may be regarded as the initial bandwidth part, and the terminal may receive the PDSCH through which the SIB is transmitted through the set initial bandwidth part. In addition to the use of receiving the SIB, the initial bandwidth part may be used for other system information (OSI), paging, and random access.

Hereinafter, a synchronization signal (SS)/PBCH block of a next-generation mobile communication system (5G or NR system) will be described.

The SS/PBCH block may refer to a physical layer channel block composed of a primary SS (PSS), a secondary SS (SSS), and a PBCH. More specifically, the SS/PBCH block may be defined as follows.

PSS: The PSS is a signal that serves as a reference for downlink time/frequency synchronization and may provide some information of the cell ID.

SSS: The SSS is a reference for downlink time/frequency synchronization, and the remaining cell ID information not provided by the PSS can be provided. Additionally, the SSS may serve as a reference signal for demodulation of the PBCH.

PBCH: The PBCH may provide essential system information required for transmission and reception of the data channel and control channel of the terminal. The essential system information may include search space-related control information indicating radio resource mapping information of the control channel, scheduling control information for a separate data channel for transmitting system information, and the like.

SS/PBCH block: The SS/PBCH block may be composed of a combination of PSS, SSS and PBCH. One or more SS/PBCH blocks may be transmitted within 5 ms time, and each transmitted SS/PBCH block may be distinguished by an index.

The terminal may detect the PSS and SSS in the initial access phase and may decode the PBCH. The terminal may obtain the MIB from the PBCH, and may receive the control region #0 set through the MIB. The terminal may perform monitoring on the control region #0 assuming that the selected SS/PBCH block and the demodulation reference signal (DMRS) transmitted in the control region #0 are quasi co location (QCL). The terminal may receive system information from the downlink control information transmitted in control region #0. The terminal may obtain configuration information related to a random access channel (RACH) required for initial access from the received system information. The terminal may transmit physical RACH (PRACH) to the base station in consideration of the selected SS/PBCH index, and the base station receiving the PRACH may obtain information on the SS/PBCH block index selected by the terminal. The base station monitors the control region #0 corresponding to (or associated with) the SS/PBCH block selected by the terminal and a block selected from the SS/PBCH blocks by the terminal.

Hereinafter, downlink control information (hereinafter, referred to as "DCI") in a next-generation mobile communication system (5G or NR system) will be described in detail.

The scheduling information for uplink data (or physical uplink shared channel (PUSCH)) or downlink data (or physical downlink data channel (PDSCH)) in a next-generation mobile communication system (5G or NR system) may be delivered from the base station to the terminal through DCI. The terminal may monitor a DCI format for fallback and a DCI format for non-fallback for PUSCH or PDSCH. The fallback DCI format may be composed of a fixed field that is predetermined between the base station and the terminal, and the DCI format for non-fallback may include a configurable field.

The DCI may be transmitted through a physical downlink control channel (PDCCH) through a channel coding and modulation process. A cyclic redundancy check (CRC) may be attached to the DCI message payload, and the CRC may be scrambling with a radio network temporary identifier (RNTI) corresponding to the identity of the terminal. Different RNTIs according to the purpose of the DCI message, for example, UE-specific data transmission, a power control command, or a random access response, may be used for scrambling of the CRC attached to the payload of the DCI message. That is, the RNTI is not explicitly transmitted, but may be included in the CRC calculation process and transmitted. When a DCI message transmitted on the PDCCH is received, the terminal may check the CRC using the allocated RNTI. If the CRC check result is correct, the terminal may know that the message has been transmitted to the terminal.

For example, the DCI scheduling a PDSCH for system information (SI) may be scrambled with SI-RNTI. The DCI scheduling the PDSCH for the random access response (RAR) message may be scrambled with RA-RNTI. The DCI scheduling the PDSCH for the paging message may be scrambled with P-RNTI. The DCI notifying the slot format indicator (SFI) may be scrambled with SFI-RNTI. The DCI notifying transmit power control (TPC) may be scrambled with TPC-RNTI. The DCI scheduling the terminal-specific PDSCH or PUSCH may be scrambled with a cell RNTI (C-RNTI).

DCI format 0_0 may be used as a fallback DCI for scheduling PUSCH, and in this case, CRC may be scrambled with C-RNTI. In an embodiment, the DCI format 0_0 in which CRC is scrambled with C-RNTI may include information as illustrated in Table 3.

TABLE 3

- Identifier for DCI formats - [1] bit
- Frequency domain resource assignment -[⌈log$_2$ (N$_{RB}^{UL,BWP}$ (N$_{RB}^{UL,BWP}$ +1 / 2) ⌉ ]bits
- Time domain resource assignment - X bits
- Frequency hopping flag - 1 bit
- Modulation and coding scheme - 5 bits
- New data indicator - 1 bit
- Redundancy version - 2 bits
- HARQ process number - 4 bits
- TPC command for scheduled PUSCH - [2] bits
- UL/SUL indicator - 0 or 1 bit DCI format 0_1 may be use as a non-fallback DCI or scheduling PUSCH, an in this case, the CRC may be scrambled with C-RNTI. In an embodiment, the DCI format 0_1 in which CRC is scrambled with C-RNTI may include information as shown in Table 4.

TABLE 4

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
    For resource allocation type 0, ⌈N$_{RB}^{UL,BWP}$/P⌉ bits
    For resource allocation type 1, ⌈log$_2$(N$_{RB}^{UL,BWP}$(N$_{RB}^{UL,BWP}$ + 1)/2⌉ bits
Time domain resource assignment - 1, 2, 3, or 4 bits
VRB-to-PRB mapping (virtual resource block-to- physical resource block TABLE 4-continued mapping) - 0 or 1 bit, only for resource allocation type 1.
    0 bit if only resource allocation type 0 is configured;
    1 bit otherwise.
Frequency hopping flag - 0 or 1 bit, only for resource allocation type 1.
    0 bit if only resource allocaiton type 0 is configured;
    1 bit otherwise.
Modulation and coding scheme - 5 bits
New data indicator - 1 bit
Redundancy version - 2 bits
HARQ process number - 4 bits
1st downlink assignment index - 1 or 2 bits
    1 bit for semi-static HARQ-ACK codebook;
    2 bits for dynamic HARQ-ACK codebook with single HARQ-ACK
    codebook.
2nd downlink assignment index - 0 or 2 bits
    2 bits for dynamic HARQ-ACK codebook with two HARQ-ACK
    sub-codebooks;
    0 bit otherwise.
TPC command for scheduled PUSCH - 2 bits SRS resource indicator - $\left\lceil \log_2 \left( \sum_{k=1}^{L_{max}} \binom{N_{SRS}}{k} \right) \right\rceil$ or $\lceil \log_2(N_{SRS}) \rceil$ bits $\left\lceil \log_2 \left( \sum_{k=1}^{L_{max}} \binom{N_{SRS}}{k} \right) \right\rceil$ bits for non-codebook based PUSCH transmission;
$\lceil \log_2(N_{SRS}) \rceil$ bits for codebook based PUSCH transmission.
Precoding information and number of layers-up to 6 bits
Antenna ports - up to 5 bits
SRS request - 2 bits
CSI request - 0, 1, 2, 3, 4, 5, or 6 bits
CBG transmission information - 0, 2, 4, 6, or 8 bits
PTRS-DMRS association - 0 or 2 bits
beta_offset indicator - 0 or 2 bits
DMRS sequence initialization - 0 or 1 bit DCI format 1_0 may be used as a fallback DCI for scheduling the PDSCH, and in this case, the CRC may be scrambled with C-RNTI. In an embodiment, the DCI format 1_0 in which CRC is scrambled with C-RNTI may include information as illustrated in Table 5.

TABLE 5

- Identifier for DCI formats - [1] bit
- Frequency domain resource assignment -$\lceil \log_2 (N_{RB}^{DL,BWP} (N_{RB}^{DL,BWP} +1) / 2) \rceil$ bits
- Time domain resource assignment - X bits
- VRB-to-PRB mapping - 1 bit
- Modulation and coding scheme - 5 bits
- New data indicator - 1 bit
- Redundancy version - 2 bits
- HARQ process number - 4 bits
- Downlink assignment index - 2 bits
- TPC command for scheduled PUSCH - [2] bits
- PUCCH resource indicator - 3 bits
- PDSCH-to-HARQ feedback timing indicator - [3] bits Alternatively, DCI format 1_0 may be used as a DCI for scheduling a PDSCH for an RAR message, and in this case, the CRC may be scrambled with RA-RNTI. DCI format 1_0 in which CRC is scrambled with C-RNTI may include information as illustrated in Table 6.

TABLE 6

| | |
|---|---|
| - | Frequency domain resource assignment - $\lceil \log_2 (N_{RB}^{DL,BWP} (N_{RB}^{DL,BWP} + 1) / 2) \rceil$ bits |
| - | Time domain resource assignment - 4 bits |
| - | VRB-to-PRB mapping - 1 bit |

TABLE 6-continued

| | |
|---|---|
| - | Modulation and coding scheme - 5 bits |
| - | TB scaling - 2 bits |
| - | Reserved bits - 16 bits |

DCI format 1_1 may be used as a non-fallback DCI for scheduling a PDSCH, and in this case, the CRC may be scrambled with C-RNTI. In an embodiment, the DCI format 1_1 in which CRC is scrambled with C-RNTI may include information as shown in Table 7.

TABLE 7

Figure 4:
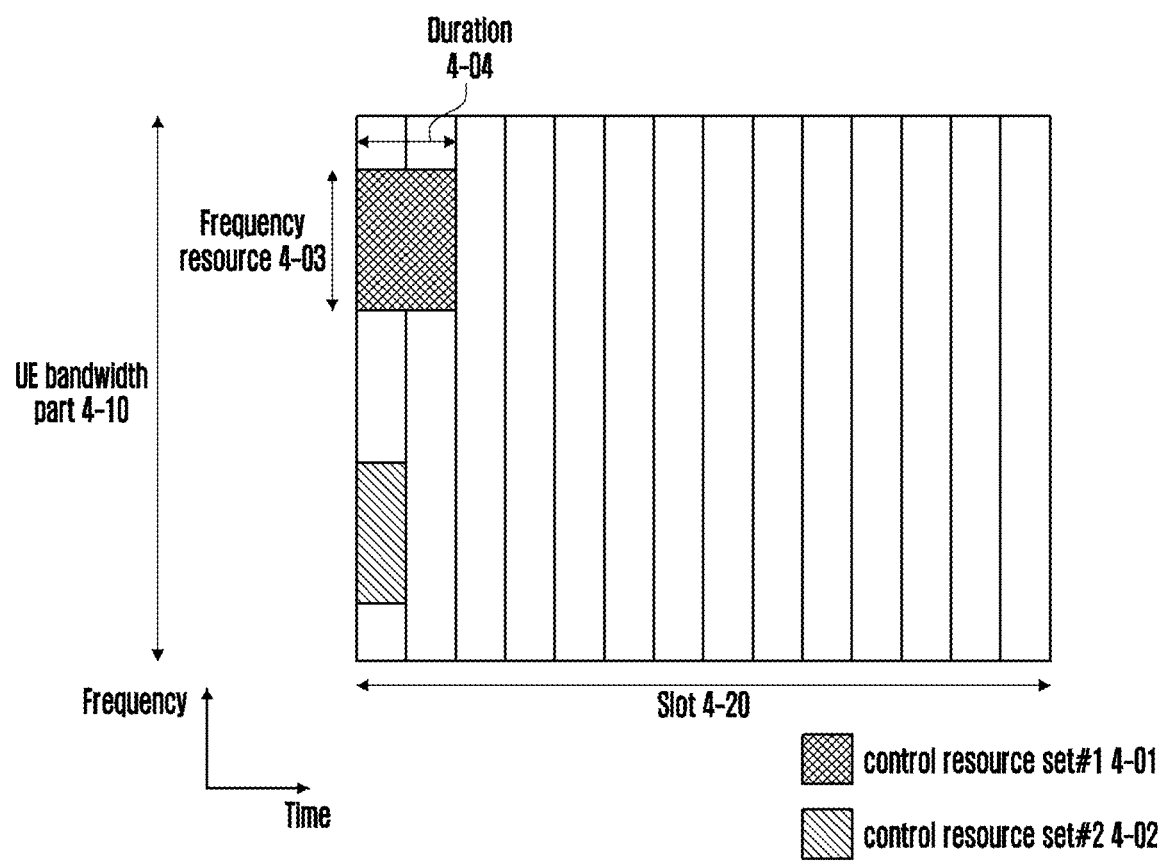
FIG. 4 is a view illustrating an example of configuring a control region of a downlink control channel in a wireless communication system according to an embodiment.

Carrier indicator - 0 or 3 bits
Identifier for DCI formats – [1] bit
Bandwidth part indicator – 0, 1 or 2 bits
Frequency domain resource assignment
    For resource allocation type 0, $\lceil N_{RB}^{DL,BWP} / P \rceil$ bits
    For resource allocation type 1, $\lceil \log_2(N_{RB}^{DL,BWP}(N_{RB}^{DL,BWP}+1)/2) \rceil$ bits
Time domain resource assignment –1, 2, 3, or 4 bits
VRB-to-PRB mapping – 0 or 1 bit, only for resource allocation type 1
    0 bit if only resource allocation type 0 is configured:
    1 bit otherwise
PRB bundling size indicator – 0 or 1 bit
Rate matching indicator – 0, 1, or 2 bits
ZP CSI-RS trigger – 0, 1, or 2 bits
For transport block 1:
Modulation and coding scheme – 5 bits
New data indicator – 1 bit
Redundancy version - 2 bits
For transport block 2:
Modulation and coding scheme – 5 bits
New data indicator – 1 bit
Redundancy version - 2 bits
HARQ process number – 4 bits
Downlink assignment index – 0 or 2 or 4 bits
TPC command for scheduled PUSCH – 2 bits
PUCCH resource indicator – 3 bits
PDSCH-to-HARQ feedback timing indicator – 3 bits
Antenna ports - 4, 5, or 6 bits
Transmission configuration indication – 0 or 3 bits
SRS request – 2 bits
CBG transmission information – 0, 2, 4, 6, or 8 bits
CBG flushing out information – 0 or 1 bit
DMRS sequence initialization – 1 bit FIG. 4 is a view illustrating setting a control region of a downlink control channel in a wireless communication system according to an embodiment. That is, FIG. 4 is a view illustrating an embodiment of a control resource set (CORESET) in which a downlink control channel is transmitted in a 5G wireless communication system according to an embodiment.

Referring to FIG. 4, FIG. 4 illustrates an embodiment in which The UE bandwidth part 4-10 on the frequency axis and two control areas (control area #1 4-01, control area #2 4-02 within 1 slot 4-20 on the time axis) is configured. The control regions 4-01 and 4-02 may be configured in a specific frequency resource 4-03 within the entire terminal bandwidth part 4-10 on the frequency axis. The control regions 4-01 and 4-02 may be configured as one or a plurality of OFDM symbols on the time axis, which may be defined as a control resource set duration 4-04. Referring to FIG. 4, control area #1 4-01 may be configured to a control region length of 2 symbols, and control area #2 4-02 may be configured to a control region length of 1 symbol.

The control region in the next-generation mobile communication system (5G or NR system) can be configured by the base station performing higher layer signaling (e.g., system information, master information block (MIB), radio resource control (RRC) signaling) to the terminal. Setting a control region to a terminal refers to providing information such as a control region identifier, a frequency position of the control region, and a symbol length of the control region. For example, the setting of the control region may include information as illustrated in Table 8.

TABLE 8

```
ControlResourceSet ::=                         SEQUENCE {
    -- Corresponds to L1 parameter 'CORESET-ID'
    controlResourceSetId                       ControlResourceSetId,
    frequencyDomainResources                   BIT STRING (SIZE (45)),
    duration                                   INTEGER (1..maxCoReSetDuration),
    cce-REG-MappingType                        CHOICE {
        interleaved                            SEQUENCE {
            reg-BundleSize                     ENUMERATED {n2, n3, n6},
            precoderGranularity                ENUMERATED
{sameAsREG-bundle, allContiguousRBs},
            interleaverSize                    ENUMERATED {n2, n3, n6}
            shiftIndex
                INTEGER(0..maxNrofPhysicalResourceBlocks-1)
        },
        nonInterleaved                         NULL
    },
    tci-StatesPDCCH                            SEQUENCE(SIZE
(1..maxNrofTCI-StatesPDCCH)) OF TCI-StateId       OPTIONAL,
    tci-PresentInDCI                           ENUMERATED { enabled }
}
```

In Table 8, tci-StatesPDCCH (hereinafter, referred to as "TCI state") configuration information may include information on one or more synchronization signal (SSs)/physical broadcast channel (PBCH) block indexes or channel state information reference signal (CSI-RS) indexes in a QCL relationship with the DMRS transmitted in the corresponding control region.

In a wireless communication system, one or more different antenna ports (alternatively, it is possible to be replaced by one or more channels, signals, and combinations thereof, but in the disclosure, different antenna ports are collectively referred to as different antenna ports) may be associated with each other by QCL configuration as illustrated in Table 9.

TABLE 9

```
QCL-Info ::=              SEQUENCE
    cell                  ServiceCellIndex (Serving cell index to which QCL reference
RS is transmitted)
    bwp-Id                BWP-Id (Index of bandwidth part to which QCL reference RS
is transmitted)
    referenceSignal       CHOICE { (Indicator indicating one of CSI-RS or SS/PBCH
block to QCL reference RS)
        csi-rs                NZP-CSI-RS-ResourceId,
        ssb                   SSB-Index
    },
    qcl-Type              ENUMERATED {typeA, typeB, typeC, typeD}, (QCL type
indicator)
    ...
}
```

Specifically, in the QCL configuration, two different antenna ports may be connected in a relationship of a (QCL) target antenna port and a (QCL) reference antenna port, and the terminal may apply (or assume) all or part of the statistical characteristics (e.g., a large scale parameter of a channel such as Doppler shift, Doppler spread, average delay, delay spread, average gain, spatial Rx (or Tx) parameter, or a reception spatial filter coefficient or a transmission spatial filter coefficient of the terminal) of the channel measured at the reference antenna port when receiving the target antenna port. In the above, the target antenna port refers to an antenna port for transmitting a channel or signal configured by a higher layer setting including the QCL setting, or a channel or an antenna port for transmitting a signal to which the TCI state indicating the QCL setting is applied. The reference antenna port above refers to an antenna port for transmitting a channel or signal indicated (specified) by a reference signal parameter in the QCL configuration.

Specifically, statistical characteristics of a channel defined by the QCL setting (indicated by a parameter QCL-Type in the QCL configuration) may be classified as follows according to the QCL type.

'QCL-Type A': {Doppler shift, Doppler spread, average delay, delay spread}

'QCL-Type B': {Doppler shift, Doppler spread}

'QCL-Type C': {Doppler shift, average delay}

'QCL-Type D': {Spatial Rx parameter}

In this case, the types of QCL type are not limited to the above four types, but all possible combinations are not listed in order not to obscure the subject matter of explanation. In the QCL-Type A above, the bandwidth and transmission section of the target antenna port are sufficient compared to the reference antenna port (i.e., when the number of samples and transmission band/time of the target antenna port in both the frequency axis and the time axis are greater than the number of samples and transmission band/time of the reference antenna port), and the QCL-Type A is a QCL type used when all statistical characteristics that can be measured in the frequency and time axes can be referenced. The QCL-Type B is a QCL type used when the bandwidth of a target antenna port is sufficient to measure statistical characteristics (i.e., Doppler shift and Doppler spread) that can be measured in the frequency axis. The QCL-Type C is a QCL type used when the bandwidth and transmission interval of the target antenna port are insufficient to measure second-order statistics, that is, Doppler spread and delay spread, so that only first-order statistics, that is, Doppler shift and average delay, can be referenced. The QCL-Type D is a QCL type set when spatial reception filter values used when receiving a reference antenna port can be used when receiving a target antenna port.

Meanwhile, the base station can set or instruct one target antenna port to set up to two QCL settings through the following TCI state setting.

```
TCI-State ::=       SEQUENCE {
    tci-StateId         TCI-StateId, (TCI state indicator)
    qcl-Type1           QCL-Info, (First QCL configuration for target
antenna port to which corresponding TCI state is applied)
    qcl-Type2                       QCL-Info (Second QCL configuration for target
antenna port to which corresponding TCI state is applied)
    OPTIONAL,   -- Need R
    ...
}
```

Between the two QCL settings included in one TCI state setting, the first QCL setting may be configured to one of QCL-Type A, QCL-Type B, and QCL-Type C. At this time, the settable QCL type is specified according to the types of the target antenna port and the reference antenna port, and will be described in detail below. In addition, among the two QCL settings included in the one TCI state setting, the second QCL setting may be configured to QCL-Type D, and may be omitted in some cases.

Tables 9-1 to 9-5 below are tables illustrating effective TCI state settings according to the target antenna port type.

Table 9-1 represents the effective TCI state setting when the target antenna port is CSI-RS for tracking (TRS). The TRS means an NZP CSI-RS in which a repetition parameter is not configured among CSI-RSs and trs-Info is configured to true. In the case of setting No. 3 in Table 9-1, it may be used for aperiodic TRS.

[Table 9-1] Valid TCI State Setting when the Target Antenna Port is CSI-RS for Tracking (TRS)

TABLE 9-1

Valid TCI state setting when the target antenna port is CSI-RS for tracking (TRS)

| Valid TCI state Configuration | DL RS 1 | qcl-Type1 | DL RS 2 (if configured) | qcl-Type2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 9-2 represents valid TCI state settings when the target antenna port is CSI-RS for CSI. The CSI-RS for CSI refers to an NZP CSI-RS in which a repetition parameter is not configured and trs-Info is not configured to true among CSI-RSs.

[Table 9-2] Valid TCI State Setting when Target Antenna Port is CSI-RS for CSI

TABLE 9-2

Valid TCI state setting when target antenna port is CSI-RS for CSI

| Valid TCI state Configuration | DL RS 1 | qcl-Type1 | DL RS 2 (if configured) | qcl-Type2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 9-3 represents valid TCI state configuration when the target antenna port is CSI-RS for beam management (same meaning as BM, CS-RS for L1 RSRP reporting). The CSI-RS for BM refers to an NZP CSI-RS in which a repetition parameter is configured among CSI-RS and has a value of On or Off, and trs-Info is not configured to true.

[Table 9-3] Valid TCI State Configuration when the Target Antenna Port is CSI-RS for BM (for L1 RSRP Reporting).

TABLE 9-3

Valid TCI state configuration when the target antenna port is CSI-RS for BM (for L1 RSRP reporting)

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 9-4 represents valid TCI state settings when the target antenna port is PDCCH DMRS.

[Table 9-4] Valid TCI State Setting when Target Antenna Port is PDCCH DMRS

TABLE 9-4

Valid TCI state setting when target antenna port is PDCCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 9-5 represents valid TCI state setting when target antenna port is PDSCH DMRS.

[Table 9-5] Valid TCI State Setting when Target Antenna Port is PDSCH DMRS

TABLE 9-5

Valid TCI state setting when target antenna port is PDSCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

In the typical QCL setting method according to Tables 9-1 to 9-5, target antenna port and reference antenna port for each step are selected from "SSB"→"TRS"→"CSI-RS for CSI, CSI-RS for BM, PDCCH DMRS, or PDSCH DMRS". Through this, it is possible to help the reception operation of the terminal by linking the statistical characteristics that can be measured from the SSB and the TRS to each antenna port.

Figure 5:
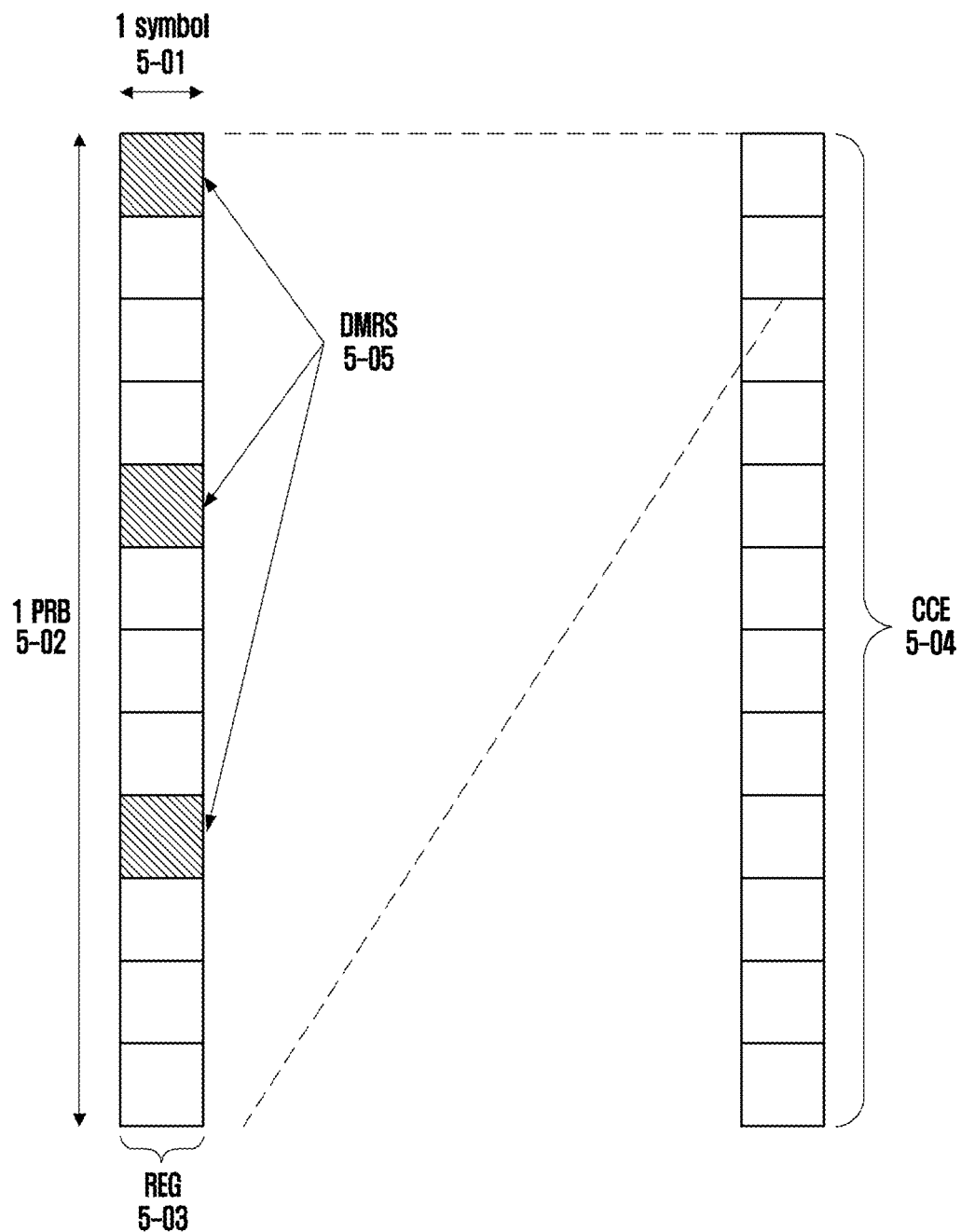
FIG. 5 is a view illustrating a structure of a downlink control channel in a mobile communication system according to an embodiment.

FIG. 5 is a view illustrating a structure of a downlink control channel in a mobile communication system according to an embodiment. That is, FIG. 5 is a view illustrating an example of a basic unit of time and frequency resources constituting a downlink control channel that can be used in 5G according to an embodiment of the disclosure.

Referring to FIG. 5, a basic unit of time and frequency resources constituting a control channel may be defined as a resource element group (REG) 5-03. The REG 5-03 may be defined as 1 OFDM symbol 5-01 on the time axis and 1 physical resource block (PRB) 5-02 on the frequency axis, that is, 12 subcarriers. The base station may configure a downlink control channel allocation unit by concatenating the REG 5-03.

As illustrated in FIG. 5, when a basic unit to which a downlink control channel is allocated in 5G is a control channel element (CCE) 5-04, 1 CCE 5-04 may be composed of a plurality of REGs 5-03. For example, the REG 5-03 in FIG. 5 may be composed of 12 REs, and if 1 CCE 5-04 is composed of 6 REGs 5-03, 1 CCE 5-04 may be composed of 72 REs. When a downlink control region is configured, the corresponding region may be composed of a plurality of CCEs 5-04, and a specific downlink control channel is one or more CCEs 5-04 according to an aggregation level (AL) within the control region can be mapped and transmitted. The CCEs 5-04 in the control area are classified by number, and the number of the CCEs 5-04 can be assigned according to a logical mapping method.

The REG (5-03), the basic unit of the downlink control channel in FIG. 5, may include both REs to which DCI is mapped and a region to which the DMRS 5-05, which is a reference signal for decoding, is mapped. As illustrated in FIG. 5, three DMRSs 5-05 may be transmitted in 1 REG 5-03. The number of CCEs required to transmit the PDCCH may be 1, 2, 4, 8, or 16 depending on the aggregation level (AL), and different numbers of CCEs may be used to implement link adaptation of the downlink control channel. For example, when AL=L, one downlink control channel may be transmitted through L CCEs.

The terminal needs to detect a signal without knowing the information on the downlink control channel, and for this blind decoding, a search space indicating a set of CCEs may be defined. The search space is a set of downlink control channel candidates consisting of CCEs to which the terminal should attempt decoding on a given aggregation level. Since there are various aggregation levels that make one bundle with 1, 2, 4, 8, and 16 CCEs, the terminal may have a plurality of search spaces. The search space set may be defined as a set of search spaces at all set aggregation levels.

The search space may be classified into a common search space and a UE-specific search space. According to an embodiment, terminals of a certain group or all terminals may look for a common search space of a PDCCH in order to receive cell-common control information such as dynamic scheduling or paging message for system information.

For example, the terminal may receive PDSCH scheduling allocation information for transmission of SIB including cell operator information, etc. by looking for the common search space of the PDCCH. In the case of a common search space, since a certain group of terminals or all terminals must receive a PDCCH, the common search space may be defined as a set of predetermined CCEs. Meanwhile, the terminal may receive scheduling allocation information for a terminal-specific PDSCH or PUSCH by looking for a terminal-specific search space of the PDCCH. The terminal-specific search space may be defined terminal-specifically as a function of the terminal's identity and various system parameters.

In the 5G system, the parameter for the search space for the PDCCH may be configured from the base station to the terminal by higher layer signaling (e.g., SIB, MIB, RRC signaling). For example, the base station is the number of PDCCH candidates at each aggregation level L, a monitoring period for a search space, a monitoring occasion in a symbol unit in a slot for a search space, a search space type (common search space or a terminal-specific search space), the combination of the DCI format to be monitored in the search space and RNTI, and the control region index to monitor the search space can be configured to the terminal. The above-described setting may include information as illustrated in Table 10.

TABLE 10

```
SearchSpace ::=                                         SEQUENCE {
            -- Identity of the search space. SearchSpaceId = 0 identifies the
    SearchSpace configured via PBCH (MIB) or ServingCellConfigCommon.
                searchSpaceId
                Search SpaceId,
                controlResourceSetId
                ControlResourceSetId,
                monitoringSlotPeriodicityAndOffset          CHOICE
                    sl1
                            NULL,
                    sl2
                            INTEGER (0..1),
                    sl4
                            INTEGER (0..3),
                    sl5
                    INTEGER (0..4),
                    sl8
                            INTEGER (0..7),
                    sl10
                    INTEGER (0..9),
                    sl16
                    INTEGER (0..15),
                    sl20
                    INTEGER (0..19)
                }
                                            OPTIONAL,
            duration                            INTEGER (2..2559)
                monitoringSymbolsWithinSlot                                 BIT
STRING (SIZE (14))
                                            OPTIONAL,
                nrofCandidates
                SEQUENCE {
                    aggregationLevel1
                ENUMERATED {n0, n1, n2, n3, n4, n5, n6, n8},
                    aggregationLevel2
                ENUMERATED {n0, n1, n2, n3, n4, n5, n6, n8},
                    aggregationLevel4
                ENUMERATED {n0, n1, n2, n3, n4, n5, n6, n8},
```

TABLE 10-continued

```
            aggregationLevel8
    ENUMERATED {n0, n1, n2, n3, n4, n5, n6, n8},
            aggregationLevel16
    ENUMERATED {n0, n1, n2, n3, n4, n5, n6, n8}
    },
    searchSpaceType
    CHOICE {
            -- Configures this search space as common search space (CSS) and
DCI formats to monitor.
            common
            SEQUENCE {
}
            ue-Specific
            SEQUENCE {
                    -- Indicates whether the UE monitors in this USS for DCI
formats 0-0 and 1-0 or for formats 0-1 and 1-1.
                    formats
                    ENUMERATED {formats0-0-And-1-0, formats0-1-And-
1-1},
            ...
```

Based on the configuration information, the base station may set one or a plurality of search space sets to the terminal. According to an embodiment, the base station may set search space set 1 and search space set 2 to the terminal, and set to monitor DCI format A scrambled with X-RNTI in search space set 1 in a common search space. In addition, DCI format B scrambled with Y-RNTI in search space set 2 may be configured to be monitored in a terminal-specific search space.

According to the setting information, one or a plurality of search space sets may exist in a common search space or a terminal-specific search space. For example, search space set #1 and search space set #2 may be configured as common search spaces, and search space set #3 and search space set #4 may be configured as terminal-specific search spaces.

The common search space may be classified into a set of search spaces of a specific type according to the purpose. RNTIs to be monitored may be different for each type of set search space. For example, the common search space type, purpose, and RNTI to be monitored can be classified as follows.

| Search space type | Purpose | RNTI |
| --- | --- | --- |
| Type0 CSS | PDCCH transmission for SIB schedule | SI-RNTI |
| Type0A CSS | PDCCH transmission for other SI schedule (SIB2, etc.) | SI-RNTI |
| Type 1 CSS | PDCCH transmission for random access response (RAR) schedule, Msg3 retransmission schedule, Msg4 schedule | RA-RNTI, TC-RNTI |
| Type 2 CSS | Paging | P-RNTI |
| Type 3 CSS | Transmission of group control information | INT-RNTI, SFI-RNTI, TPC-PUSCH-RNTI, TPC-PUCCH-RNTI, TPC-SRS-RNTI |
|  | In case of PCell, PDCCH transmission for data schedule | C-RNTI, MCS-C-RNTI, CS-RNTI |

Meanwhile, a combination of the following DCI format and RNTI may be monitored in the common search space. It is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the terminal-specific search space, a combination of the following DCI format and RNTI may be monitored. It is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs can follow the definitions and uses as follows.

Cell RNTI (SI-RNTI): For terminal-specific PDSCH scheduling

Temporary Cell RNTI (TC-RNTI): For terminal-specific PDSCH scheduling

Configured scheduling RNTI (CS-RNTI): For semi-statically configured terminal-specific PDSCH scheduling Random access RNTI (RA-RNTI): For PDSCH scheduling in the random access phase Paging RNTI (P-RNTI): PDSCH scheduling for paging transmission System information RNTI (SI-RNTI): For PDSCH scheduling in which system information is transmitted Interruption RNTI (INT-RNTI): Used to inform whether PDSCH is puncturing Transmit power control for PUSCH RNTI (TPC-PUSCH-RNTI): Used to instruct power control commands for PUSCH Transmit power control for PUCCH RNTI (TPC-PUCCH-RNTI): Used to instruct the power control command for PUCCH Transmit power control for SRS RNTI (TPC-SRS-RNTI): Used to instruct the power control command for SRS In one embodiment, the DCI formats described above may be defined as illustrated in Table 11 below.

TABLE 11

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

According to an embodiment, in a 5G system, a plurality of search space sets may be configured with different parameters (e.g., parameters in [Table 10]). Accordingly, the set of search space sets monitored by the terminal may vary at each time point. For example, if search space set #1 is configured to the X-slot period, search space set #2 is configured to the Y-slot period, and X and Y are different, the terminal searches with search space set #1 in a specific slot. Both space set #2 can be monitored, and one of search space set #1 and search space set #2 can be monitored in a specific slot.

When a plurality of search space sets is configured in the terminal, the following conditions may be considered in order to determine the search space set that the terminal should monitor.

[Condition 1: Limit the Maximum Number of PDCCH Candidates]

The number of PDCCH candidates that can be monitored per slot may not exceed Mµ. Mµ may be defined as the maximum number of PDCCH candidate groups per slot in a cell set to a subcarrier spacing of 15.2 kHz, and may be defined as illustrated in Table 12 below.

TABLE 12

| µ | Maximum number of PDCCH candidates per slot and per serving cell ($M^\mu$) |
|---|---|
| 0 | 44 |
| 1 | 36 |
| 2 | 22 |
| 3 | 20 |

[Condition 2: Limit the Maximum Number of CCEs]

The number of CCEs constituting the total search space per slot (here, the total search space may refer to the entire CCE set corresponding to the union region of a plurality of search space sets) may not exceed C. The C may be defined as the maximum number of CCEs per slot in a cell set to a subcarrier spacing of 15·2µ kHz, and may be defined as illustrated in Table 13 below.

TABLE 13

| µ | Maximum number of CCEs per slot and per serving cell ($C^\mu$) |
|---|---|
| 0 | 56 |
| 1 | 56 |
| 2 | 48 |
| 3 | 32 |

For the convenience of explanation, a situation in which both conditions 1 and 2 are satisfied at a specific point in time may be exemplarily defined as "condition A". Therefore, not satisfying the condition A may mean not satisfying at least one of the above-described conditions 1 and 2.

According to the settings of the search space sets of the base station, it may occur that condition A is not satisfied at a specific time point. When condition A is not satisfied at a specific point in time, the terminal may select and monitor only a part of search space sets set to satisfy condition A at that point in time, and the base station may transmit the PDCCH to the selected search space set.

According to an embodiment, the following method may be followed as a method of selecting some search spaces from among the entire set of search spaces.

Method 1

In a case that the condition A for the PDCCH is not satisfied at a specific point in time (slot).

The terminal (or the base station) may preferentially select a search space set in which a search space type is configured as a common search space among search space sets existing at a corresponding time point over a search space set configured as a terminal-specific search space.

When all search space sets set as the common search space are selected (i.e., if condition A is satisfied even after selecting all search spaces configured as common search spaces), the terminal (or the base station) may select search space sets configured as the terminal-specific search space. In this case, when there is a plurality of search space sets configured as a terminal-specific search space, a search space set having a low search space set index may have a higher priority. In consideration of the priority, the terminal or the base station may select terminal-specific search space sets within a range in which condition A is satisfied.

Hereinafter, time and frequency resource allocation methods for data transmission in the NR are described.

In the NR system, the following detailed frequency domain resource allocation (FD-RA) methods may be provided in addition to frequency-axis resource candidate allocation through BWP indication.

Figure 6:
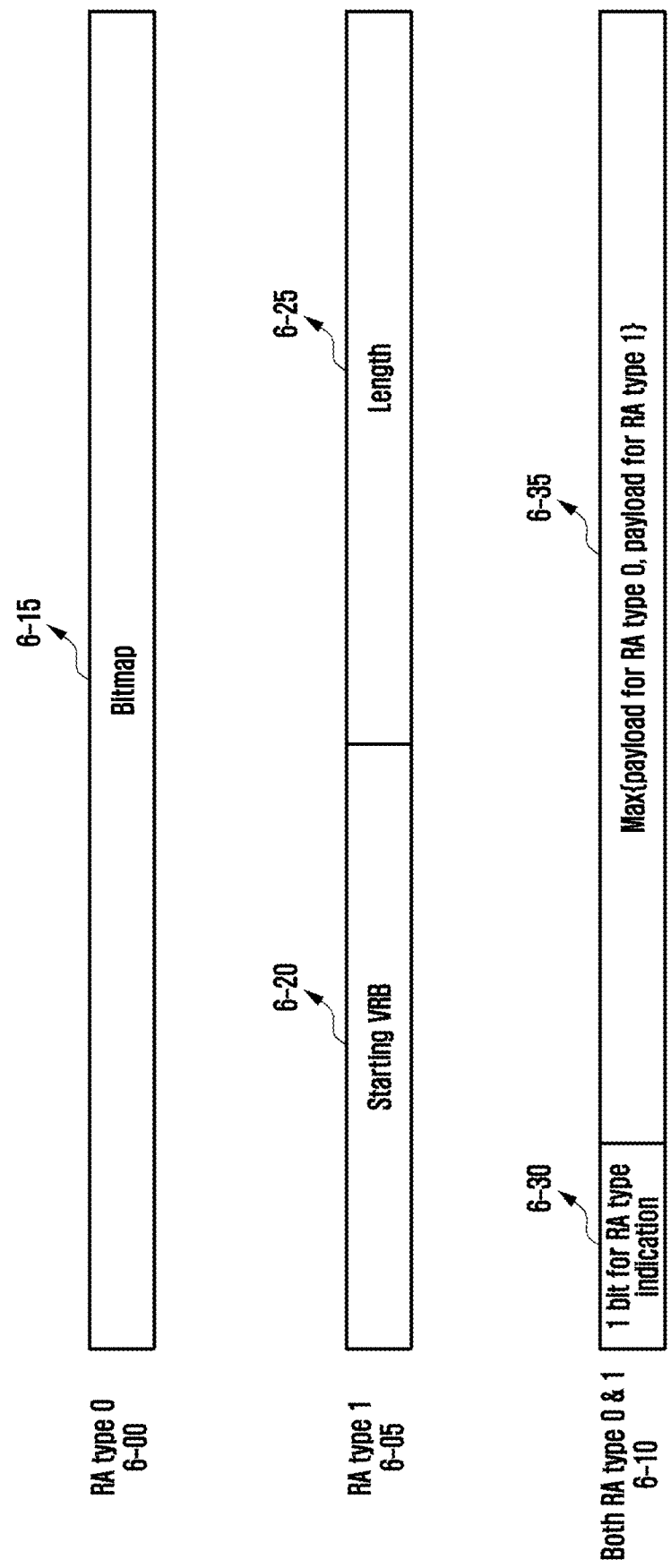
FIG. 6 is a view illustrating an example of frequency axis resource allocation of a physical downlink shared channel (PDSCH) in a wireless communication system according to an embodiment.

FIG. 6 is a view illustrating an example of frequency axis resource allocation of a PDSCH in a wireless communication system according to an embodiment.

FIG. 6 is a view illustrating three frequency axis resource allocation methods of type 0 6-00, type 1 6-05, and dynamic switch 6-10 that can be configured through an upper layer in NR system.

Referring to FIG. 6, if the terminal is configured to use only resource type 0 through higher layer signaling 6-00, some downlink control information (DCI) allocating a PDSCH to the UE has a bitmap consisting of NRBG bits. The conditions for this will be described later. In this case, the NRBG refers to the number of resource block groups (RBG) determined as shown in Table 14 below according to the BWP size allocated by the BWP indicator and the upper layer parameter rbg-Size, and data is transmitted to the RBG indicated as 1 by the bit map.

TABLE 14

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

If the terminal is configured to use only resource type 1 through higher layer signaling (6-05), some DCIs that allocate a PDSCH to a corresponding terminal have frequency axis resource allocation information composed of $\in \log_2$ $(N_{RB}^{DL,BWP}(N_{RB}^{DL,BWP}+1)/2)]$ bits. The conditions for this will be described later. Through this, the base station may set the starting VRB 6-20 and the length of the frequency axis resources continuously allocated therefrom 6-25.

If the terminal is configured to use both resource type 0 and resource type 1 through higher layer signaling 6-10, some DCIs that allocate the PDSCH to the corresponding terminal have frequency axis resource allocation information consisting of bits of a large value 6-35 among the payload 6-15 for setting resource type 0 and the payload 6-20, 6-25 for setting resource type 1. The conditions for this will be described later. In this case, one bit may be added to the first part (MSB) of the frequency axis resource allocation information in the DCI, and if the corresponding bit is 0, it is indicated that resource type 0 is used, and if the corresponding bit is 1, it may be indicated that resource type 1 is used.

Hereinafter, a method of allocating time domain resources for a data channel in a next-generation mobile communication system (5G or NR system) is described.

The base station may set a table for time domain resource allocation information for physical downlink shared channel (PDSCH) and physical uplink shared channel (PUSCH) to the terminal as higher layer signaling (e.g., RRC signaling). For the PDSCH, a table composed of maxNrofDL-Allocations=16 entries may be configured, and for the PUSCH, a table composed of maxNrofUL-Allocations=16 entries may be configured. In an embodiment, the time domain resource allocation information may include PDCCH-to-PDSCH slot timing (corresponding to time interval in units of slots between the time when the PDCCH is received and the time when the PDSCH scheduled by the received PDCCH is transmitted, and expressed as K0), PDCCH-to-PUSCH slot timing (corresponding to time interval in units of slots between the time when the PDCCH is received and the time when the PUSCH scheduled by the received PDCCH is transmitted, and expressed as K2), information on the position and length of a start symbol in which a PDSCH or PUSCH is scheduled within the slot, and mapping type of PDSCH or PUSCH. For example, information such as [Table 15] or [Table 16] below may be notified from the base station to the terminal.

TABLE 15

PDSCH-TimeDomainResourceAllocationList information element

```
PDSCH-TimeDomainResourceAllocationList ::=    SEQUENCE (SIZE(1..maxNrofDL-Allocations)) OF PDSCH-
TimeDomainResource Allocation
PDSCH-TimeDomainResourceAllocation ::=        SEQUENCE {
    k0                                            INTEGER(0..32)               OPTIONAL, --Need S
    mappingType                                   ENUMERATED {typeA, typeB},
    startSymbolAndLength                          INTEGER (0..127)
}
```

TABLE 16

PDSCH-TimeDomainResourceAllocationList information element

```
PUSCH-TimeDomainResourceAllocationList ::=    SEQUENCE (SIZE(1..maxNrofUL-Allocations)) OF PUSCH-
TimeDomainResource Allocation
PUSCH-TimeDomainResourceAllocation ::=        SEQUENCE {
    k2                                            INTEGER(0..32)               OPTIONAL, --Need S
    mappingType                                   ENUMERATED {typeA, typeB},
    startSymbolAndLength                          INTEGER (0..127)
}
```

The base station may notify the terminal of one of the entries of the table for the time domain resource allocation information through L1 signaling (e.g., DCI) (e.g., it may be indicated by 'time domain resource allocation' field in DCI). The terminal may acquire time domain resource allocation information for the PDSCH or PUSCH, based on the DCI received from the base station.

Figure 7:
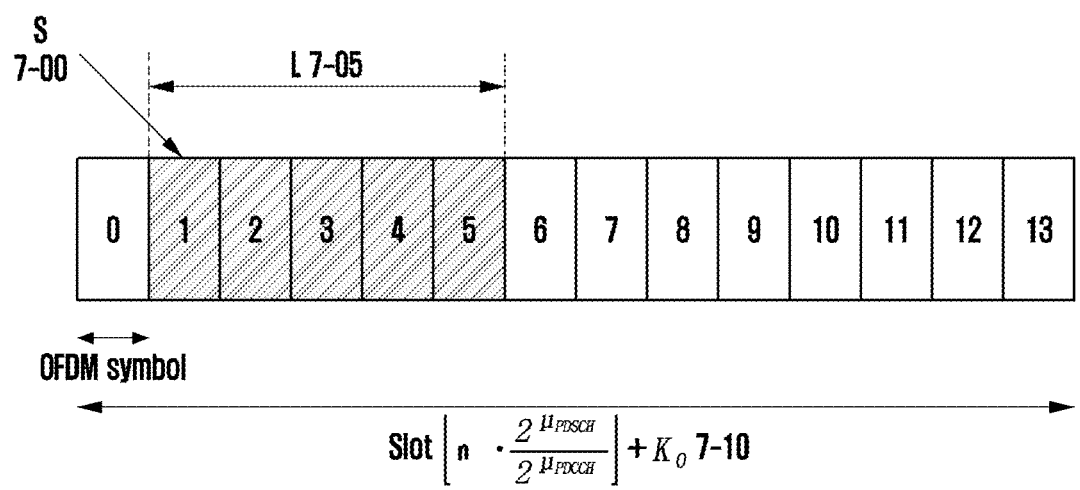
FIG. 7 is a view illustrating an example of time axis resource allocation of a PDSCH in a wireless communication system according to an embodiment.

FIG. 7 is a view illustrating an example of time axis resource allocation of a PDSCH in a wireless communication system according to an embodiment.

Referring to FIG. 7, a base station may indicate the time axis position of the PDSCH resource according to the subcarrier spacing (SCS) of a data channel and a control channel ($\mu_{PDSCH}$, $\mu_{PDCCH}$) set using an upper layer, scheduling offset value $K_0$, and the OFDM symbol start position (7-00) and length (7-05) within one slot dynamically indicated through DCI.

Figure 8:
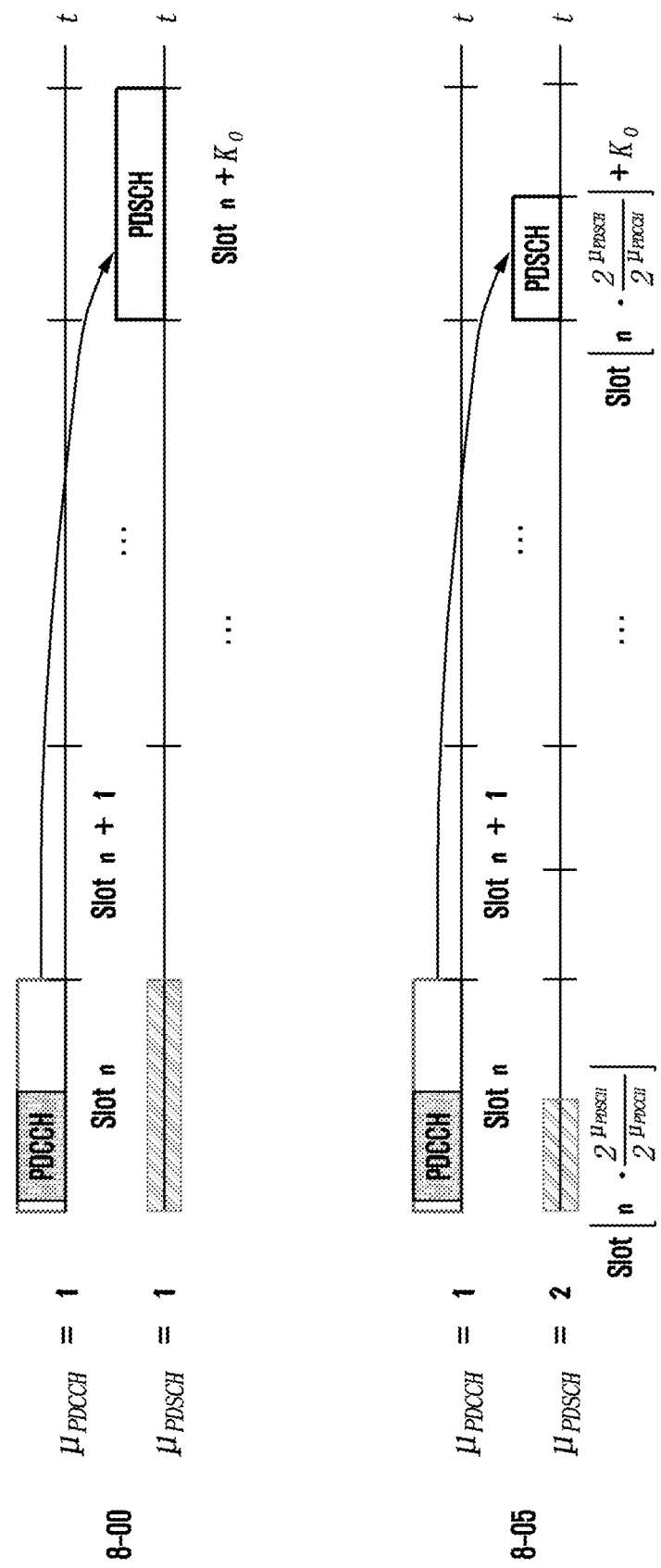
FIG. 8 is a view illustrating an example of time axis resource allocation according to subcarrier spacings of a data channel and a control channel in a wireless communication system according to an embodiment.

FIG. 8 is a view illustrating an example of time axis resource allocation according to subcarrier spacings of a data channel and a control channel in a wireless communication system according to an embodiment.

Referring to FIG. 8, it can be seen that when the subcarrier spacings of the data channel and the control channel are the same 8-00 ($\mu_{PDSCH}=\mu_{PDCCH}$), since the slot number for data and control are the same, a scheduling offset occurs in the base station and the terminal according to a predetermined slot offset $K_0$. On the other hand, it can be seen that when the subcarrier spacings of the data channel and the control channel are different 8-05 ($\mu_{PDSCH}=\mu_{PDCCH}$), since the slot number for data and control are different, a scheduling offset occurs in the base station and the terminal according to a predetermined slot offset $K_0$, based on the subcarrier spacing of the PDCCH.

In the NR system, the terminal transmits uplink control information (UCI) to the base station through PUCCH. At least one of the following may be included in the control information. The control information may include at least one of HARQ-ACK indicating success or failure of demodulation/decoding for a transport block (TB) received by the UE through the PDSCH, scheduling request (SR) for requesting resource allocation from the terminal to the PUSCH base station for uplink data transmission, and channel state information (CSI), which is information for reporting the channel state of the terminal.

The PUCCH resource may be largely divided into a long PUCCH and a short PUCCH according to the length of the allocated symbol. In the NR, the long PUCCH has a length of 4 symbols or more in a slot, and the short PUCCH has a length of 2 symbols or less in a slot.

In more detail about the long PUCCH, the long PUCCH may be used for the purpose of improving uplink cell coverage, and thus may be transmitted in a DFT-S-OFDM scheme, which is a single carrier transmission rather than an OFDM transmission. The long PUCCH supports transmission formats such as PUCCH format 1, PUCCH format 3, and PUCCH format 4 depending on the number of supportable control information bits and whether terminal multiplexing through Pre-DFT OCC support at the front end of the IFFT is supported.

First, the PUCCH format 1 is a DFT-S-OFDM-based long PUCCH format capable of supporting up to 2 bits of control information, and uses as much frequency resources as 1RB. The control information may be composed of a combination of HARQ-ACK and SR or each. In PUCCH format 1, an OFDM symbol including a demodulation reference signal (DMRS) that is a demodulation reference signal (or a reference signal) and an OFDM symbol including UCI are repeatedly configured.

For example, when the number of transmission symbols of PUCCH format 1 is 8 symbols, the first start symbol of 8 symbols is sequentially composed of DMRS symbol, UCI symbol, DMRS symbol, UCI symbol, DMRS symbol, UCI symbol, DMRS symbol, UCI symbol. The DMRS symbol is spread using an orthogonal code (or orthogonal sequence or spreading code, w_i(m)) on the time axis to a sequence corresponding to the length of 1RB on the frequency axis within one OFDM symbol, and is transmitted after IFFT.

The UCI symbol is generated as follows. The terminal generates d(0) by BPSK modulating 1-bit control information and QPSK modulating 2-bit control information, multiplies the generated d(0) by a sequence corresponding to the length of 1 RB on the frequency axis to scramble, spreads the scrambled sequence using an orthogonal code (or an orthogonal sequence or spreading code, $w_i((m))$ on the time axis, and transmits the same after performing the IFFT.

The terminal generates the sequence, based on the group hopping or sequence hopping configuration and the set ID set as a higher signal from the base station, and generates a sequence corresponding to a length of 1 RB by cyclic shifting the generated sequence with an initial cyclic shift (CS) value set as a higher signal.

The $w_i$ (m) is determined as $$w_i(m) = e^{\frac{j2\pi\phi(m)}{N_{SF}}}$$

when the length of the spreading code (NSF) is given, and specifically illustrated in Table 16 below. In the above, i means the index of the spreading code itself, and m means the index of the elements of the spreading code. Here, the numbers in [ ] in Table 16 mean, for example, if the length of the spreading code is 2 and the index of the set spreading code is i=0, the spreading code $w_i(0)=e^{j2\pi\cdot 0/N_{SF}}=1$, $w_i(1)=e^{j2\pi\cdot 0/N_{SF}}=1$, and wi(m)=[1 1].

TABLE 16

| $N_{SF}$ | φ(m) | | | | | | |
|---|---|---|---|---|---|---|---|
| | i = 0 | i = 1 | i = 2 | i = 3 | i = 4 | i = 5 | i = 6 |
| 1 | [0] | — | — | — | — | — | — |
| 2 | [0 0] | [0 1] | — | — | — | — | — |
| 3 | [0 0 0] | [0 1 2] | [0 2 1] | — | — | — | — |
| 4 | [0 0 0 0] | [0 2 0 2] | [0 0 2 2] | [0 2 2 0] | — | — | — |
| 5 | [0 0 0 0 0] | [0 1 2 3 4] | [0 2 4 1 3] | [0 3 1 4 2] | [0 4 3 2 1] | — | — |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | — |
| 7 | [0 0 0 0 0 0 0] | [0 1 2 3 4 5 6] | [0 2 4 6 1 3 5] | [0 3 6 2 5 1 4] | [0 4 1 5 2 6 3]] | [0 5 3 1 6 4 2] | [0 6 5 4 3 2 1] |

Next, the PUCCH format 3 is a DFT-S-OFDM-based long PUCCH format capable of supporting more than 2 bits of control information, and the number of RBs used can be configured through an upper layer. The control information may consist of a combination of HARQ-ACK, SR, and CSI, or each. In the PUCCH format 3, the location of the DMRS symbol is presented according to whether frequency hopping in the slot and whether additional DMRS symbols are configured as illustrated in [Table 17] below.

TABLE 17

| | DMRS location in PUCCH format 3/4 transmission | | | |
|---|---|---|---|---|
| | Additional DMRS is not configured | | Additional DMRS is configured | |
| PUCCH format 3/4 Transmission length | Frequency hopping is not configured | Frequency hopping is configured | Frequency hopping is not configured | Frequency hopping is configured |
| 4 | 1 | 0, 2 | 1 | 0, 2 |
| 5 | 0, 3 | | 0, 3 | |
| 6 | 1, 4 | | 1, 4 | |
| 7 | 1, 4 | | 1, 4 | |
| 8 | 1, 5 | | 1, 5 | |
| 9 | 1, 6 | | 1, 6 | |
| 10 | 2, 7 | | 1, 3, 6, 8 | |
| 11 | 2, 7 | | 1, 3, 6, 9 | |
| 12 | 2, 8 | | 1, 4, 7, 10 | |

TABLE 17-continued

DMRS location in PUCCH format 3/4 transmission

| PUCCH | Additional DMRS is not configured | | Additional DMRS is configured | |
|---|---|---|---|---|
| format 3/4 Transmission length | Frequency hopping is not configured | Frequency hopping is configured | Frequency hopping is not configured | Frequency hopping is configured |
| 13 | 2, 9 | | 1, 4, 7, 11 | |
| 14 | 3, 10 | | 1, 5, 8, 12 | |

For example, when the number of transmission symbols of the PUCCH format 3 is 8 symbols, the first start symbol of the 8 symbols starts with 0, and the DMRS is transmitted in the first symbol and the fifth symbol. The above table is applied in the same way to the DMRS symbol position of the PUCCH format 4.

Next, the PUCCH format 4 is a DFT-S-OFDM-based long PUCCH format capable of supporting more than 2 bits of control information, and uses as much frequency resources as 1RB. The control information may be composed of a combination of HARQ-ACK, SR, and CSI, or each of them. The difference between the PUCCH format 4 and the PUCCH format 3 is that in case of the PUCCH format 4, the PUCCH format 4 of multiple terminals can be multiplexed within one RB. It is possible to multiplex PUCCH format 4 of a plurality of terminals through application of Pre-DFT OCC to control information in the front of the IFFT. However, the number of transmittable control information symbols of one terminal decreases according to the number of multiplexed terminals. The number of multiplexable terminals, that is, the number of different OCCs that can be used, may be 2 or 4, and the number of OCCs and the OCC index to be applied may be configured through a higher layer.

Next, the short PUCCH will be described. The short PUCCH may be transmitted in both a downlink centric slot and an uplink centric slot. In general, the short PUCCH may be transmitted at the last symbol of the slot or an OFDM symbol at the end (e.g., the last OFDM symbol, the second OFDM symbol from the end, or the last 2 OFDM symbols). Of course, it is also possible to transmit the short PUCCH at any location in the slot. In addition, the short PUCCH may be transmitted using one OFDM symbol or two OFDM symbols. The short PUCCH may be used to shorten a delay time compared to the long PUCCH in a situation where uplink cell coverage is good, and is transmitted in a CP-OFDM scheme.

The short PUCCH supports transmission formats such as PUCCH format 0 and PUCCH format 2 according to the number of supportable control information bits. First, the PUCCH format 0 is a short PUCCH format capable of supporting up to 2 bits of control information, and uses frequency resources of 1 RB. The control information may be composed of a combination of HARQ-ACK and SR or each of them. The PUCCH format 0 does not transmit DMRS, but transmits only sequences mapped to 12 subcarriers in the frequency axis within one OFDM symbol. The terminal generates a sequence, based on the group hopping or sequence hopping configuration and set ID set as a higher signal from the base station, cyclic shifts the generated sequence to the final cyclic shift (CS) value obtained by adding another CS value according to whether it is ACK or NACK to the indicated initial CS value, maps it to 12 subcarriers, and transmits the same.

For example, when HARQ-ACK is 1 bit, as in the following Table 18, if it is ACK, 6 is added to the initial CS value to generate the final CS, and if NACK, 0 is added to the initial CS to generate the final CS. The CS value 0 for NACK and 6 for ACK are defined in the standard, and the terminal always generates PUCCH format 0 according to the value to transmit 1-bit HARQ-ACK.

TABLE 18

| 1 bit HARQ-ACK | NACK | ACK |
|---|---|---|
| Final CS | (Initial CS + 0) mod 12 = initial CS | (Initial CS + 6) mod 12 |

For example, when HARQ-ACK is 2 bits, 0 is added to the initial CS value if (NACK, NACK) as in the following Table 19, and 3 is added to the initial CS value if (NACK, ACK), and (ACK, ACK)), 6 is added to the initial CS value, and 9 is added to the initial CS value if (ACK, NACK). The CS value 0 for (NACK, NACK), 3 for the CS value for (NACK, ACK), 6 for the CS value for (ACK, ACK), and 9 for the CS value for (ACK, NACK) are defined in the standard. The terminal always transmits a 2-bit HARQ-ACK by generating PUCCH format 0 according to the value.

If the final CS value exceeds 12 by the CS value added according to ACK or NACK to the initial CS value, since the sequence length is 12, modulo 12 is applied to the final CS value.

TABLE 19

| 2 bits HARQ-ACK | NACK, NACK | NACK, ACK | ACK, ACK | ACK, NACK |
|---|---|---|---|---|
| Final CS | (Initial CS + 0) mod 12 = Initial CS | (Initial CS + 3) mod 12 | (Initial CS + 6) mod 12 | (Initial CS + 9) mod 12 |

Next, the PUCCH format 2 is a short format that supports more than 2 bits of control information, and the number of RBs used can be configured through an upper layer. The control information may be composed of a combination of HARQ-ACK, SR, and CSI, or each of them. In the PUCCH format 2, the position of the subcarrier through which the DMRS is transmitted within one OFDM symbol is fixed to the subcarrier having indexes of #1, #4, #7, and #10, when the index of the first subcarrier is #0, as shown in FIG. 4. The control information is mapped to the remaining subcarriers through a modulation process after channel coding except for the subcarrier where the DMRS is located.

In summary, values that may be configured for each of the above-described PUCCH formats and their ranges may be arranged as illustrated in Table 20 below. If the value does not need to be configured in the Table 20, it is indicated as N.A.

TABLE 20

| | | PUCCH Format 0 | PUCCH Format 1 | PUCCH Format 2 | PUCCH Format 3 | PUCCH Format 4 |
|---|---|---|---|---|---|---|
| Starting symbol | Configurability | √ | √ | √ | √ | √ |
| | Value range | 0-13 | 0-10 | 0-13 | 0-10 | 0-10 |
| Number of symbols in a slot | Configurability | √ | √ | √ | √ | √ |
| | Value range | 1, 2 | 4-14 | 1, 2 | 4-14 | 4-14 |
| Index for identifying starting PRB | Configurability | √ | √ | √ | √ | √ |
| | Value range | 0-274 | 0-274 | 0-274 | 0-274 | 0-274 |
| Number of PRBs | Configurability | N.A. | N.A. | √ | √ | N.A. |
| | Value range | N.A. (Default is 1) | N.A. (Default is 1) | 1-16 | 1-6, 8-10, 12, 15, 16 | N.A. (Default is 1) |
| Enabling frequency hopping (intra-slot) | Configurability | √ | √ | √ | √ | √ |
| | Value range | On/Off (only for 2 symbol) | On/Off | On/Off (only for 2 symbol) | On/Off | On/Off |
| Freq.cy resource of $2^{nd}$ hop if intra-slot frequency hopping is enabled | Configurability | √ | √ | √ | √ | √ |
| | Value range | 0-274 | 0-274 | 0-274 | 0-274 | 0-274 |
| Index of initial cyclic shift | Configurability | √ | √ | N.A. | N.A. | N.A. |
| | Value range | 0-11 | 0-11 | N.A. | N.A. | N.A. |
| Index of time-domain OCC | Configurability | N.A. | √ | N.A. | N.A. | N.A. |
| | Value range | N.A. | 0-6 | N.A. | N.A. | N.A. |
| Length of Pre-DFT OCC | Configurability | N.A. | N.A. | N.A. | N.A. | √ |
| | Value range | N.A. | N.A. | N.A. | N.A. | 2, 4 |
| Index of Pre-DFT OCC | Configurability | N.A. | N.A. | N.A. | N.A. | √ |
| | Value range | N.A. | N.A. | N.A. | N.A. | 0, 1, 2, 3 |

Meanwhile, in order to improve uplink coverage, multi-slot repetition may be supported for PUCCH formats 1, 3, and 4, PUCCH repetition can be configured for each PUCCH format.

The terminal repeatedly transmits the PUCCH including UCI as many as the number of slots configured through nrofSlots, which is higher layer signaling. For the repetitive PUCCH transmission, the PUCCH transmission in each slot may be performed using the same number of consecutive symbols, and the corresponding consecutive symbols may be configured through a nrofSymbols in the PUCCH-format 1, the PUCCH-format 3, or the PUCCH-format 4, which is higher layer signaling. For the repetitive PUCCH transmission, the PUCCH transmission in each slot may be performed using the same start symbol, and the corresponding start symbol may be configured through a startingSymbolIndex in the PUCCH-format 1, the PUCCH-format 3, or the PUCCH-format 4, which is higher layer signaling.

For the repetitive PUCCH transmission, if the terminal has been configured to perform frequency hopping in PUCCH transmission in different slots, the terminal performs frequency hopping in units of slots. In addition, if the terminal has been configured to perform frequency hopping in the PUCCH transmission in different slots, the terminal starts the PUCCH transmission from the first PRB index configured through startingPRB, which is higher layer signaling, in the even-numbered slot, and in the odd-numbered slot, the terminal starts the PUCCH transmission from the second PRB index configured through secondHopPRB, which is higher layer signaling.

Additionally, if the terminal is configured to perform frequency hopping in PUCCH transmission in different slots, the index of the slot in which the terminal is instructed to transmit the first PUCCH is 0, and during the configured total number of repetitive PUCCH transmissions, the value of the number of repetitive PUCCH transmissions is increased in each slot regardless of the PUCCH transmission performed. If the terminal is configured to perform frequency hopping in PUCCH transmission in different slots, the terminal does not expect that frequency hopping in the slot is configured when transmitting PUCCH. If the terminal is not configured to perform frequency hopping in PUCCH transmission in different slots but is configured for frequency hopping in a slot, the first and second PRB indexes are applied equally in the slot.

Next, the PUCCH resource configuration of the base station or the terminal is described. The base station may configure PUCCH resources for each BWP through an upper layer for a specific terminal. The configuration is may be as in Table 21.

TABLE 21

```
PUCCH-Config ::=                                  SEQUENCE {
    resourceSetToAddModList                           SEQUENCE (SIZE (1..maxNrofPUCCH-ResourceSets) )
        OF PUCCH-ResourceSet      OPTIONAL , -- Need N
    resourceSetToReleaseList                          SEQUENCE (SIZE (1..maxNrofPUCCH-ResourceSets) )
```

TABLE 21-continued

| | | |
|---|---|---|
| OF PUCCH-ResourceSetId | OPTIONAL, -- Need N | |
| resourceToAddModList | | SEQUENCE (SIZE (1..maxNrofPUCCH-Resources) ) OF |
| PUCCH-Resource | OPTIONAL, -- Need N | |
| resourceToReleaseList | | SEQUENCE (SIZE (1..maxNrofPUCCH-Resources) ) OF |
| PUCCH-ResourceId | OPTIONAL, -- Need N | |
| format1 | | SetupRelease { PUCCH-FormatConfig } |
| OPTIONAL, -- Need M | | |
| format2 | | SetupRelease { PUCCH-FormatConfig } |
| OPTIONAL, -- Need M | | |
| format3 | | SetupRelease { PUCCH-FormatConfig } |
| OPTIONAL, -- Need M | | |
| format4 | | SetupRelease { PUCCH-FormatConfig } |
| OPTIONAL, -- Need M | | |
| schedulingRequestResourceToAddModList | | SEQUENCE (SIZE (1..maxNrofSR-Resources) ) OF |
| SchedulingRequestResourceConfig | | |
| OPTIONAL, -- Need N | | |
| schedulingRequestResourceToReleaseList | | SEQUENCE (SIZE (1..maxNrofSR-Resources ) ) OF |
| SchedulingRequestResourceId | | |
| OPTIONAL, -- Need N | | |
| multi-CSI-PUCCH-ResourceList | | SEQUENCE (SIZE (1..2) ) OF PUCCH-ResourceId |
| OPTIONAL, -- Need N | | |
| dl-DataToUL-ACK | | SEQUENCE (SIZE (1..8) ) OF INTEGER (0..15) |
| OPTIONAL, -- Need M | | |
| spatialRelationInfoToAddModList | | SEQUENCE (SIZE |
| (1..maxNrofSpatialRelationInfos)) OF PUCCH-SpatialRelationInfo | | |
| OPTIONAL, -- Need N | | |
| spatialRelationInfoToReleaseList | | SEQUENCE (SIZE |
| (1..maxNrofSpatialRelationInfos)) OF PUCCH-SpatialRelationInfoId | | |
| OPTIONAL, -- Need N | | |
| pucch-PowerControl | | PUCCH-PowerControl |
| OPTIONAL, -- Need M | | |
| ... | | |
| } | | |

According to the above table, one or a plurality of PUCCH resource sets in the PUCCH resource setting for a specific BWP may be configured, and a maximum payload value for UCI transmission may be configured in some of the PUCCH resource sets. Each PUCCH resource set may belong to one or more PUCCH resources, and each of the PUCCH resources may belong to one of the above-described PUCCH formats.

For the PUCCH resource set, the maximum payload value of the first PUCCH resource set may be fixed to 2 bits, and thus the corresponding value may not be separately configured through an upper layer. When the remaining PUCCH resource set is configured, the index of the corresponding PUCCH resource set may be configured in ascending order according to the maximum payload value, and the maximum payload value may not be configured in the last PUCCH resource set. The upper layer configuration for the PUCCH resource set may be as illustrated in Table 22 below.

TABLE 22

```
-- A set with one or more PUCCH resources
PUCCH-ResourceSet ::=      SEQUENCE {
    pucch-ResourceSetId        PUCCH-ResourceSetId,
    resourceList               SEQUENCE (SIZE (1..maxNrofPUCCH-
                               Resources PerSet)) OF
PUCCH-ResourceId,
    maxPayloadMinus1           INTEGER (4..256)
OPTIONAL -- Need R
}
```

The resourceList parameter of the table may include IDs of PUCCH resources belonging to the PUCCH resource set.

If at the time of initial access or when the PUCCH resource set is not configured, a PUCCH resource set as illustrated in Table 23, which is composed of a plurality of cell-specific PUCCH resources in the initial BWP, may be used. The PUCCH resource to be used for initial access in this PUCCH resource set may be indicated through SIB1.

TABLE 23

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | (0, 3 6, 9) |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

The maximum payload of each PUCCH resource included in the PUCCH resource set may be 2 bits in case of PUCCH format 0 or 1, and may be determined by symbol length, number of PRBs, and maximum code rate in case of the remaining formats. The symbol length and number of PRBs may be configured for each PUCCH resource, and the maximum code rate may be configured for each PUCCH format.

Next, PUCCH resource selection for UCI transmission is described. In a case of SR transmission, a PUCCH resource for an SR corresponding to schedulingRequestID may be configured through a higher layer as shown in Table 24. The PUCCH resource may be a resource belonging to PUCCH format 0 or PUCCH format 1.

TABLE 24

```
SchedulingRequestResourceConfig ::=   SEQUENCE {
    schedulingRequestResourceId       SchedulingRequestResourceId,
    schedulingRequestID               SchedulingRequestId,
    periodicityAndOffset              CHOICE {
        sym2                              NULL,
        sym6or7                           NULL,
        sl1                               NULL,              -- Recurs in every slot
        sl2                               INTEGER (0..1),
        sl4                               INTEGER (0..3),
        sl5                               INTEGER (0..4),
        sl8                               INTEGER (0..7),
        sl10                              INTEGER (0..9),
        sl16                              INTEGER (0..15),
        sl20                              INTEGER (0..19),
        sl40                              INTEGER (0..39),
        sl80                              INTEGER (0..79),
        sl160                             INTEGER (0..159),
        sl320                             INTEGER (0..319),
        sl640                             INTEGER (0..639)
    }                                 OPTIONAL,    -- Need M
    resource                          PUCCH-ResourceId    OPTIONAL    -- Need M
}
```

For the configured PUCCH resource, a transmission period and an offset are configured through the periodicity-AndOffset parameter of Table 24. When there is uplink data to be transmitted by the terminal at a time corresponding to the configured period and offset, the corresponding PUCCH resource is transmitted, otherwise the corresponding PUCCH resource may not be transmitted.

In the case of CSI transmission, a PUCCH resource for transmitting a periodic or semi-persistent CSI report through PUCCH may be configured in the pucch-CSI-ResourceList parameter as illustrated in [Table 25] as higher signaling. The parameter includes a list of PUCCH resources for each BWP for the cell or CC to which the corresponding CSI report is to be transmitted. The PUCCH resource may be a resource belonging to PUCCH format 2 or PUCCH format 3 or PUCCH format 4.

TABLE 25

```
CSI-ReportConfig ::=           SEQUENCE {
    reportConfigId                 CSI-ReportConfigId,
    carrier                        ServCellIndex     OPTIONAL, -- Need S
    ...
    reportConfigType               CHOICE
        periodic                       SEQUENCE {
            reportSlotConfig               CSI-ReportPeriodicityAndOffset,
            pucch-CSI-ResourceList         SEQUENCE (SIZE (1..maxNrofBWPs)) OF PUCCH-CSI-Resource
        },
        semiPersistentOnPUCCH          SEQUENCE {
            reportSlotConfig               CSI-ReportPeriodicityAndOffset,
            pucch-CSI-ResourceList         SEQUENCE (SIZE (1..maxNrofBWPs)) OF PUCCH-CSI-Resource
        },
        ...
}
```

For the PUCCH resource, a transmission period and an offset are configured through reportSlotConfig of Table 25.

In the case of HARQ-ACK transmission, a resource set of PUCCH resources to be transmitted is first selected according to the payload of the UCI including the corresponding HARQ-ACK. That is, a PUCCH resource set having a minimum payload not smaller than the UCI payload is selected. Next, the PUCCH resource in the PUCCH resource set can be selected through the PUCCH resource indicator (PRI) in the DCI scheduling the TB corresponding to the corresponding HARQ-ACK, and the PRI may be the PUCCH resource indicator specified in Table 5 or Table 6. The relationship between the PRI configured as higher signaling and the PUCCH resource selected from the PUCCH resource set may be as illustrated in Table 26.

TABLE 26

| PUCCH resource indicator | PUCCH resource |
|---|---|
| '000' | $1^{st}$ PUCCH resource provided by pucch-ResourceId obtained from the $1^{st}$ value of resourceList |

TABLE 26-continued

| PUCCH resource indicator | PUCCH resource |
|---|---|
| '001' | $2^{nd}$ PUCCH resource provided by pucch-ResourceId obtained from the $2^{nd}$ value of resourceList |

TABLE 26-continued

| PUCCH resource indicator | PUCCH resource |
|---|---|
| '010' | $3^{rd}$ PUCCH resource provided by pucch-ResourceId obtained from the $3^{rd}$ value of resourceList |
| '011' | $4^{th}$ PUCCH resource provided by pucch-ResourceId obtained from the $4^{th}$ value of resourceList |
| '100' | $5^{th}$ PUCCH resource provided by pucch-ResourceId obtained from the $5^{th}$ value of resourceList |
| '101' | $6^{th}$ PUCCH resource provided by pucch-ResourceId obtained from the $6^{th}$ value of resourceList |
| '110' | $7^{th}$ PUCCH resource provided by pucch-ResourceId obtained from the $7^{th}$ value of resourceList |
| '111' | $8^{th}$ PUCCH resource provided by pucch-ResourceId obtained from the $8^{th}$ value of resourceList |

If the number of PUCCH resources in the selected PUCCH resource set is greater than 8, the PUCCH resource may be selected by the following equation 1.

$$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases}$$

[Equation 1]

In the above equation 1, $r_{PUCCH}$ is the index of the selected PUCCH resource in the PUCCH resource set, $R_{PUCCH}$ is the number of PUCCH resources belonging to the PUCCH resource set, $\Delta_{PRI}$ is the PRI value, $N_{CCE,p}$ is the total number of CCEs of the CORESET p to which the receiving DCI belongs, and $n_{CCE,p}$ is the first CCE index for the receiving DCI.

The time point at which the corresponding PUCCH resource is transmitted is after the $K_1$ slot from the TB transmission corresponding to the corresponding HARQ-ACK. The $K_1$ value candidate is configured as an upper layer, and more specifically, is configured in the dl-DataToUL-ACK parameter in the PUCCH-Config specified in [Table 21]. The $K_1$ value of one of these candidates may be selected by the PDSCH-to-HARQ feedback timing indicator in the DCI scheduling the TB, and this value may be a value specified in Table 5 or Table 6. Meanwhile, the unit of the $K_1$ value may be a slot unit or a sub slot unit. Here, a sub slot is a unit of a length smaller than that of a slot, and one or a plurality of symbols may constitute one sub slot.

Next, a case where two or more PUCCH resources are located in one slot is described. The terminal can transmit UCI through one or two PUCCH resources in one slot or sub slot, and when UCI is transmitted through two PUCCH resources in one slot/sub slot, i) each PUCCH resource does not overlap in units of symbols, and ii) at least one PUCCH resource may be a short PUCCH. Meanwhile, the terminal may not expect to transmit a plurality of PUCCH resources for HARQ-ACK transmission within one slot.

Next, it is described for the PUCCH transmission procedure when two or more PUCCH resources overlap. When two or more PUCCH resources are overlapped, one of the overlapping PUCCH resources may selected or a new PUCCH resource may be selected according to the condition that the transmitted PUCCH resource should not overlap in symbol units. In addition, the UCI payload transmitted through the overlapping PUCCH resource may be multiplexed and transmitted or some may be dropped. First, the case where multi-slot repetition is not configured in PUCCH resource (case 1) and multi-slot repetition (case 2) is configured are described.

When the PUCCH resource is overlapped for Case 1, Case 1 is divided into Case 1-1) a case where two or more PUCCH resources for HARQ-ACK transmission are overlapped, and Case 1-2) the remaining cases.

Figure 9:
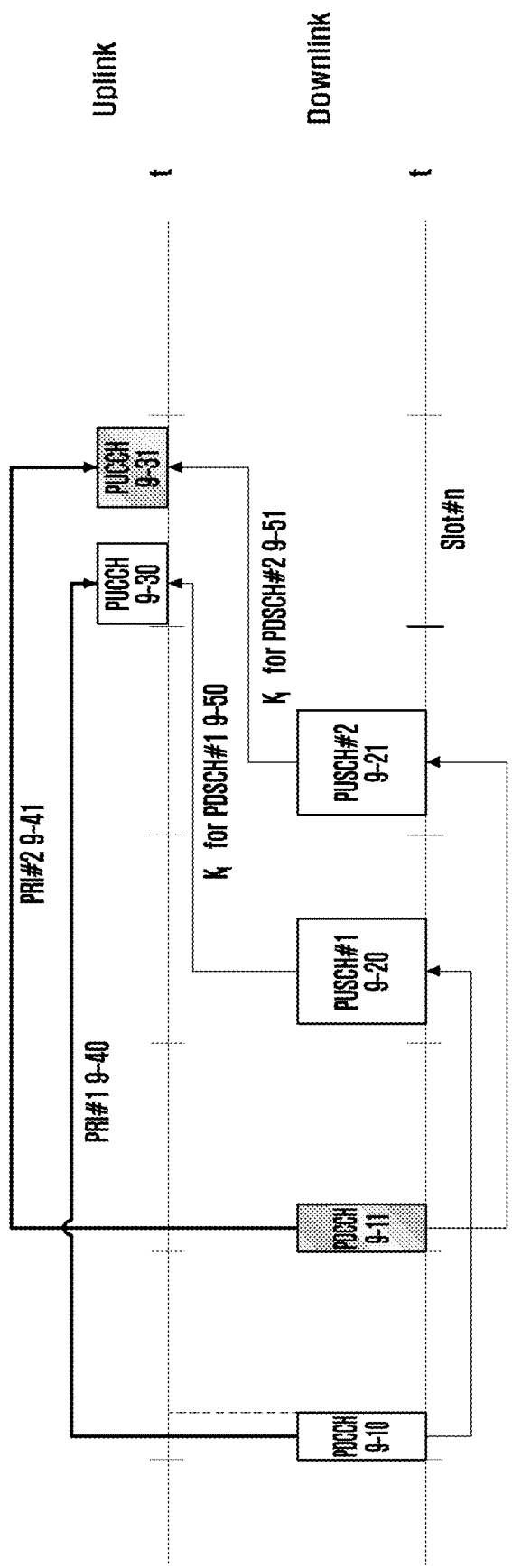
FIG. 9 is a view illustrating a case of overlapping a plurality of PUCCH resources for HARQ-ACK transmission for PDSCH when multi-slot repetition is not configured according to an embodiment.

The case corresponding to Case 1-1 is shown in FIG. 9.

FIG. 9 is a view illustrating a case of overlapping a plurality of PUCCH resources for HARQ-ACK transmission for PDSCH when multi-slot repetition is not configured according to an embodiment. Referring to FIG. 9, for two or more different PDCCHs 9-10 and 9-11 scheduling the PDSCH, when the transmission slots of the PUCCH resources corresponding to each PDCCH are the same, the corresponding PUCCH resources may be considered to be overlapped with each other. That is, when the uplink slots corresponding to the $K_1$ values 9-50 and 9-51 indicated by a plurality of PDCCHs are the same, the PUCCH resources corresponding to the corresponding PDCCHs may be considered as overlapping each other.

In this case, between the PUCCH resources indicated by the PRIs 9-40 and 9-41 in the PDCCH, only the PUCCH resource 9-31 selected based on the PRI 9-41 corresponding to the PDCCH 9-11 transmitted at the last point is selected, and HARQ-ACK information is transmitted on the PUCCH resource. Therefore, HARQ-ACK information for PDSCH 9-21, HARQ-ACK information for other PUCCH 9-30 overlapping with the PUCCH resource 9-31 are all transmitted after being encoded by the defined HARQ-ACK codebook through the selected PUCCH resource 9-31.

Next, for the Case 1-2, a case in which the PUCCH resource for HARQ-ACK transmission and the PUCCH resource for SR and/or CSI transmission overlap, or a case where a plurality of PUCCH resources for SR and/or CSI transmission overlap is described. In the above case, when a plurality of PUCCH resources transmitted in the same slot overlap more than one symbol in the time axis, it is defined that the corresponding PUCCH resource overlaps, and whether or not multiplexing UCIs within these resources can be summarized as shown in Table 27 below.

TABLE 27

| PUCCH 1 PUCCH 2 | SR | HARQ-ACK | CSI |
|---|---|---|---|
| SR | — | Case 1-2-1 (Multiplex or not depending on PUCCH format) | Always multiplex |
| HARQ-ACK | | Always multiplex (HARQ-ACK codebook) | Case 1-2-2 (Multiplex or not by higher layer) |
| CSI | Always multiplex | Case 1-2-2 | Case 1-2-2 |

According to the above table, when the PUCCH resources to which the HARQ-ACK transmitted overlap, or when the PUCCHs through which SR and CSI are transmitted overlap, these UCIs are always multiplexed.

Meanwhile, when each PUCCH resource to which SR and HARQ-ACK are transmitted overlap, that is, in the case of Case 1-2-1, whether or not UCI multiplexing is performed according to the format of the PUCCH resource is divided as follows.

SR on PUCCH format 0+HARQ-ACK on PUCCH format 1: SR is dropped and only HARQ-ACK is transmitted
The remaining cases: SR and HARQ-ACK are both multiplexed In addition, the remaining cases corresponding to Case 1-2-2, that is, when the HARQ-ACK and the CSI overlap between the PUCCH resource is transmitted, or when the overlap between a plurality of PUCCH resources in which CSI is transmitted, the multiplexing of these UCIs may follow the higher layer configuration. In addition, whether to multiplex between HARQ-ACK and CSI and whether to multiplex between multiple CSIs may be independently performed.

For example, whether HARQ-ACK and CSI are multiplexed may be configured through simultaneous HARQ-ACK-CSI parameters for each PUCCH format 2, 3, or 4, and the corresponding parameters may all be configured to the same value for the PUCCH format. If it is configured not to perform multiplexing through the above parameter, only HARQ-ACK is transmitted and the overlapping CSI may be dropped. In addition, whether to multiplex a plurality of CSIs may be configured through a multi-CSI-PUCCH-ResourceList parameter in PUCCH-Config. That is, when the multi-CSI-PUCCH-ResourceList parameter is configured, inter-CSI multiplexing may be performed. Otherwise, only a PUCCH corresponding to a CSI having a higher priority may be transmitted according to the inter-CSI priority.

When UCI multiplexing is performed as described above, the selection method of the PUCCH resource to transmit the corresponding UCI resource and the multiplexing method may differ according to the information of the overlapped UCI and the format of the PUCCH resource, which can be summarized as shown in Table 28 below.

TABLE 28

| | SR | HARQ-ACK | | CSI |
|---|---|---|---|---|
| PUCCH 1 PUCCH 2 | (format 0/1) | Format 1 | Format 0/2/3/4 | (format 2/3/4) |
| SR (format 0/1) | — | Option 1 | Option 2 | Option 3 |
| HARQ-ACK Format 1 | Option 1 | Option 4 | Option 4 | Option 5 (grant-based) Option 6 (SPS) |
| Format 0/2/3/4 | Option 2 | Option 4 | Option 4 | Option 5 (grant-based) Option 6 (SPS) |
| CSI (format 2/3/4) | Option 3 | Option 5 (grant-based) Option 6 (SPS) | Option 5 (grant-based) Option 6 (SPS) | Option 7 |

Each option in the above table is as follows.

Option 1: The terminal makes different PUCCH resource selection according to the SR value of the HARQ-ACK PUCCH resource and the overlapped SR PUCCH resource. That is, if the SR value is positive, PUCCH resource for SR is selected, and if the SR value is negative, PUCCH resource for HARQ-ACK is selected. HARQ-ACK information is transmitted to the selected PUCCH resource.

Option 2: The terminal transmits by multiplexing HARQ-ACK information and SR information to PUCCH resource for HARQ-ACK transmission.

Option 3: The terminal transmits by multiplexing SR information and CSI to PUCCH resource for CSI transmission.

Option 4: PUCCH resource transmission for overlapping between HARQ-ACK. Detailed operation has been described in case (1-1).

Option 5: If the PUCCH resource for HARQ-ACK corresponding to the PDSCH scheduled as PDCCH and the PUCCH resource for CSI transmission are overlapped, and when the multiplexing between HARQ-ACK and CSI is configured as the upper layer, the terminal multiplexes and transmits HARQ-ACK information and CSI information to a PUCCH resource for HARQ-ACK.

Option 6: When the PUCCH resource for HARQ-ACK corresponding to the semi-persistent scheduling (SPS) PDSCH and the PUCCH resource for CSI transmission are overlapped and the multiplexing between HARQ-ACK and CSI is configured as the upper layer, the terminal multiplexes and transmits HARQ-ACK information and CSI information to a PUCCH resource for CSI transmission.

If the PUCCH resource list for multiplexing to the upper layer, that is, multi-CSI-PUCCH-ResourceList is configured, the terminal selects one of the resources in the list with the lowest index capable of transmitting all the multiplexed UCI payloads, and then UCI Send the payload. If there is no resource capable of transmitting all of the multiplexed UCI payloads in the list, the terminal selects the resource with the largest index and then transmits HARQ-ACK and CSI reports as many as the number of transmittable to the resource.

Option 7: When multiple CSI transmission PUCCH resources are overlapped and multiplexing between multiple CSIs is configured as an upper layer, the terminal selects one resource having the lowest index capable of transmitting all of the multiplexed UCI payloads in the PUCCH resource list for CSI multiplexing configured as a higher layer, that is, multi-CSI-PUCCH-ResourceList, and then transmits the UCI payload. If there is no resource capable of transmitting all of the multiplexed UCI payloads in the list, the terminal selects the resource with the largest index and then transmits as many CSI reports as possible to the corresponding resource.

In the above, for the convenience of description, the focus has dealt with the case where two PUCCH resources are overlapped, but the method may be similarly applied even when three or more PUCCH resources overlap. For example, if SR+HARQ-ACK multiplexed PUCCH resource and CSI PUCCH resource overlap, the multiplexing method between HARQ-ACK and CSI can be followed.

If it is configured not to perform multiplexing between specific UCIs, UCI with a higher priority is transmitted according to the priority in the order of HARQ-ACK>SR>CSI, and UCI with a lower priority may be dropped. When multiple CSI PUCCH resources are configured not to perform multiplexing when overlapping, PUCCH corresponding to the high priority CSI is transmitted, and PUCCH corresponding to other CSI may be dropped.

Next, Case 2, which is a case when multi-slot repetition is configured, is divided into cases where two or more PUCCH resources for HARQ-ACK transmission are located in the same start slot (Case 2-1) and the other cases (Case 2-2). Each case is shown in FIG. 10.

Figure 10:
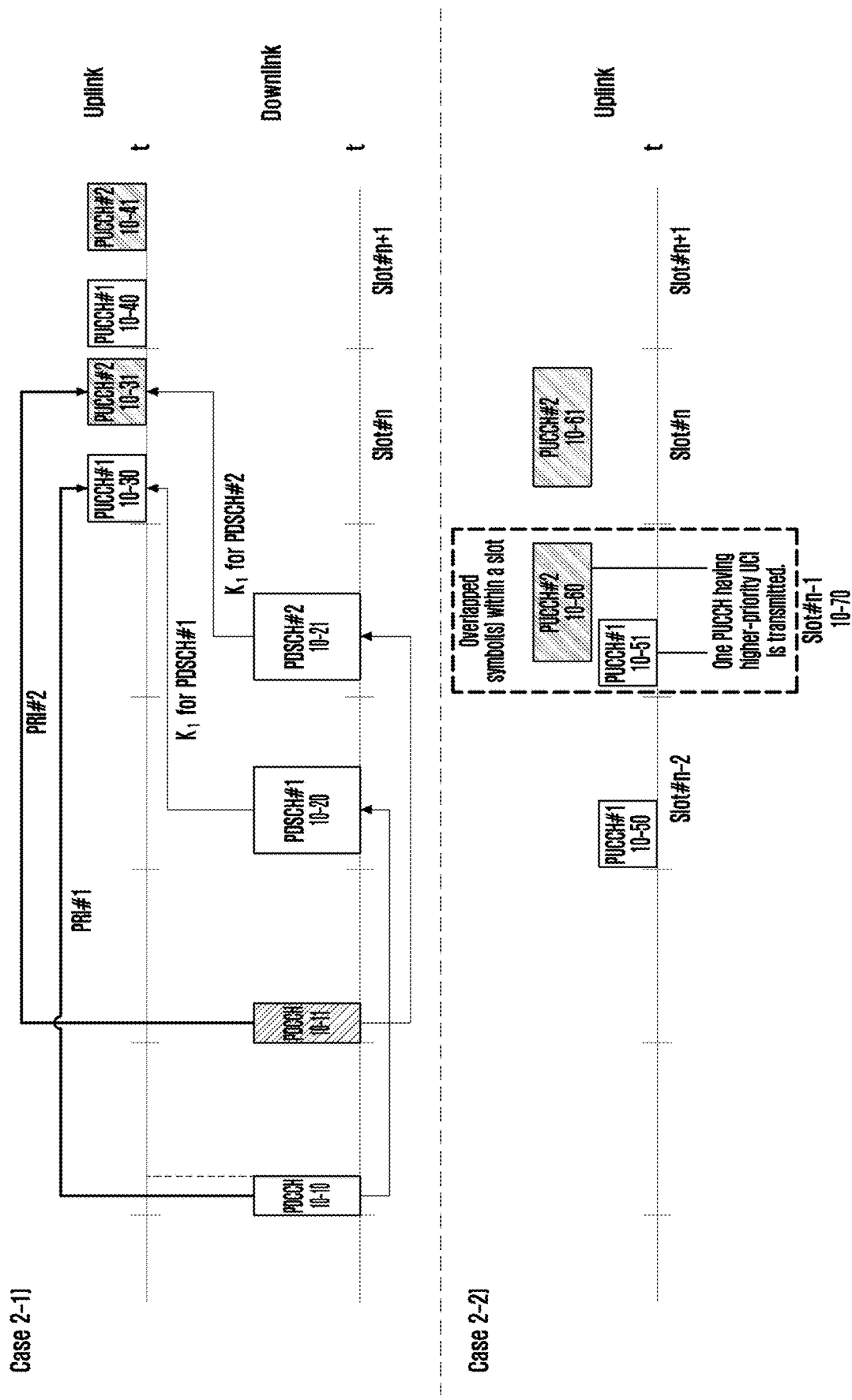
FIG. 10 is a view illustrating a case in which a PUCCH resource overlaps when multi-slot repetition is configured according to an embodiment.

FIG. 10 is a view illustrating a case in which a PUCCH resource overlaps when multi-slot repetition is configured according to an embodiment.

Referring to Case 2-1), when multi-slot repetition is configured in the PUCCH resource for HARQ-ACK, that is, when PUCCH #1 is repeatedly transmitted over multiple slots 10-30 and 10-40 and PUCCH #2 is also repeatedly transmitted over multiple slots 10-31 and 10-41, if the start slots of the two PUCCHs indicated by $K_1$ are the same, a single PUCCH resource (PUCCH transmitted at the latest time in one slot), that is, PUCCH #2, may be selected in the same manner as in Case 1-1). Accordingly, HARQ-ACK information corresponding to PDSCH #1 and PDSCH #2 is multiplexed and transmitted to the PUCCH through the HARQ-ACK codebook.

For the convenience of description, a case in which a plurality of PUCCHs subjected to multi-slot repetition are overlapped is exemplified, but the same method may be applied when overlapping between the multi-slot repetition PUCCH and the PUCCH transmitted in a single slot.

Case 2-2) corresponds to a case in which a symbol unit overlap occurs between PUCCH for HARQ-ACK transmission and PUCCH for SR or CSI transmission, or between PUCCHs for multiple SR or CSI transmission. That is, when PUCCH #1 is repeatedly transmitted over multiple slots 10-50 and 10-51 and PUCCH #2 is also repeatedly transmitted over multiple slots 10-60 and 10-61, PUCCH #1 and PUCCH #2 corresponds to the case where more than one symbol overlap occurs in one slot 10-70.

Between PUCCHs in which more than one symbol overlap occurs in the corresponding slot 10-70, by comparing the priority between UCIs in the PUCCH, UCI with higher priority is transmitted, and other UCIs are dropped in the corresponding slot. In this case, the priority between the UCI follows HARQ-ACK>SR>CSI in the highest order.

In addition, when a plurality of CSI PUCCH resources overlap, the PUCCH corresponding to the high priority CSI may be transmitted, and the PUCCH corresponding to another CSI may be dropped in the corresponding slot. PUCCH transmission or drop according to the above-described priority is performed only in the slot where the overlap per symbol has occurred, and is not performed in other slots. That is, the PUCCH in which multi-slot repetition is configured may be dropped in the slot where the symbol unit overlap occurs, but may be transmitted as set in the remaining slots.

In the above case, for the convenience of description, a case in which a plurality of PUCCHs subjected to multi-slot repetition are overlapped is exemplified, but the same method may also be applied when overlapping between the multi-slot repetition PUCCH and the PUCCH transmitted in a single slot.

In addition, the overlap between the PUCCH and PUSCH transmission is described. If the terminal transmits PUCCH in the first slot of the repeated transmission of $N_{PUCCH}^{repeat}>$, transmits the PUSCH in the second slot.

When PUCCH transmission is overlapped with PUSCH transmission in one or a plurality of slots, and when UCIs are multiplexed in PUSCH in overlapped slots, the terminal transmits PUCCH and does not transmit PUSCH in slots in which PUCCH and PUSCH overlap.

In the single slot transmission and multi-slot repetition of the PUCCH, the above-described slot for low-latency services such as URLLC may be replaced with a mini-slot and used. A mini-slot has a shorter length on the time axis than a slot, and one mini-slot may consist of fewer than 14 symbols. For example, 2 or 7 symbols may constitute one mini-slot. When a mini-slot is configured through an upper layer or the like, units such as the HARQ-ACK feedback timing K1 value and the number of repetitive transmissions may be replaced by mini-slot units in the existing slot. Mini-slot configuration may be applied to all PUCCH transmissions or may be limited to PUCCH transmission for a specific service. For example, slot unit transmission may be applied to PUCCH for eMBB service, whereas mini-slot unit transmission may be applied to PUCCH for URLLC service.

Next, beam configuration to be applied to PUCCH transmission is described. If the terminal does not have a terminal-specific configuration for PUCCH resource configuration (dedicated PUCCH resource configuration), the PUCCH resource set is provided through the upper signaling, pucch-ResourceCommon, in this time, the beam configuration for PUCCH transmission follows the beam configuration used in PUSCH transmission scheduled through the random access response (RAR) UL grant. If the terminal has a terminal-specific configuration for PUCCH resource configuration (dedicated PUCCH resource configuration), the beam configuration for PUCCH transmission is provided through pucch-spatialRelationInfoId, which is the higher level signaling illustrated in Table 29. If the terminal has been configured with one pucch-spatialRelationInfoId, beam configuration for PUCCH transmission of the terminal is provided through one pucch-spatialRelationInfoId. If the terminal is configured with a plurality of pucch-spatialRelationInfoIDs, the terminal is instructed to activate one of the plurality of pucch-spatialRelationInfoIDs through a MAC control element (CE). The terminal may receive up to eight pucch-spatialRelationInfoIDs through higher-level signaling, and may receive an indication that only one pucch-spatialRelationInfoID is activated among them.

When the terminal is instructed to activate any pucch-spatialRelationInfoID through the MAC CE, the terminal applies pucch-spatialRelationInfoID activation through MAC CE from a slot that first appears after $3N_{slot}^{subframe,\mu}$ slot from a slot in which HARQ-ACK transmission for a PDSCH that transmits MAC CE including activation information for pucch-spatialRelationInfoID. In the above, μ is a neurology applied to PUCCH transmission, and $N_{slot}^{subframe,\mu}$ is the number of slots per subframe in a given neurology. The upper layer composition for pucch-spatialRelationInfo may be as shown in Table 29 below. The pucch-spatialRelationInfo may be interchangeable with PUCCH beam information.

TABLE 29

```
PUCCH-SpatialRelationInfo ::= SEQUENCE {
    pucch-SpatialRelationInfoId    PUCCH-SpatialRelationInfoId,
    servingCellId                  ServCellIndex              OPTIONAL, --
Need S
    referenceSignal                CHOICE {
        ssb-Index                      SSB-Index,
```

TABLE 29-continued

| csi-RS-Index | NZP-CSI-RS-ResourceId, |
| srs | SEQUENCE { |
| SRS-ResourceId, | resource |
| | uplinkBWP    BWP-Id |
| }, | } |
| pucch-PathlossReferenceRS-Id | PUCCH-PathlossReferenceRS-Id, |
| p0-PUCCH-Id | P0-PUCCH-Id, |
| closedLoopIndex | ENUMERATED { i0, i1 } |
| } | |
| PUCCH-SpatialRelationInfoId ::= INTEGER (1..maxNrofSpatialRelationInfos) | |

According to Table 29, one referenceSignal configuration may exist in a specific pucch-spatialRelationInfo configuration, and the referenceSignal is ssb-Index indicating a specific SS/PBCH, csi-RS-Index indicating a specific CSI-RS, or srs indicating a specific SRS. If the referenceSignal is configured as ssb-Index, the terminal configures the beam used when receiving the SS/PBCH corresponding to the ssb-Index among SS/PBCHs in the same serving cell as the beam for PUCCH transmission, or if servingCellId is provided a beam used when receiving an SS/PBCH corresponding to an ssb-Index among SS/PBCHs in a cell indicated by servingCellId may be configured as a beam for pucch transmission. If the referenceSignal is configured as csi-RS-Index, the terminal configures the beam used when receiving a CSI-RS corresponding to csi-RS-Index among CSI-RSs in the same serving cell as a beam for PUCCH transmission, or if servingCellId is provided, a beam used when receiving a CSI-RS corresponding to csi-RS-Index among CSI-RSs in a cell indicated by servingCellId may be configured as a beam for pucch transmission. If the referenceSignal is configured to srs, the terminal configures the transmission beam used when transmitting the SRS corresponding to the resource index provided as a higher signaling resource in the same serving cell and/or in the activated uplink BWP as the beam for PUCCH transmission, or if the servingCellID and/or uplinkBWP are/is provided, the transmission beam used when transmitting the SRS corresponding to the resource index provided through the higher signaling resource in the cell indicated by the servingCellID and/or uplinkBWP and/or in the uplink BWP may be configured as a beam for PUCCH transmission.

One pucch-PathlossReferenceRS-Id configuration may exist in a specific pucch-spatialRelationInfo configuration. PUCCH-PathlossReferenceRS of Table 30 may be mapped with pucch-PathlossReferenceRS-Id of [Table 29], and up to 4 may be configured through pathlossReferenceRSs in the upper signaling PUCCH-PowerControl of Table 30. If the PUCCH-PathlossReferenceRS is connected to the SS/PBCH through the referenceSignal of Table 30, ssb-Index is configured, and if PUCCH-PathlossReferenceRS is connected to CSI-RS, csi-RS-Index is configured.

TABLE 30

| PUCCH-PowerControl ::= | SEQUENCE { | |
| deltaF-PUOCH-f0 | INTEGER (−16..15) | OPTIONAL, -- Need R |
| deltaF-PUOCH-f1 | INTEGER (−16..15) | OPTIONAL, -- Need R |
| deltaF-PUCCH-f2 | INTEGER (−16..15) | OPTIONAL, -- Need R |
| deltaF-PUCCH-f3 | INTEGER (−16..15) | OPTIONAL, -- Need R |
| deltaF-PUCCH-f4 | INTEGER (−16..15) | OPTIONAL, -- Need R |
| p0-Set | SEQUENCE (SIZE (1..maxNrofPUCCH-P0-PerSet)) OF | |
| P0-PUCCH OPTIONAL, -- Need M | | |
| pathlossReferenceRSs | | SEQUENCE (SIZE |
| (1..maxNrofPUCCH-PathlossReferenceRSs)) OF PUCCH-PathlossReferenceRS | | OPTIONAL, — |
| Need M | | |
| twoPUCCH-PC-AdjustmentStates | ENUMERATED {twoStates} | OPTIONAL, -- Need |
| S | | |
| ... | | |
| } | | |
| P0-PUCCH ::= | SEQUENCE { | |
| p0-PUCCH-Id | P0-PUCCH-Id, | |
| p0-PUCCH-Value | INTEGER (−16..15) | |
| } | | |
| P0-PUCCH-Id ::= | INTEGER (1..8) | |
| PUCCH-PathlossReferenceRS ::= | SEQUENCE { | |
| pucch-PathlossReferenceRS-Id | PUCCH-PathlossReferenceRS-Id, | |
| referenceSignal | CHOICE { | |
| ssb-Index | SSB-Index, | |
| csi-RS-Index | NZP-CSI-RS-ResourceId | |
| } | } | |
| } | | |

During uplink transmission of the terminal, when switching from the transmit OFF state to the transmit ON state, a transition time may be required to satisfy the transmit power requirement condition of the ON state. In addition, when switching from transmit ON state to transmit OFF state, a transition time may be required to satisfy the transmit power requirement of OFF state. Alternatively, a switching time may be required even when the transmit power change or transmit RB change or hopping occurs in the transmit ON state.

Figure 11:
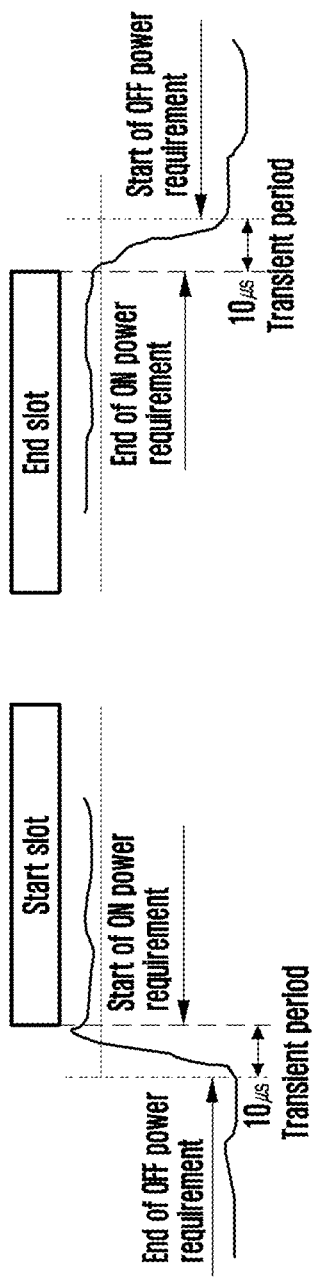
FIG. 11 is a view illustrating a switching time required for switching between a transmit OFF state and a transmit ON state during uplink transmission of a terminal according to an embodiment.
Figure 11:
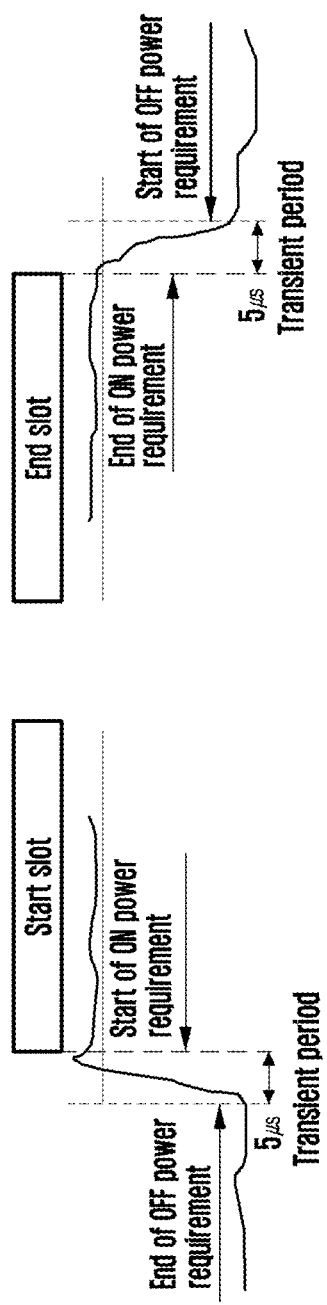

FIG. 11 illustrates a switching time required for switching between a transmit OFF state and a transmit ON state.

Referring to FIG. 11, the switching time may be defined for frequency range 1 (FR1) and frequency range 2 (FR2), respectively (11-05, 11-10).

Figure 12:
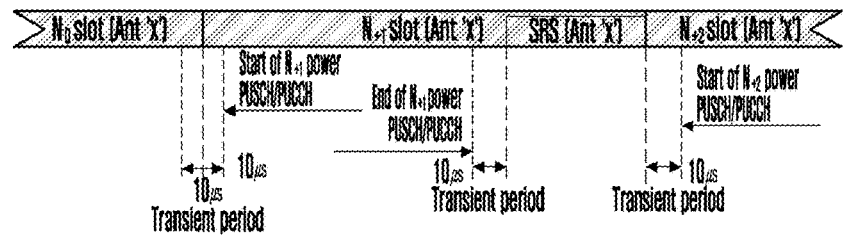
FIG. 12 is a view illustrating a switching time required for transmission power change, transmission RB change, or hopping in frequency range 1 (FR1) according to an embodiment.
Figure 12:
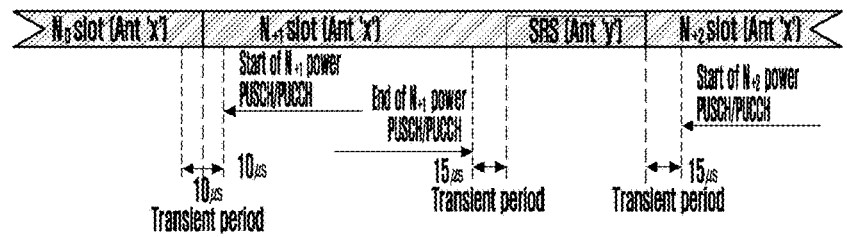
Figure 12:
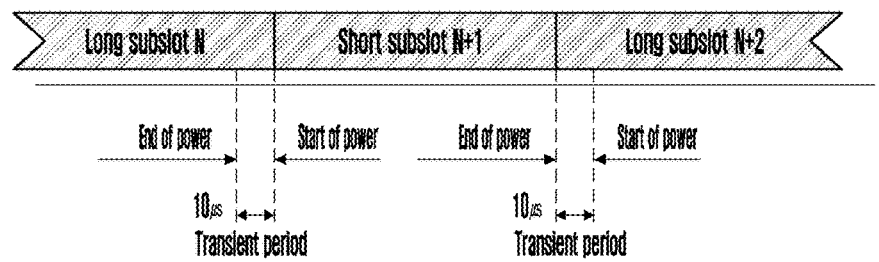
Figure 12:
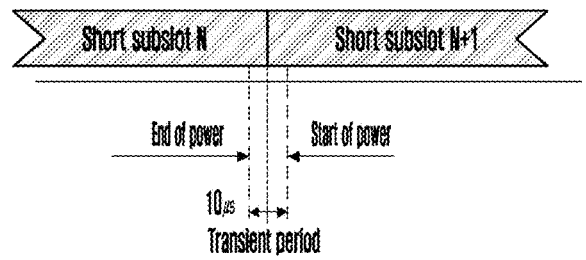
Figure 12:
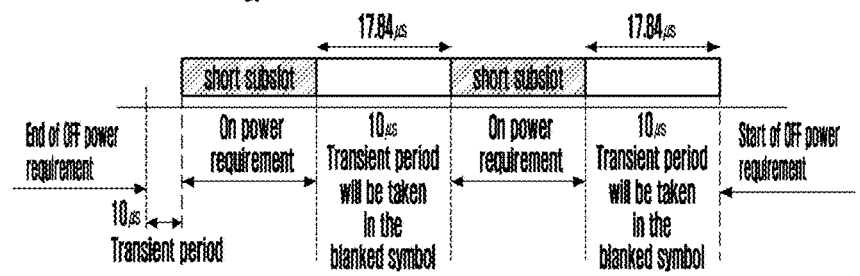

FIG. 12 illustrates a switching time required for transmission power change, transmission RB change, or hopping in frequency range 1 (FR1) in a transmission ON state.

Referring to FIG. 12, when a transmission channel is changed, a switching time for when a transmission power change, a transmission RB change, or hopping is involved may be defined as 12-05 and 12-10. Depending on whether SRS sounding is performed through the same antenna port as another channel (12-05) or through a different antenna port (12-10), the switching time between the SRS channel and other channels may be differently defined.

Meanwhile, when transmission power change or transmission RB change or hopping is involved, different switching times may be defined according to the length of the transmission channel before and after the change/hopping (12-15, 12-20, 12-25).

In the case of transmission power change or transmission RB change or hopping between long subslot transmission and short subslot transmission, the transition time can be defined within the long subslot (12-15). When transmission power change or transmission RB change or hopping between short subslot transmissions is involved, transition times can be defined between short subslots (12-20, 12-25), when the numerology is less than 60 kHz in FR1, blank symbol does not need to be configured between short subslots (12-20), whereas when the numerology is 60 kHz in FR1, blank symbol between short subslots needs to be configured (12-25).

The long subslot may indicate PUSCH transmission or long PUCCH transmission in which the number of transmission symbols is greater than 2, and the short subslot may indicate PUSCH transmission or short PUCCH transmission in which the number of transmission symbols is 2 or less.

Figure 13:
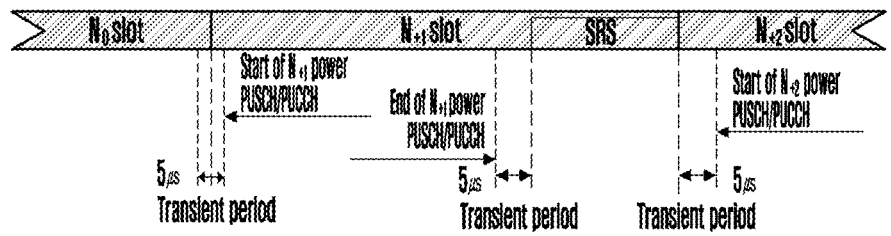
FIG. 13 is a view illustrating a switching time required for transmission power change, or transmission RB change, or hopping in frequency range 2 (FR2) according to an embodiment.
Figure 13:
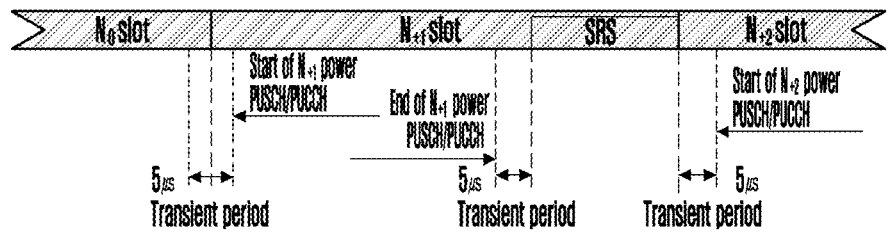
Figure 13:
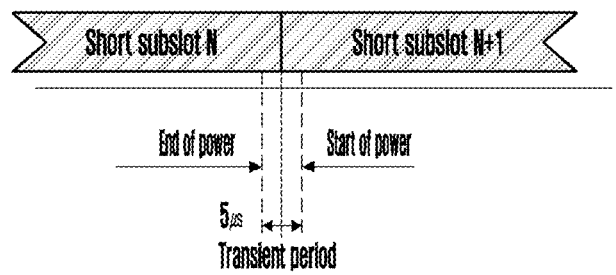
Figure 13:
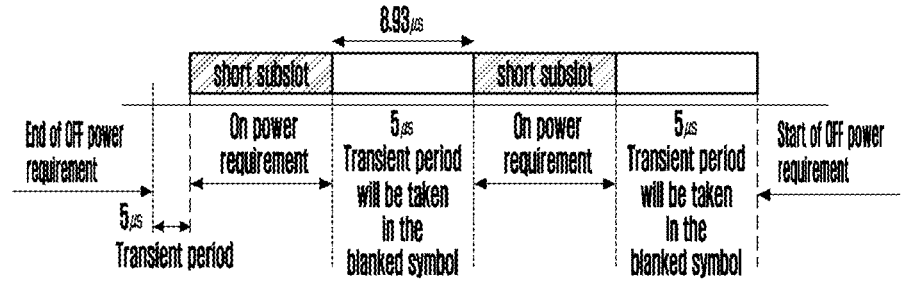

FIG. 13 illustrates a switching time required for transmission power change, transmission RB change, or hopping in frequency range 2 (FR2) in a transmission ON state.

Referring to FIG. 13, when a transmission channel is changed, a switching time for when a transmission power change or a transmission RB change or hopping is accompanied may be defined as (13-05).

Meanwhile, when transmission power change or transmission RB change or hopping is involved, different switching times may be defined according to the length of the transmission channel before and after the change/hopping (13-10, 13-15, 13-20).

When transmission power change or transmission RB change or hopping between long subslot transmission and short subslot transmission is involved, the switching time may be defined within the long subslot (13-10).

When transmission power change or transmission RB change or hopping between short subslot transmissions is involved, transition times can be defined between short subslots (13-15, 13-20), and when the numerology is less than 120 kHz in FR2, blank symbols between short subslots do not need to be configured (13-15), whereas when the numerology is 120 kHz in FR2, blank symbols between short subslots need to be configured (13-20).

The long subslot may indicate PUSCH transmission or long PUCCH transmission in which the number of transmission symbols is greater than 2, and the short subslot may indicate PUSCH transmission or short PUCCH transmission in which the number of transmission symbols is 2 or less.

In an LTE system and an NR system, the terminal may perform a procedure of reporting the capability supported by the terminal to the corresponding base station while connected to the serving base station. In the description below, this may be referred to as terminal capability (report). The base station may deliver a terminal capability enquiry message requesting a capability report to the terminal in the connected state. In the message, the base station may include a terminal capability request for each RAT type. The request for each RAT type may include requested frequency band information.

In addition, the terminal capability enquiry message may request a plurality of RAT types from one RRC message container, or may include a terminal capability enquiry message including a request for each RAT type multiple times to the terminal. That is, the terminal capability enquiry is repeated a plurality of times, and the terminal may configure a corresponding terminal capability information message and report that message multiple times. In a next-generation mobile communication system, a terminal capability enquiry for MR-DC including NR, LTE, and EN-DC can be made. For reference, the terminal capability enquiry message is generally sent initially after the terminal connects, but the terminal capability can be requested under any conditions when the base station is required.

In the above step, the terminal receiving the terminal capability report request from the base station may configure the terminal capability according to the RAT type and band information requested from the base station. In the NR system, a method for the terminal to configure terminal capability may include at least one of the following methods.

1. If the terminal receives a list of LTE and/or NR bands as a terminal capability enquiry from the base station, the terminal may configure a band combination (BC) for EN-DC and NR standalone (SA). That is, a BC candidate list for EN-DC and NR SA may be configured based on the bands requested by the base station as FreqBandList. In addition, the priorities of the bands may have priorities in the order described in FreqBandList.
2. If the base station requests terminal capability report by setting the "eutra-nr-only" flag or "eutra" flag, the terminal may completely remove the NR SA BCs from the candidate list of the configured BC. This operation may be performed only when the LTE base station (eNB) requests "eutra" capability.
3. Thereafter, the terminal may remove fallback BCs from the BC candidate list configured in the above step. Here, the fallback BC corresponds to a case in which a band corresponding to at least one SCell is removed from a super set BC, and can be omitted because super set BC can already cover fallback BC. This step also applies to MR-DC, that is, the step can also be applied to LTE bands. BCs remaining after this stage are the final "list of candidate BCs".
4. The terminal selects BCs to be reported by selecting BCs suitable for the requested RAT type from the final "candidate BC list". In this step, the terminal may configure a supportedBandCombinationList in a predetermined order. That is, the terminal configures the BC and UE capabilities to be reported in accordance with the order of the preset rat-Type. (nr→eutra-nr→eutra). In addition, featureSetCombination for the configured supportedBandCombinationList can be configured, and a list of "candidate feature set combinations" can be configured from the candidate BC list from which the list for fallback BC (including the capability of the same or lower level) is removed. The "candidate feature set combination" includes both a feature set combination for NR and EUTRA-NR BC, and can be obtained from a feature set combination of UE-NR-Capabilities and UE-MRDC-Capabilities containers.

5. Also, if the requested rat Type is eutra-nr and has an effect, featureSetCombinations can be included in both containers of UE-MRDC-Capabilities and UE-NR-Capabilities. However, the NR feature set may be included only in UE-NR-Capabilities.

After the terminal capability is configured, the terminal transmits a terminal capability information message including terminal capability to the base station. The base station then performs appropriate scheduling and transmission/reception management to the corresponding terminal based on the terminal capability received from the terminal.

Figure 14:
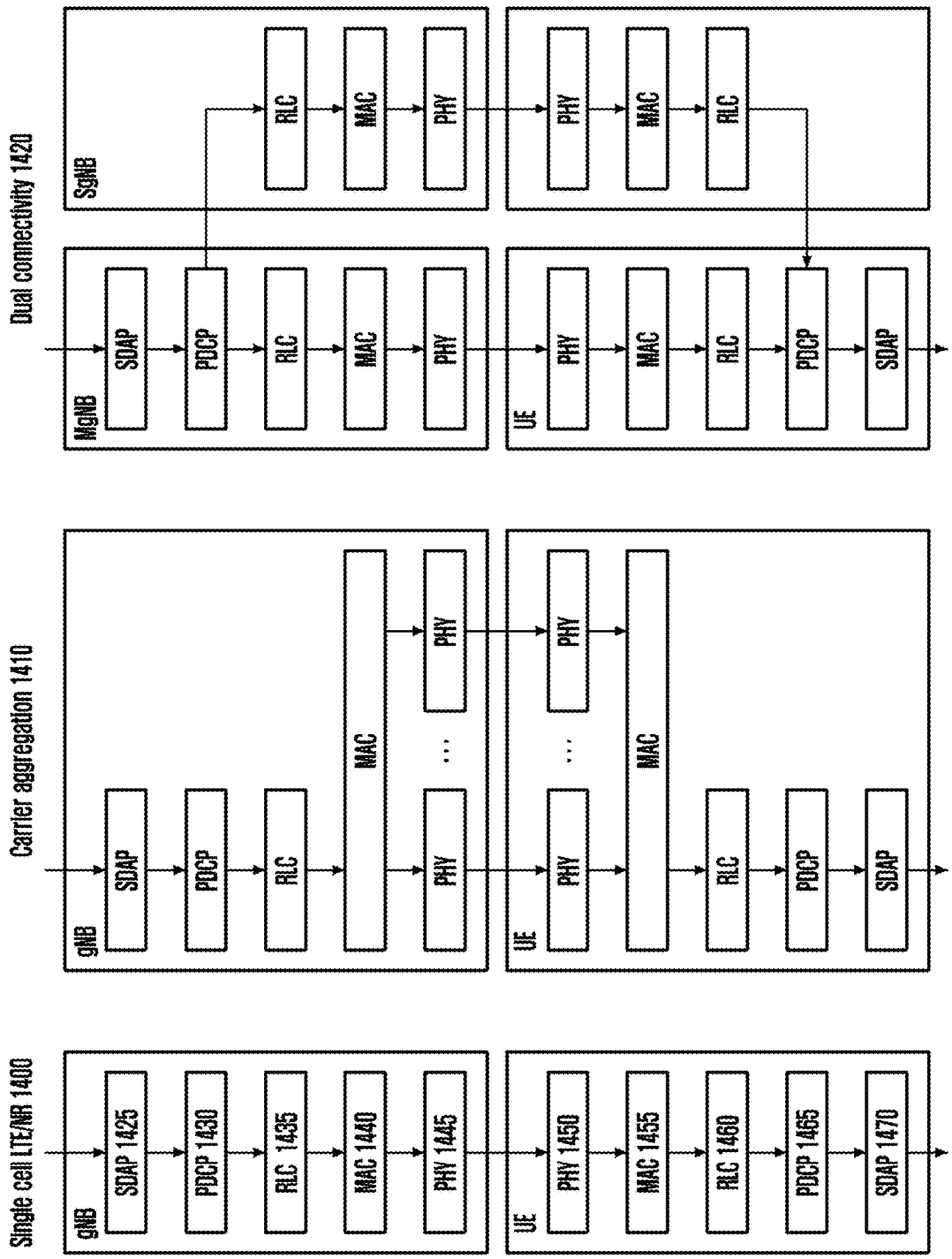
FIG. 14 is a view illustrating a structure of a base station and a terminal radio protocol when performing single cell, carrier aggregation, and dual connectivity according to an embodiment.

FIG. 14 is a view illustrating a structure of base station and terminal radio protocols when performing single cell, carrier aggregation, and dual connectivity according to an embodiment.

Referring to FIG. 14, the radio protocols of the next-generation mobile communication system include NR service data adaptation protocols (NR SDAPs) 1425 and 1470, NR packet data convergence protocols (NR PDCPs) 1430 and 1465, NR radio link controls (NR RLCs) 1435 and 1460, and NR medium access controls (NR MACs) 1440 and 1455 at both terminal and NR base station.

The main functions of the NR SDAP 1425 and 1470 may include some of the following functions.
Transfer of user plane data
Mapping function of QoS flow and data bearer for uplink and downlink
Marking QoS flow ID in both DL and UL packets
Reflective QoS flow to DRB mapping for the UL SDAP PDUs For the SDAP layer device, the terminal may be configured with an RRC message whether to use the header of the SDAP layer device or whether to use the function of the SDAP layer device for each PDCP layer device, for each bearer, or for each logical channel, and when the SDAP header is configured, the NAS QoS reflection configuration 1-bit indicator (NAS reflective QoS) in the SDAP header and the AS QoS reflection configuration 1-bit indicator (AS reflective QoS) can instruct the UE to update or reset the mapping information for the uplink and downlink QoS flow and data bearer. The SDAP header may include QoS flow ID information indicating QoS. The QoS information may be used as data processing priority, scheduling information, etc. to support a smooth service.

The main functions of the NR PDCPs 1430 and 1465 may include some of the following functions.
Header compression and decompression (ROHC only)
Transfer of user data
In-sequence delivery of upper layer PDUs
Out-of-sequence delivery of upper layer PDUs
Order reordering function (PDCP PDU reordering for reception)
Duplicate detection of lower layer SDUs
Retransmission of PDCP SDUs
Encryption and decryption function (Ciphering and deciphering)
Timer-based SDU discard in uplink.

In the above, the reordering function of the NR PDCP device refers to a function of rearranging the PDCP PDUs received from the lower layer in order based on the PDCP sequence number (SN), may include a function of delivering data to an upper layer in the order of reordering, may include a function of immediately delivering data without considering the order and a function of reordering the order to record lost PDCP PDUs, may include a function of reporting the status of the lost PDCP PDUs to the transmitting side, and may include a function of requesting retransmission of the lost PDCP PDUs.

The main functions of the NR RLCs 1435 and 1460 may include some of the following functions.
Data transfer function (Transfer of upper layer PDUs)
In-sequence delivery of upper layer PDUs
Out-of-sequence delivery of upper layer PDUs
ARQ function (Error Correction through ARQ)
Concatenation, segmentation and reassembly of RLC SDUs
Re-segmentation of RLC data PDUs
Reordering of RLC data PDUs
Duplicate detection
Protocol error detection
RLC SDU discard function (RLC SDU discard)
RLC re-establishment In the above, the in-sequence delivery function of the NR RLC device refers to the function of delivering RLC SDUs received from the lower layer to the upper layer in order, may include a function of reassembling and transmitting when one RLC SDU is originally divided into several RLC SDUs and received, may include a function of rearranging received RLC PDUs based on an RLC sequence number (SN) or a PDCP sequence number (SN), may include a function of recording lost RLC PDUs by rearranging the order, may include a function of reporting the status of lost RLC PDUs to the transmitting side, may include a function of requesting retransmission of the lost RLC PDUs, may include a function of transferring only RLC SDUs before the lost RLC SDU to the upper layer in order when there is a lost RLC SDU, may include a function of sequentially delivering all RLC SDUs received before the timer starts to an upper layer if a predetermined timer expires even when there is a lost RLC SDU, or may include a function of sequentially delivering all RLC SDUs received so far to an upper layer if a predetermined timer expires even if there is a lost RLC SDU. In addition, in the above, RLC PDUs may be processed in the order of reception (regardless of the order of serial number and sequence number, in the order of arrival) and delivered to the PDCP device regardless of the order (Out-of-sequence delivery), and in the case of a segment, segments stored in a buffer or to be received in the future may be received, reconstructed into one complete RLC PDU, processed, and delivered to the PDCP device. The NR RLC layer may not include a concatenation function, and the function may be performed by the NR MAC layer or may be replaced with a multiplexing function of the NR MAC layer.

In the above, the out-of-sequence delivery function of the NR RLC device refers to the function of directly delivering RLC SDUs received from the lower layer to the upper layer regardless of the order, may include a function of reassembling and transmitting the original RLC SDU divided into multiple RLC SDUs, or may include a function of storing the RLC SN or PDCP SN of the received RLC PDUs, sorting the order, and recording the lost RLC PDUs.

The NR MACs 1440 and 1455 may be connected to several NR RLC layer devices configured in one terminal, and the main functions of the NR MAC may include some of the following functions.
Mapping between logical channels and transport channels
Multiplexing and demultiplexing function (Multiplexing/demultiplexing of MAC SDUs)
Scheduling information reporting function
HARQ function (Error correction through HARQ)

Priority handling between logical channels of one UE
Priority handling between UEs by means of dynamic scheduling
MBMS service identification
Transport format selection
Padding function The NR PHY layers 1445 and 1450 may perform channel coding and modulation of upper layer data, make the same into OFDM symbols, and transmit the same to the radio channel, or may demodulate the OFDM symbol received through the radio channel, perform channel decoding, and transmits the same to the upper layer.

The detailed structure of the radio protocol structure may vary according to a carrier (or cell) operation method. For example, when a base station transmits data to a terminal based on a single carrier (or cell), the base station and the terminal use a protocol structure having a single structure for each layer, such as 1400. On the other hand, when the base station transmits data to the terminal based on CA (carrier aggregation) using multiple carriers in a single TRP, the base station and the terminal have a single structure up to RLC like 1410, but use the protocol structure for multiplexing the PHY layer through the MAC layer. As another example, when abase station transmits data to a terminal based on DC (dual connectivity) using multiple carriers in multiple TRP, the base station and the terminal have a single structure up to the RLC like 1420, but use a protocol structure for multiplexing the PHY layer through the MAC layer.

Referring to the above-described PUCCH-related descriptions, in Rel-15 NR, PUCCH transmission is focused on transmission toward a single cell or/and a single transmission point or/and a single panel or/and a single beam or/and a single transmission direction. In the following description, for the convenience of description, a cell, a transmission point, a panel, a beam, or/and a transmission direction, etc. that can be distinguished through higher layer/L1 parameters such as TCI state or spatial relation information, or indicators such as cell ID, TRP ID, panel ID are described in a unified manner as a transmission reception point (TRP). Therefore, in actual application, TRP may be appropriately replaced by one of the above terms.

In NR releases 15 and 16, since the PUCCH resource used for PUCCH transmission is 1 and only 1 PUCCH-spatial-RelationInfo can be activated for 1 PUCCH resource, the terminal may maintain the indicated transmission beam when transmitting the PUCCH. When the PUCCH is repeatedly transmitted over several slots or several mini-slots, a transmission beam according to one indicated PUCCH-spatialRelationInfo needs to be maintained throughout the repeated transmission.

Meanwhile, when PUCCH transmission for multiple TRP is supported, the PUCCH may be repeatedly transmitted for each TRP. In this case, the terminal must support configuration for PUCCH transmission to a plurality of TRPs.

For example, a plurality of beam directions may be indicated for transmission to a plurality of TRPs for one PUCCH, or each of a plurality of PUCCHs including the same UCI may be transmitted to a different TRP, and different beam directions for these PUCCHs needs to be indicated. In the disclosure, by providing various methods of configuring PUCCH resources in consideration of the above-described case, transmission delay time of uplink control information is minimized and high reliability is achieved. A detailed PUCCH resource setting method is described in detail in the following embodiments.

Hereinafter, embodiments of the disclosure will be described in detail together with the accompanying drawings. In addition, in describing the disclosure, when it is determined that a detailed description of a related function or configuration may unnecessarily obscure the subject matter of the disclosure, a detailed description thereof will be omitted. In addition, terms to be described later are terms defined in consideration of functions in the disclosure and may vary according to the intention or custom of users or operators. Therefore, the definition should be made based on the contents throughout this specification.

Hereinafter, the base station is a subject that performs resource allocation of the terminal, and may be at least one of a gNode B, gNB, eNode B, Node B, a base station (BS), a radio access unit, abase station controller, or anode on a network. The terminal may include a user equipment (UE), a mobile station (MS), a cellular phone, a smart phone, a computer, or a multimedia system capable of performing a communication function. In addition, an embodiment of the disclosure will be described below using an NR or LTE/LTE-A system as an example, but an embodiment of the disclosure may be applied to other communication systems having a similar technical background or channel type. In addition, the embodiments of the disclosure may be applied to other communication systems through some modifications without significantly departing from the scope of the disclosure, as determined by a person having skilled technical knowledge.

The content of the disclosure is applicable to FDD and TDD systems.

Hereinafter, higher signaling (or higher layer signaling) is a signal transmission method that is transmitted from the base station to the terminal using a downlink data channel of the physical layer or from the terminal to the base station using an uplink data channel of the physical layer, RRC signaling, and may be referred to as PDCP signaling, or a medium access control element (MAC CE).

Hereinafter, in the disclosure, in determining whether to apply the cooperative communication, the PDCCH(s) for allocating the PDSCH to which the cooperative communication is applied has a specific format, or whether the PDCCH(s) for allocating the PDSCH to which the cooperative communication is applied for cooperative communication including a specific indicator that informs, or PDCCH(s) allocating a PDSCH to which cooperative communication is applied is scrambled with a specific RNTI, or assuming the application of cooperative communication in a specific section indicated by a higher layer, etc. It is possible for the terminal to use them. For the convenience of explanation, it will be referred to as the NC-JT case that the terminal receives the PDSCH to which cooperative communication is applied based on conditions similar to the above.

In the following, the determination of the priority between A and B means selecting the one having a higher priority according to a predetermined priority rule and performing the corresponding operation or an operation with a lower priority. It can be mentioned in various ways, such as omitting or dropping.

Although the above examples are described through a plurality of embodiments, these are not independent and one or more embodiments may be applied simultaneously or in combination.

Embodiment 1: DCI Reception for NC-JT

Unlike the conventional system, the 5G wireless communication system can support not only a service requiring a high transmission rate, but also a service having a very short transmission delay and a service requiring a high connection density. In a wireless communication network including a plurality of cells, TRPs, or beams, the coordinated transmission between each cell, TRP, or/and beam is one of the element technologies capable of satisfying various service requirements by increasing the strength of a signal received by the terminal or efficiently controlling interference between cells, TRPs, and/or beams.

Joint transmission (JT) is a representative transmission technology for cooperative communication, and supports one terminal through different cells, TRPs or/and beams through the joint transmission technology to increase the strength of the signal received by the terminal. Meanwhile, since the characteristics of each cell, TRP, or/and the channel between the beam and the terminal may be greatly different, different precoding, MCS, resource allocation, etc. need to be applied to each cell, TRP, or/and the link between the beam and the terminal. In particular, in the case of non-coherent joint transmission (NC-JT) supporting non-coherent precoding between cells, TRPs or/and beams, it is important to configure individual downlink (DL) transmission information for each cell, TRP or/and beam.

Meanwhile, the configuring of individual DL transmission information for each cell, TRP, or/or beam is a major factor that increases the payload required for DL DCI transmission, which may adversely affect the DCI reception performance. Therefore, it is necessary to carefully design a tradeoff between the amount of DCI information and the PDCCH reception performance for JT support.

Figure 15:
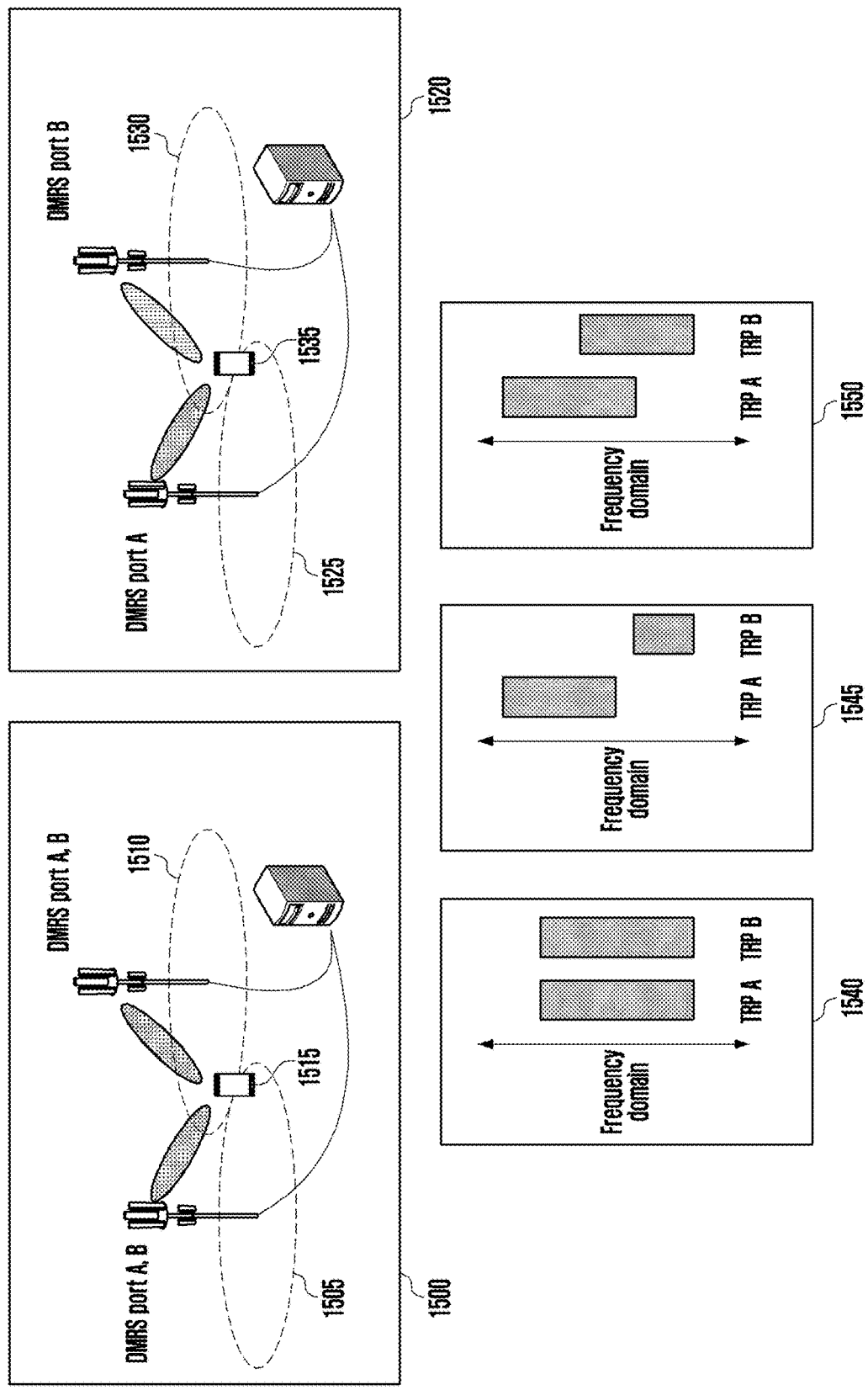
FIG. 15 is a view illustrating an example of an antenna port configuration and resource allocation for cooperative communication in a wireless communication system according to an embodiment.

FIG. 15 is a view illustrating an example of an antenna port configuration and resource allocation for cooperative communication in a wireless communication system according to an embodiment.

Referring to FIG. 15, examples of radio resource allocation for each TRP according to a joint transmission (JT) scheme and conditions are illustrated.

In FIG. 15, 1500 is an example of coherent joint transmission (C-JT) supporting coherent precoding between cells, TRPs, or/and beams.

In C-JT, TRP A 1505 and TRP B 1510 may transmit single data (PDSCH) to the terminal 1515, and multiple TRPs may perform joint precoding. This means that the same DMRS ports (e.g., DMRS ports A and B in both TRPs) are used for the same PDSCH transmission in TRP A 1505 and TRP B 1510. In this case, the terminal may receive one DCI information for receiving one PDSCH demodulated based on the DMRS transmitted through the DMRS ports A and B.

In FIG. 15, 1520 is an example of non-coherent joint transmission (NC-JT) supporting non-coherent precoding between each cell, TRP or/and beam. In the case of NC-JT, a PDSCH is transmitted to the terminal 1535 for each cell, TRP, or/and beam, and individual precoding may be applied to each PDSCH. Each cell, TRP, or/and beam may transmit a different PDSCH to improve throughput compared to single cell, TRP, or/and beam transmission, or each cell, TRP, or/and beam may repeatedly transmit the same PDSCH to improve reliability compared to single cell, TRP, or/and beam transmission.

When all the frequency and time resources used for PDSCH transmission by multiple TRPs are the same (1540), when the frequency and time resources used by multiple TRPs do not overlap at all (1545), and when some of the frequency and time resources used by multiple TRPs overlap (1550), various radio resource allocations may be considered.

In each of the above-described cases, when multiple TRPs repeatedly transmit the same PDSCH to improve reliability, if the receiving terminal does not know whether or not the corresponding PDSCH is repeatedly transmitted, the corresponding terminal cannot perform combining in the physical layer for the corresponding PDSCH, and thus there may be a limit to improving reliability. Therefore, the disclosure provides a repetitive transmission instruction and configuration method for improving NC-JT transmission reliability.

In order to simultaneously allocate a plurality of PDSCHs to one terminal for NC-JT support, DCIs of various types, structures, and relationships may be considered.

Figure 16:
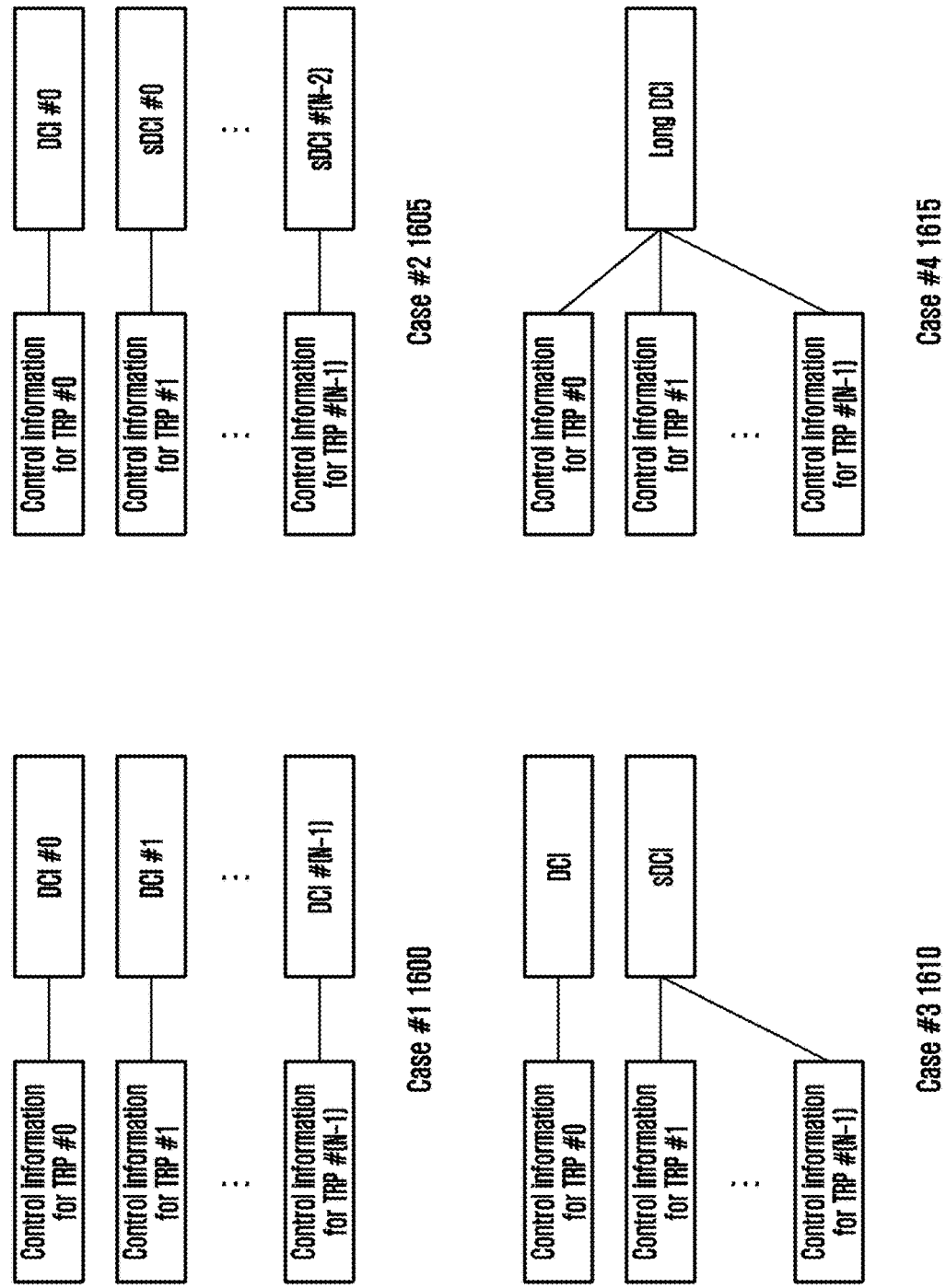
FIG. 16 is a view illustrating an example configuration of downlink control information (DCI) for cooperative communication in a wireless communication system according to an embodiment.

FIG. 16 is a view illustrating an example configuration of downlink control information (DCI) for cooperative communication in a wireless communication system according to an embodiment of the disclosure.

Referring to FIG. 16, various examples of DCI for NC-JT support are illustrated.

Referring to FIG. 16, Case #1 (1600) is an example in which control information for PDSCHs transmitted in (N−1) additional TRPs is transmitted in the same form as control information for PDSCHs transmitted in a serving TRP (same DCI format), in a situation in which different (N−1) PDSCHs are transmitted in (N−1) additional TRPs (TRP #1 to TRP #(N−1)) in addition to serving TRP (TRP #0) used for single PDSCH transmission. That is, the terminal may acquire control information on PDSCHs transmitted in different TRPs (TRP #0 to TRP #(N−1)) through DCI (DCI #0~DCI #(N−1)) having the same DCI format and the same payload. Meanwhile, in this embodiment and an embodiment to be described later, the control information transmitted in the serving TRP may be classified into first DCI, and the DCI transmitted in another TRP (cooperative TRP) may be referred to as second DCI.

In the above-described case #1, the freedom degree for control (allocation) of each PDSCH can be completely guaranteed, but when each DCI is transmitted in a different TRP, a coverage difference for each DCI may occur, and reception performance may deteriorate.

Case #2 (1605) is an example in which control information for PDSCH transmitted in (N−1) additional TRPs is transmitted in a different form (different DCI format or different DCI payload) from control information for PDSCH transmitted in serving TRP, in a situation in which different (N−1) PDSCHs are transmitted in (N−1) additional TRPs (TRP #1 to TRP #(N−1)) in addition to serving TRP (TRP #0) used for single PDSCH transmission For example, in the case of DCI #0, which is control information for the PDSCH transmitted from the serving TRP (TRP #0), all information elements of DCI format 1_0 to DCI format 1_1 are included, but the shortened DCI (hereinafter, sDCI)) (sDCI #0 to sDCI #(N−2)), which is control information for PDSCHs transmitted in cooperative TRP (TRP #1 to TRP #(N−1)) may include only some of the information elements of DCI format 1_0 to DCI format 1_1.

Therefore, in the case of sDCI including control information on PDSCHs transmitted in the cooperative TRP, the payload may be small compared to normal DCI (nDCI) including control information related to PDSCH transmitted in the serving TRP, or may include reserved bits as many as the number of bits less than nDCI.

In case #2 described above, the degree of freedom for controlling (allocation) of each PDSCH may be limited according to the contents of the information element included in the sDCI, or since the reception performance of sDCI is superior to that of nDCI, the probability of occurrence of a coverage difference for each DCI may be lowered.

Case #3 (1610) is an example in which control information for PDSCHs transmitted in (N−1) additional TRPs is transmitted in a different form (different DCI format or different DCI payload) from control information for PDSCHs transmitted in serving TRP, in a situation in which different (N−1) PDSCHs are transmitted in (N−1) additional TRPs (TRP #1 to TRP #(N−1)) other than serving TRP (TRP #0) used when transmitting a single PDSCH.

For example, in the case of DCI #0, which is control information for the PDSCH transmitted in the serving TRP (TRP #0), all information elements of DCI format 1_0 to DCI format 1_1 are included, and in the case of control information for PDSCHs transmitted in cooperative TRP (TRP #1 to TRP #(N−1)), only some of the information elements of DCI format 1_0 to DCI format 1_1 may be included in one 'secondary' DCI (sDCI).

For example, the sDCI may include at least one of HARQ-related information such as frequency domain resource assignment, time domain resource assignment, and MCS of cooperative TRPs. In addition, in the case of information not included in the sDCI such as a bandwidth part (BWP) indicator or a carrier indicator, DCI (DCI #0, normal DCI, nDCI) of serving TRP may be followed.

In case #3, the freedom degree for controlling (allocation) of each PDSCH may be limited according to the contents of the information element included in the sDCI. However, it is possible to adjust the reception performance of sDCI, and the complexity of DCI blind decoding of the terminal may be reduced compared to case #1 or case #2.

Case #4 (1615) is an example in which control information for PDSCHs transmitted in (N−1) additional TRPs is transmitted through a long DCI (LDCI) such as control information for PDSCHs transmitted in a serving TRP. In a situation in which different (N−1) PDSCHs are transmitted in (N−1) additional TRPs (TRP #1 to TRP #(N−1)) in addition to serving TRP (TRP #0) used for single PDSCH transmission. That is, the terminal may obtain control information on PDSCHs transmitted in different TRPs (TRP #0 to TRP #(N−1)) through a single DCI.

In case #4, the complexity of DCI blind decoding of the terminal may not increase, but the degree of freedom of PDSCH control (allocation) may be low, such as the number of cooperative TRPs is limited according to the long DCI payload limitation.

In the following descriptions and embodiments, sDCI may refer to various auxiliary DCIs such as shortened DCI, secondary DCI, or normal DCI (DCI format 1_0 to 1_1 described above) including PDSCH control information transmitted in the cooperative TRP If not specified, the description is similarly applicable to the various auxiliary DCIs. In addition, terms such as the first DCI and the second DCI may be used to classify the DCI according to the form or characteristic of the DCI or the TRP for transmitting the DCI. For example, DCI transmitted through serving TRP may be expressed as a first DCI, DCI transmitted through cooperative TRP may be expressed as a second DCI.

In the following description and embodiments, case #1, case #2, and case #3 in which one or more DCI (PDCCH) is used for NC-JT support are classified into multiple PDCCH-based NC-JTs, and Case #4 in which a single DCI (PDCCH) is used for NC-JT support can be classified as a single PDCCH-based NC-JT.

In the embodiments, "cooperation TRP" may be replaced with various terms such as "cooperation panel" or "cooperation beam" when applied in practice.

In the embodiments, "when NC-JT is applied" may be interpreted in various ways according to the situation such as "when a terminal receives one or more PDSCHs at the same time in one BWP", "when a terminal receives a PDSCH based on two or more transmission configuration indicator (TCI) indications at the same time in one BWP", "when a PDSCH received by a terminal is associated with one or more DMRS port groups", etc., but it is used as an expression for convenience of description.

In the disclosure, the radio protocol structure for NC-JT may be used in various ways according to the TRP deployment scenario. For example, when there is no or small backhaul delay between cooperative TRPs, it is possible to use a structure based on MAC layer multiplexing similar to 1410 of FIG. 14 (CA-like method). On the other hand, when the backhaul delay between cooperative TRPs is so large that the backhaul delay cannot be ignored (e.g., when 2 ms or more is required for information exchange such as CSI, scheduling, HARQ-ACK, etc. between cooperative TRPs), similar to 1420 of FIG. 14, it is possible to secure characteristics robust to delay by using an independent structure for each TRP from the RLC layer (DC-like method).

Embodiment 1-1: Method for Setting a Downlink Control Channel for NC-JT Transmission, Based on Multi-PDCCH In the multiple PDCCH-based NC-JT, when DCI is transmitted for the PDSCH schedule of each TRP, the DCI may be transmitted through a CORESET or search space that is classified for each TRP. CORESET or search space for each TRP can be configured as at least one of the following cases.

Upper layer index configuration for each CORESET: The CORESET setting information set for the higher layer may include an index value, and the TRP that transmits the PDCCH from the corresponding CORESET can be identified as the configured index value for each CORESET. That is, in the set of CORESETs having the same upper layer index value, it may be determined or considered that the same TRP transmits the PDCCH or that the PDCCH scheduling the PDSCH of the same TRP is transmitted.

The above-described index for each CORESET may be named as CORESETPoolIndex, and for CORESETs for which the same CORESETPoolIndex value is configured, it may be determined or considered that the PDCCH is transmitted from the same TRP. In the case of a CORESET in which the CORESETPoolIndex value is not configured, it may be determined or considered that the default value of CORESETPoolIndex is configured, and the default value may be 0.

Multiple PDCCH-Config configuration: Multiple PDCCH-Configs in one BWP may be configured, and each PDCCH-Config may include PDCCH configuration for each TRP. That is, a list of CORESETs for each TRP and/or a list of search spaces for each TRP can be configured in one PDCCH-Config, and one or more CORESETs and one or more search spaces included in one PDCCH-Config may be determined or considered to correspond to a specific TRP.

CORESET beam/beam group configuration: TRP corresponding to the corresponding CORESET may be classified through a beam or beam group set for each CORESET. For example, when the same TCI state is configured for a plurality of CORESETs, the corresponding CORESETs may be considered to be transmitted through the same TRP, or it may be determined or considered that a PDCCH scheduling a PDSCH of the same TRP is transmitted in the corresponding CORESET.

Search space beam/beam group configuration: A beam or beam group may be configured for each search space, and TRP for each search space may be classified through this. For example, when the same beam/beam group or TCI state is configured in multiple search spaces, in the search space, it may be determined or considered that the same TRP transmits a PDCCH, or that a PDCCH scheduling a PDSCH of the same TRP is transmitted in the search space.

By dividing the CORESET or search space for each TRP as described above, it is possible to classify PDSCH and HARQ-ACK information for each TRP, and through this, it is possible to generate an independent HARQ-ACK codebook for each TRP and use an independent PUCCH resource.

Embodiment 2: HARQ-ACK Information Delivery Method for NC-JT Transmission

The following embodiment provides a detailed method of transmitting HARQ-ACK information for NC-JT transmission.

FIGS. 17A, 17B, 17C, and 17D are views illustrating a method of transmitting HARQ-ACK information according to various DCI configurations and PUCCH configurations for NC-JT transmission.

Figure 17A:
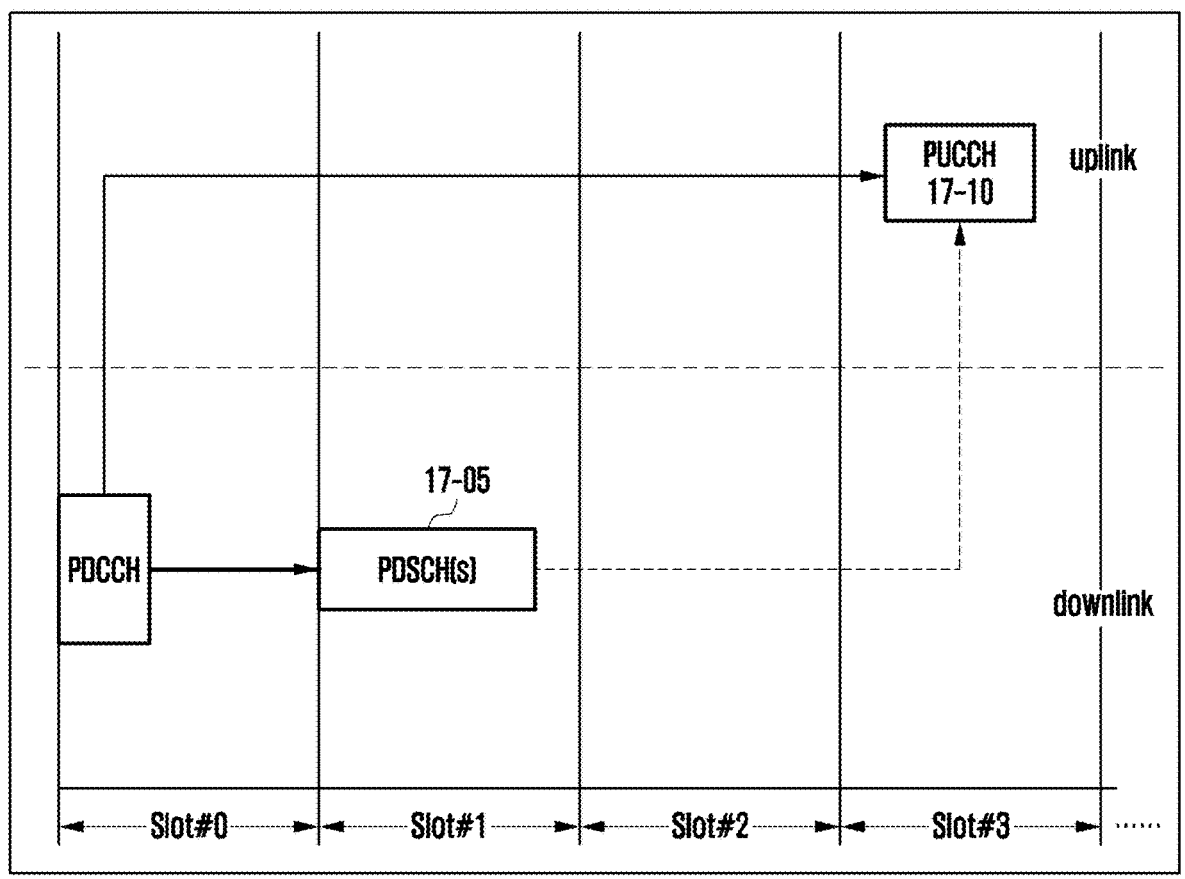
FIG. 17A is a view illustrating a method of transmitting HARQ-ACK information when a single PDCCH is used for NC-JT transmission in a wireless communication system according to an embodiment.

First, FIG. 17A (Option #1: HARQ-ACK for single-PDCCH NC-JT) 17-00 illustrates an example in which HARQ-ACK information for one or more PDSCHs 17-05 scheduled by a TRP is transmitted through one PUCCH resource 17-10 in the case of single-PDCCH-based NC-JT. The PUCCH resource may be indicated through the PRI value and $K_1$ value in the DCI described above.

Figure 17B:
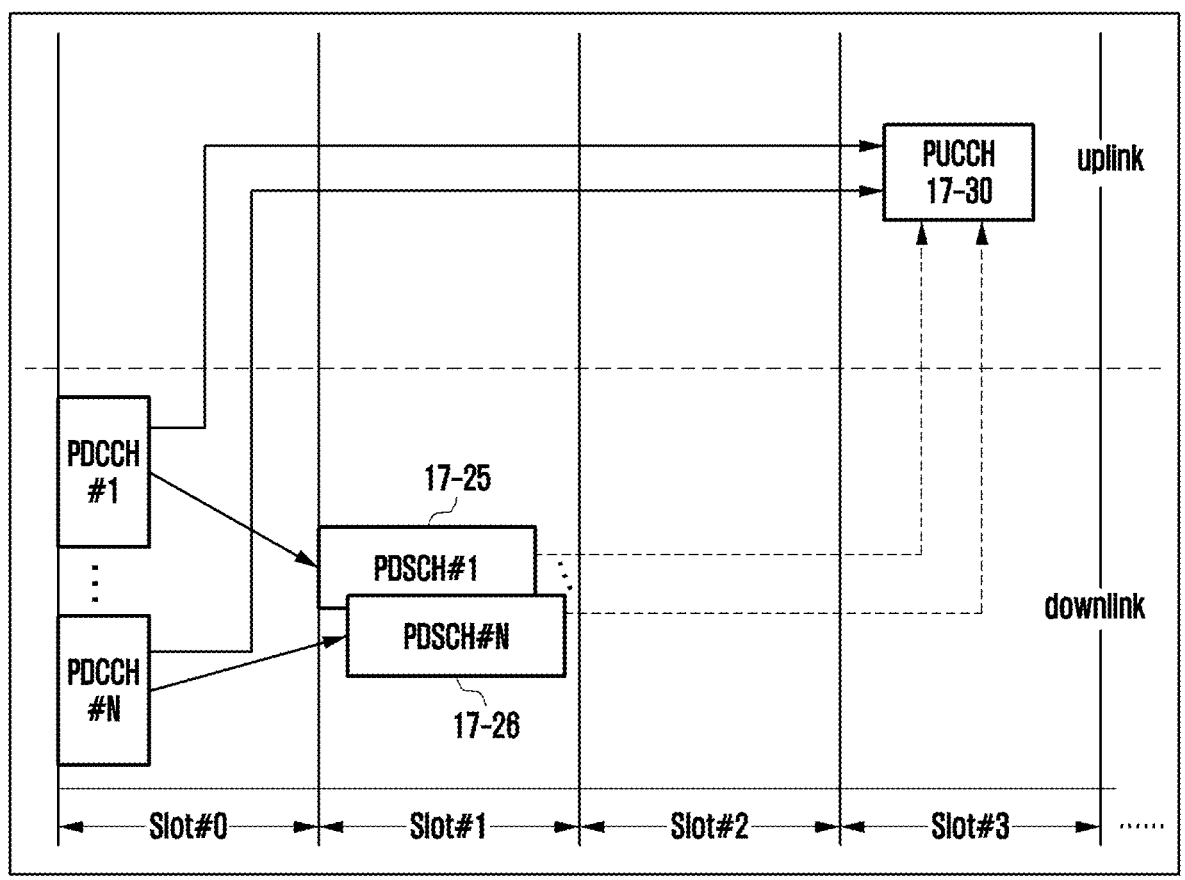
FIG. 17B is a view illustrating a method of transmitting joint HARQ-ACK information when multi-PDCCH is used for NC-JT transmission in a wireless communication system according to an embodiment.
Figure 17C:
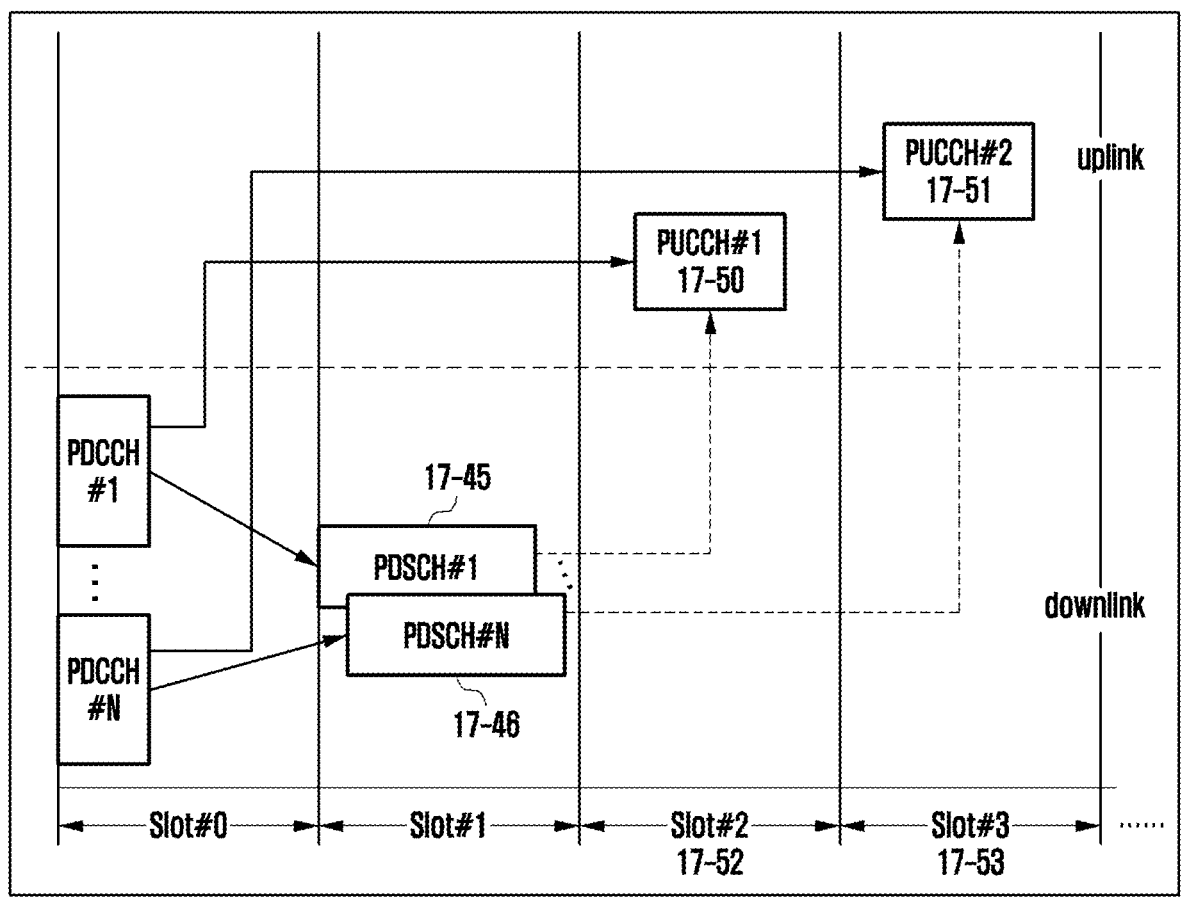
FIG. 17C is a view illustrating a method of transmitting inter-slot time division multiplexed HARQ-ACK information when multi-PDCCH is used for NC-JT transmission in a wireless communication system according to an embodiment.
Figure 17D:
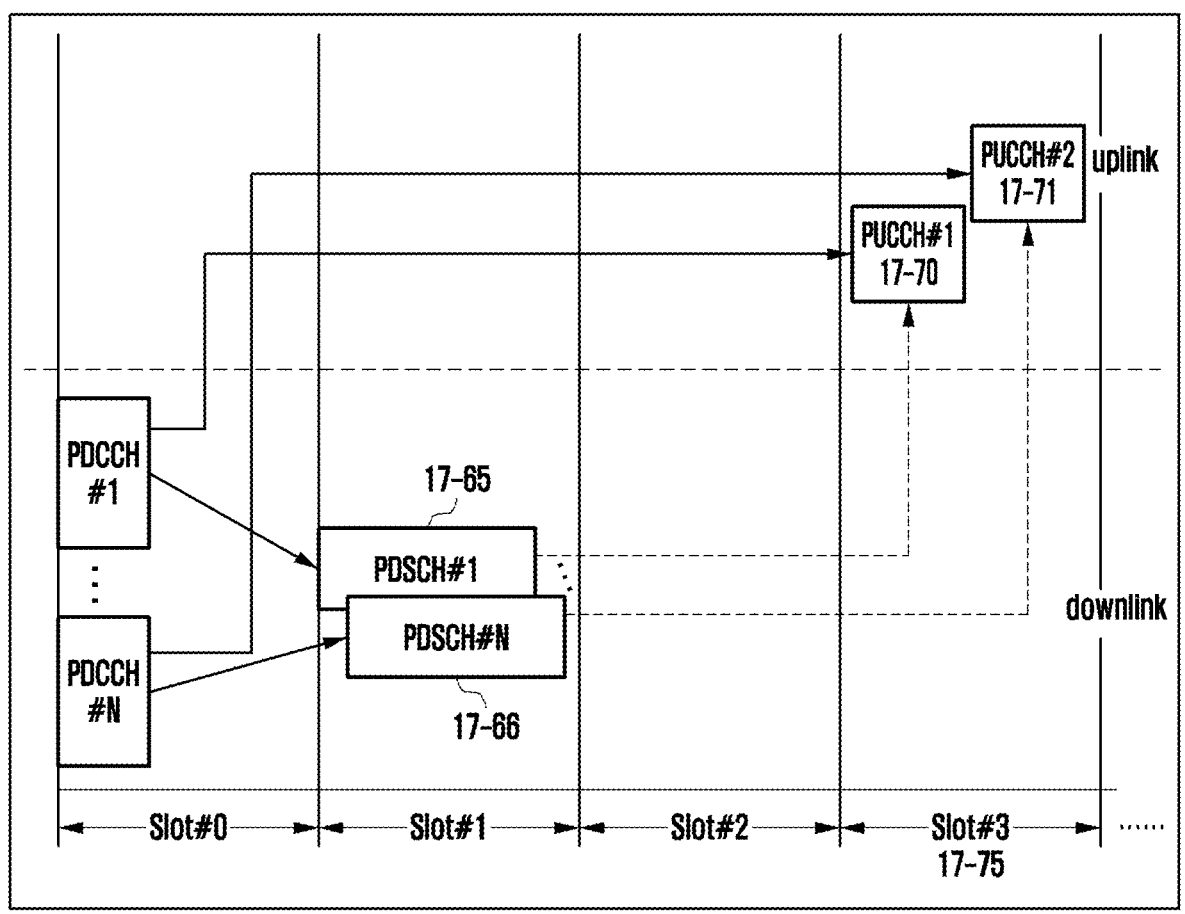
FIG. 17D is a view illustrating a method of transmitting intra-slot time division multiplexed HARQ-ACK information when multi-PDCCH is used for NC-JT transmission in a wireless communication system according to an embodiment.

FIG. 17B (Option #2) to FIG. 17D (Option #4) 17-20, 17-40, 17-60 illustrate the case of multi-PDCCH-based NC-JT. In this case, each option may be classified according to the number of PUCCH resources to transmit HARQ-ACK information corresponding to the PDSCH of each TRP and the position of the PUCCH resource on the time axis.

FIG. 17B (Option #2: joint HARQ-ACK) 17-20 illustrates an example in which the terminal transmits HARQ-ACK information corresponding to the PDSCHs 17-25 and 17-26 of each TRP through one PUCCH resource. In this case, all HARQ-ACK information for each TRP may be generated based on a single HARQ-ACK codebook, or HARQ-ACK information for each TRP may be generated based on a separate HARQ-ACK codebook. In this case, HARQ-ACK information for each TRP is concatenated and may be transmitted in one PUCCH resource.

When an individual HARQ-ACK codebook for each TRP is used, as defined in Example 1-1, the TRP may be classified into at least one of a set of CORESETs having the same upper layer index, a set of CORESETs belonging to the same TCI state or beam or beam group, and a set of search spaces belonging to the same TCI state or beam or beam group.

FIG. 17C (Option #3: inter-slot time-division multiplexed (TDMed) separate HARQ-ACK) 17-40 illustrates an example in which the terminal transmits HARQ-ACK information corresponding to the PDSCH 17-45, 17-46 of each TRP through PUCCH resources 17-50, 17-51 of different slots 17-52, 17-53.

The slot including the PUCCH resource for each TRP may be determined by the $K_1$ value described above. If the $K_1$ value indicated by a plurality of PDCCHs indicates the same slot, all corresponding PDCCHs are considered to be transmitted in the same TRP, and all HARQ-ACK information corresponding to them may be transmitted. In this case, HARQ-ACK information concatenated in one PUCCH resource located in the same slot may be transmitted to the TRP.

FIG. 17D (Option #4: intra-slot TDMed separate HARQ-ACK) 17-60 illustrates an example of transmitting HARQ-ACK information corresponding to the PDSCHs 17-65 and 17-66 of each TRP through different PUCH resources 17-70 and 17-71 in different symbols in the same slot 17-75.

The slot containing the PUCCH resource for each TRP may be determined by the $K_1$ value described above, and if the $K_1$ value indicated by the plurality of PDCCHs indicates the same slot, the terminal may perform PUCCH resource selection and transmission symbol determination through at least one of the following methods.

PUCCH Resource Group Configuration for TRP

A PUCCH resource group for HARQ-ACK transmission for each TRP may be configured. When the TRP for each CORESET or/and search space is classified as in Example 1-1, the PUCCH resource for HARQ-ACK transmission for each TRP may be selected within the PUCCH resource group for the corresponding TRP. TDM may be expected between PUCCH resources selected from different PUCCH resource groups, that is, it may be expected that the selected PUCCH resource does not overlap on a symbol basis (within the same slot). The terminal may generate an individual HARQ-ACK codebook for each TRP and then transmit the same in a PUCCH resource selected for each TRP.

Different PRI Directives for Each TRP

As in Embodiment 1-1, when the CORESET or/and TRP for each search space is classified, the PUCCH resource for each TRP may be selected according to the PRI. That is, the PUCCH resource selection process in Rel-15 described above may be independently performed for each TRP. In this case, the PRIs used to determine the PUCCH resource for each TRP may be different. For example, the terminal may not expect that the PRI used to determine the PUCCH resource for each TRP is indicated with the same value. For example, the PDCCH for TRP 1 may include PRI=n, and the PDCCH for TRP 2 may include PRIs set to PRI=m, respectively.

In addition, TDM may be expected between PUCCH resources indicated by the PRI for each TRP. That is, it may be expected that the selected PUCCH resources do not overlap on a symbol basis (within the same slot). As described above, an individual HARQ-ACK codebook for each TRP may be generated in the PUCCH resource selected for each TRP and then transmitted.

Definition for $K_1$ Value in Subslot Units

The PUCCH resource selection process in Rel-15 described above is followed, but the $K_1$ value may be defined in units of subslots. For example, the terminal may generate a HARQ-ACK codebook for PDSCH/PDCCHs instructed to report HARQ-ACK in the same subslot, and then transmit the same through the PUCCH resource indicated by the PRI. The process of generating the HARQ-ACK codebook and selecting a PUCCH resource may be irrelevant to whether CORESET and/or TRP is classified for each search space.

When the terminal supports NC-JT reception, one of the options may be configured through an upper layer or may be implicitly selected according to a situation. For example, for a terminal supporting multi-PDCCH-based NC-JT, one of Option 2 (joint HARQ-ACK) and Option 3 or 4 (separate HARQ-ACK) may be selected through an upper layer. As another example, depending on whether single-PDCCH-based NC-JT or multi-PDCCH-based NC-JT is supported/ configured, Option 1 for the former and Option 2 or 3 or 4 for the latter may be selected.

As another example, in the multi-PDCCH-based NC-JT, an option to be used may be determined according to the selection of a PUCCH resource. When PUCCH resources of the same slot correspond to different TRPs, if the corresponding PUCCH resources are different and do not overlap in symbol units, HARQ-ACK may be transmitted according to Option 4, and if the corresponding PUCCH resources overlap on a symbol basis or the allocated symbols are the same, HARQ-ACK may be transmitted according to Option 2. In the case of selecting PUCCH resources of different slots in different TRPs, HARQ-ACK may be transmitted according to Option 3.

The configuration for the options may be dependent on the terminal capability. For example, the base station may receive the capability of the terminal according to the above-described procedure, and the option may be configured based on this. For example, Option 4 configuration is allowed only for a terminal having a capability supporting intra-slot TDMed separate HARQ-ACK, and a terminal not equipped with the corresponding capability may not expect configuration according to Option 4.

Figure 17E:
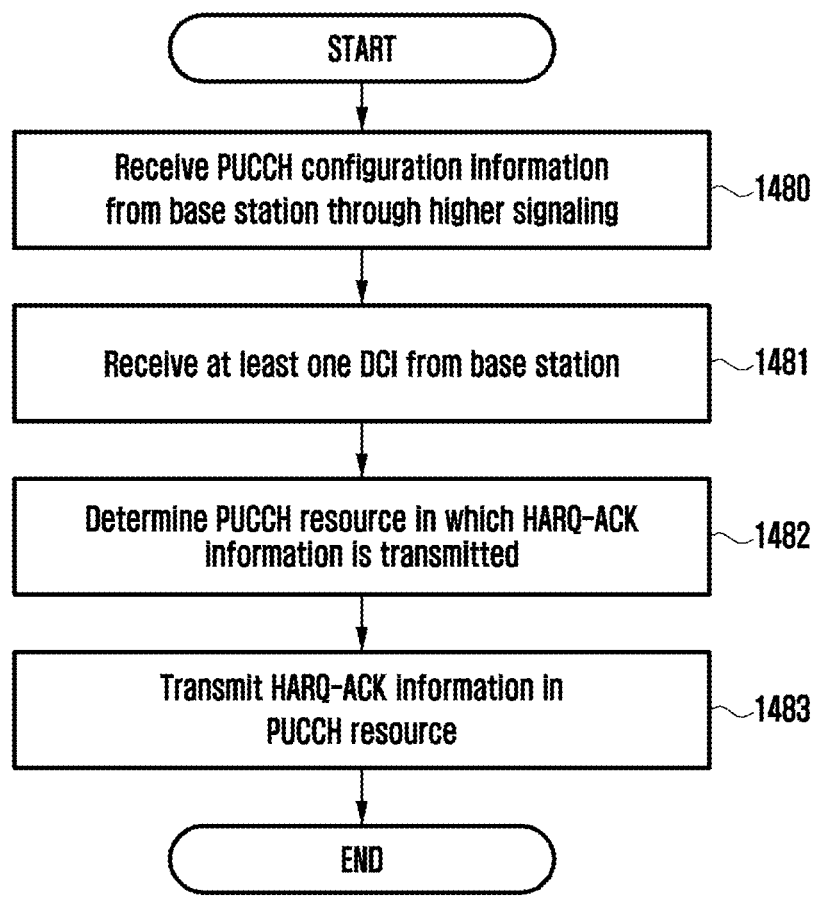
FIG. 17E is a view illustrating an example of a method for a terminal to transmit HARQ-ACK information for NC-JT transmission to a base station in a wireless communication system according to an embodiment.

FIG. 17E is a view illustrating an example of a method for a terminal to transmit HARQ-ACK information for NC-JT transmission to a base station.

Referring to FIG. 17E, (although not illustrated) the terminal may transmit the capability for the described options to the base station, and the base station may explicitly configure which option is applied to the terminal, based on the capability information transmitted by the terminal, or a specific option may be implicitly applied.

The terminal may receive PUCCH configuration information from the base station through higher-level signaling, step 1480. The PUCCH configuration information may include at least one of Table 21, Table 22, Table 29, and Table 30, and at least one of information for setting a PUCCH group, information for configuring a relationship between a PRI and a PUCCH resource as shown in Table 26, or information for setting a candidate for a $K_1$ value as shown in Table 21 may be included.

Thereafter, the terminal may receive the DCI for scheduling downlink data from the base station on the PDCCH (this can be mixed with PDCCH reception) (step 1481), and HARQ-ACK to be transmitted according to the method described above, based on the applied option, and may check at least one of a HARQ-ACK payload to be transmitted according to the above-described method, a PDSCH-to-HARQ feedback timing indicator included in the DCI, or a PRI to transmit HARQ-ACK, based on an applied option to determine a PUCCH resource to transmit HARQ-ACK (step 1482).

Thereafter, the terminal may transmit HARQ-ACK information in the determined PUCCH resource (step 1483).

Not all steps of the above-described method need to be performed, and specific steps may be omitted or the order may be changed.

Figure 17F:
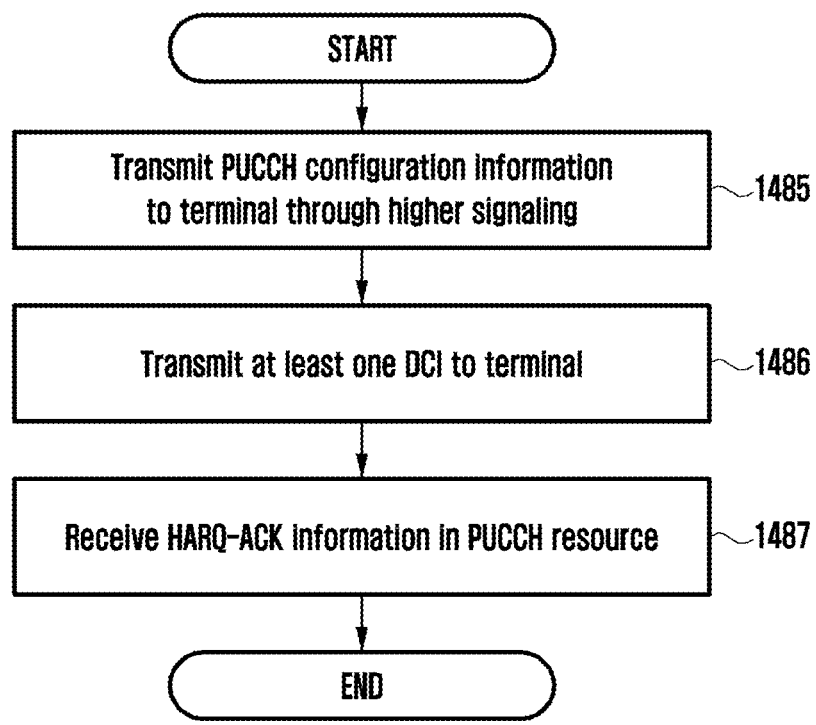
FIG. 17F is a view illustrating an example of a method for a base station to receive HARQ-ACK information for NC-JT transmission from a terminal in a wireless communication system according to an embodiment.

FIG. 17F is a view illustrating an example of a method for a base station to receive HARQ-ACK information for NC-JT transmission from a terminal.

Referring to FIG. 17F, (although not illustrated) the base station may receive the terminal capability for the described option transmitted by the terminal, and may explicitly configure which option is applied to the terminal based on the capability information transmitted by the terminal or implicitly apply a specific option.

The base station may transmit PUCCH configuration information to the terminal through higher-level signaling (step 1485). The PUCCH configuration information may include at least one of Table 21, Table 22, Table 29, and Table 30, and at least one of information for setting a PUCCH group, information for setting a relationship between a PRI and a PUCCH resource in Table 26, or information for setting a candidate for a $K_1$ value in Table 21 may be included.

Thereafter, the base station transmits the DCI for scheduling downlink data to the terminal on the PDCCH (this may be mixed with PDCCH transmission) (step 1486), and the terminal checks at least one of a HARQ-ACK payload to be transmitted according to the above-described method, a PDSCH-to-HARQ feedback timing indicator included in the DCI, or a PRI to transmit HARQ-ACK, based on an applied option to determine a PUCCH resource to transmit HARQ-ACK.

Thereafter, the terminal transmits HARQ-ACK information from the determined PUCCH resource, and the base station may receive HARQ-ACK information from the PUCCH resource determined in the same way (step 1487).

Not all steps of the above-described method need to be performed, and specific steps may be omitted or the order may be changed.

Embodiment 3: Resource Configuration for PUCCH Transmission to Multiple TRPs

For PUCCH transmission to multiple TRPs, PUCCH resources may be configured in at least one of the following methods. Meanwhile, transmission of PUCCH resources may mean transmission of PUCCH or transmission of UCI through PUCCH.

1) Repetitive PUCCH transmission through a single PUCCH resource: PUCCH is repeatedly transmitted according to a predetermined repetition transmission unit through a single PUCCH resource, and the PUCCH transmission beam or/and transmission power may be changed for each repetitive transmission or in some repetitive transmissions among all repetitive transmissions.
2) PUCCH transmission through multiple PUCCH resources: A plurality of different PUCCHs, including the same control information, are transmitted through different TRPs, and the plurality of PUCCHs may not overlap each other. In addition, different transmission beams or/and transmission powers may be applied to the plurality of PUCCHs.

Detailed embodiments of each of the above-described resource configuration methods are described below.

Embodiment 3-1: Resource Configuration for Repeatedly Transmitting PUCCH to Multiple TRPs on a Single PUCCH Resource When a PUCCH is repeatedly transmitted to multiple TRPs on a single PUCCH resource, there may be the following differences from the case of repeatedly transmitting a PUCCH to a single TRP on a single PUCCH resource.

Whether Short PUCCH Repeat Transmission is Required:

When repeatedly transmitting PUCCH on a single PUCCH resource with a single TRP, only a long PUCCH is used, and repeated transmission of short PUCCH is not supported. The reason is that repetitive transmission is for coverage enhancement, but the short PUCCH is not designed for coverage enhancement.

On the other hand, one purpose of performing repetitive PUCCH transmission to multiple TRPs may be overcome with blocking, and using short PUCCH may overcome blockage with less delay compared to using long PUCCH. Therefore, a short PUCCH may be used for repetitive PUCCH transmission to multiple TRPs.

Whether Scheduling is Required that Reflects Transient Time Between Repeated Transmissions:

In the case of performing repeated short PUCCH transmission to multiple TRPs, a change in beam and transmission power may occur between repeated transmissions. When changing the transmission power for the short PUCCH, a guard time or offset between short PUCCH transmissions may be required to satisfy the above-described transient time. Therefore, when performing repeated short PUCCH transmission to multiple TRPs, repeated transmission reflecting the offset is required.

Figure 18A:
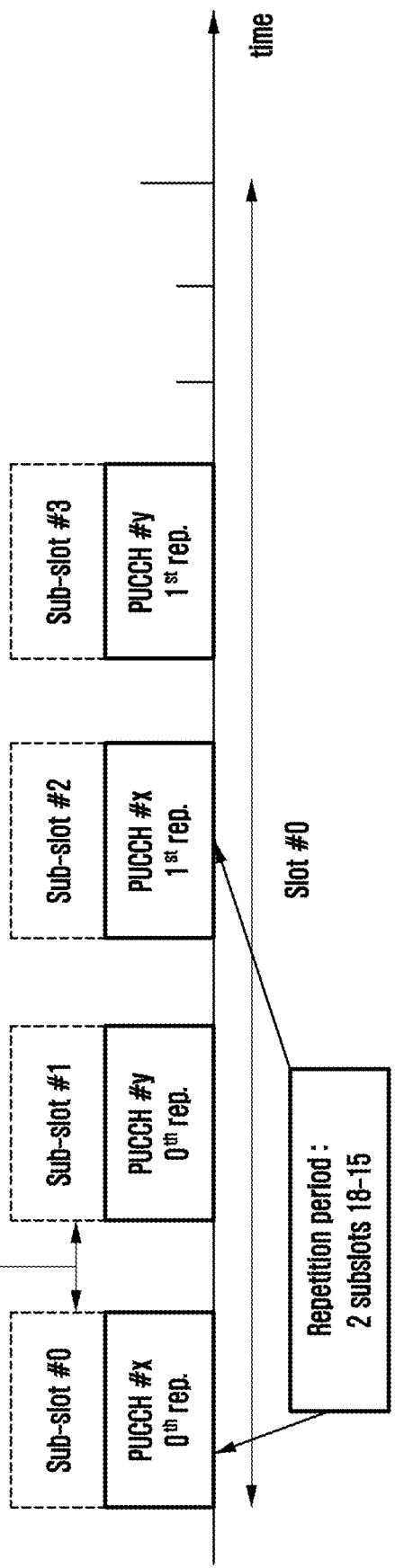
FIG. 18A is a view illustrating repetitive PUCCH transmission in sub-slot units in a wireless communication system according to an embodiment.

First, repetitive transmission of short PUCCH may be performed in a sub-slot unit. FIG. 18A is a view illustrating repetitive short PUCCH transmission in sub-slot units.

The length of the sub-slot may be equal to or longer than the length of the repeatedly transmitted short PUCCH, and the length of the sub-slot may vary depending on time.

FIG. 18A illustrates an example in which all sub-slots have the same length as 2 (18-05). The offset between the short PUCCHs may be configured through PUCCH resource scheduling of the base station, such as configuring the start symbol position in the sub-slot of the short PUCCH and the length of the short PUCCH. However, if the length of the sub-slot is the same as the length of the short PUCCH and the offset cannot be configured due to PUCCH resource scheduling, a method of configuring the offset between repeated short PUCCH transmissions may be necessary. The offset may be configured in a sub-slot unit or a symbol unit.

FIG. 18A illustrates an example in which the offset is configured as 1 symbol (18-10). The offset may be configured between repeated transmissions of each short PUCCH. Alternatively, when the transmission power change does not occur during repeated transmission of the short PUCCH, an offset is not required, and thus an offset may be configured only between repeated transmissions in which transmission power change occurs.

The above-described 'between repetitive transmissions in which transmission power change occurs' may be replaced with an expression such as 'between repetitive transmissions in which beam change occurs' and 'between repetitive transmissions in which spatialRelationInfo is different'.

Although the above description has been described for the sake of convenience of technology for repeated short PUCCH transmission, the above description may be similarly applied to the long PUCCH.

Meanwhile, in consideration of a case in which PUCCH is repeatedly transmitted by alternately using a plurality of PUCCH resources, PUCCH repetitive transmission may not occur for each adjacent sub-slot, but may be repeated for each sub-slot of a predetermined period. FIG. 18A illustrates an example in which the above-described repetitive transmission period is configured to 2 sub-slot. A preset offset may be reflected in the repetitive transmission period (18-15).

Figure 18B:
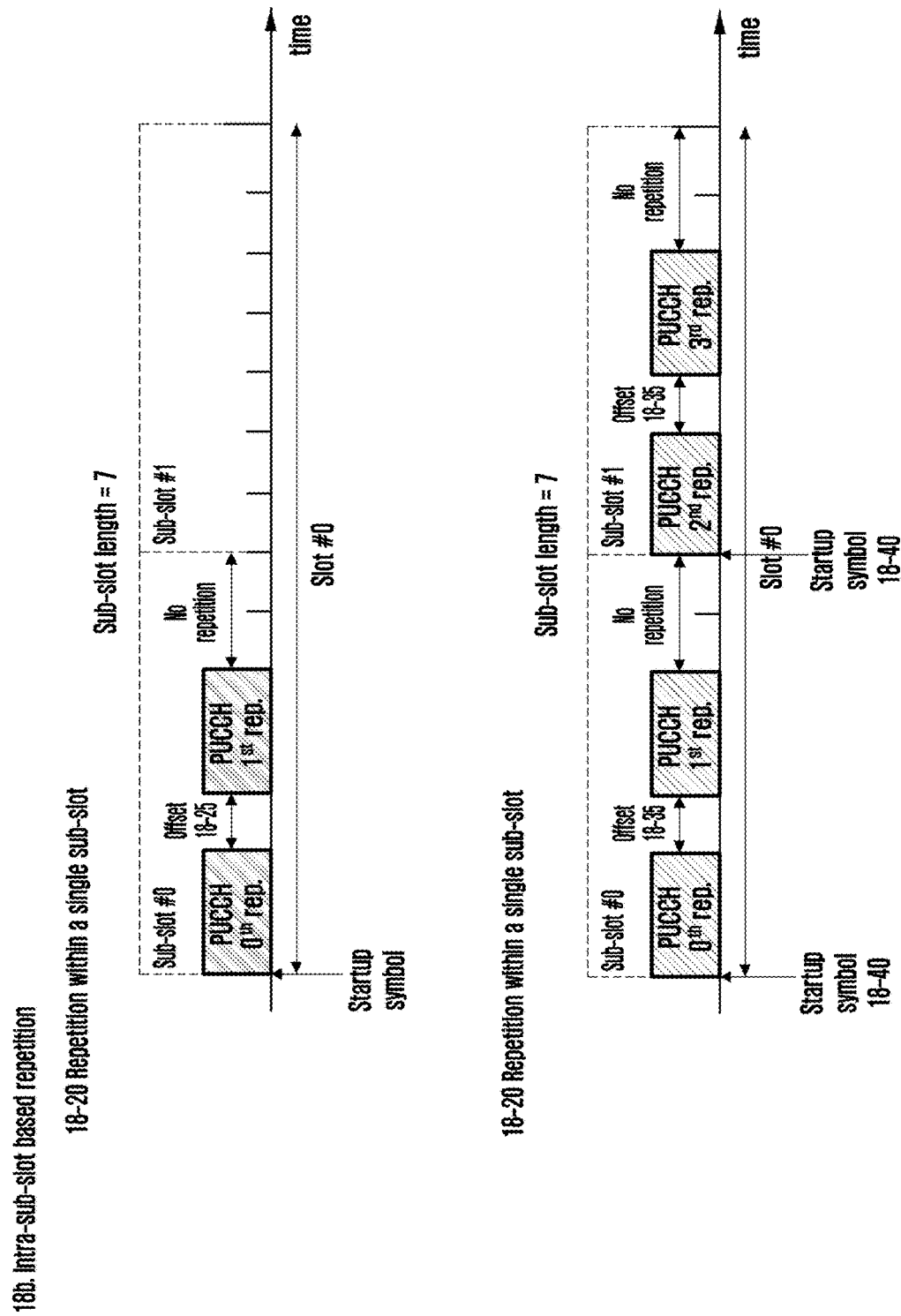
FIG. 18B is a view illustrating repetitive PUCCH transmission in a slot or sub-slot in a wireless communication system according to an embodiment.

Next, repeated transmission of the short PUCCH may be performed in a slot or sub-slot. FIG. 18B is a view illustrating repetitive short PUCCH transmission in a slot or sub-slot.

The aforementioned short PUCCH repetitive transmission may be performed within one slot or sub-slot (18-20), or may be performed over a plurality of slots or sub-slots (18-30). If the repetitive transmission is performed in one slot or sub-slot (18-20), an offset between repetitive transmissions may be configured (18-25). The offset may be configured in units of symbols. The offset may be configured between repeated transmissions of each short PUCCH. Alternatively, when the transmission power change does not occur during repeated transmission of the short PUCCH, an offset is not required, and thus an offset may be configured only between repeated transmissions in which transmission power change occurs.

The 'between repetitive transmissions in which transmission power change occurs' may be replaced with an expression such as 'between repetitive transmissions in which beam change occurs' and 'between repetitive transmissions in which spatialRelationInfo is different'.

Alternatively, depending on the length of the repeatedly transmitted PUCCH, the configuration and/or the presence or absence of an offset may vary. For example, an offset may be configured or applied only when transmitting a short PUCCH repeatedly, and an offset may not be applied when transmitting repeatedly a long PUCCH. This may be because whether a guard time between transmissions in which the transmission power change occurs is required is different depending on the length of the transmitted PUCCH.

If repetitive transmission is performed over a plurality of slots or sub-slots (18-30), an offset between repeated transmissions may be configured (18-35). The offset can be applied only between repeated transmissions within one slot or sub-slot. In this case, an offset between repeated transmissions between different slots or sub-slots may be given through configuring a start symbol of the short PUCCH (18-40). That is, the start symbol configuring of the short PUCCH may be applied to repeated transmission of the first short PUCCH of every slot or sub-slot.

Alternatively, the offset may be applied between repetitive transmissions between different slots or sub-slots. In this case, the start symbol configured for the short PUCCH may be applied only to the first short PUCCH transmission among all the short PUCCH repetitive transmissions. The above-described offset may be configured between repeated transmissions of each short PUCCH. Alternatively, when the transmission power change does not occur during repetitive transmission of the short PUCCH, an offset is not required, and thus an offset may be configured only between repeated transmissions in which transmission power change occurs.

The 'between repetitive transmissions in which transmission power change occurs' may be replaced with an expression such as 'between repetitive transmissions in which beam change occurs' and 'between repetitive transmissions in which spatialRelationInfo is different'. Alternatively, whether an offset is configured and/or applied may vary according to the length of the repeatedly transmitted PUCCH. For example, an offset may be configured or applied only when transmitting a short PUCCH repeatedly, and an offset may not be applied when transmitting repeatedly a long PUCCH. The reason may be that whether a guard time between transmissions in which the transmission power change occurs is required is different depending on the length of the transmitted PUCCH.

Although the above description has been described for the sake of convenience of technology for repeated short PUCCH transmission, the above description may be similarly applied to the long PUCCH.

Figure 18C:
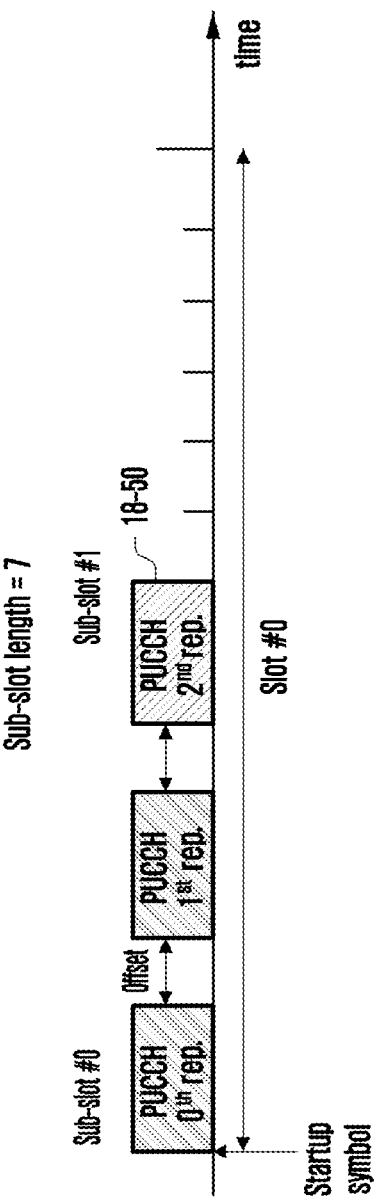
FIG. 18C is another view illustrating repetitive PUCCH transmission in a slot or sub-slot in a wireless communication system according to an embodiment.

FIG. 18C is another view illustrating the repetitive PUCCH transmission in a slot or sub-slot according to an embodiment.

Referring to FIG. 18C, when the repetitive transmission of PUCCH is performed within a slot or sub-slot, some PUCCHs among all repetitive transmissions may span a boundary of a slot or sub-slot (18-50). As a treatment method for this case, at least one of the following methods may be included.

Method 1. The terminal may drop a symbol crossing a slot or sub-slot boundary in the repetitive transmission PUCCH. In this case, the configured number of repetitive transmissions and the actual number of repetitive transmissions are the same.

Method 2. The terminal may regard a symbol over a slot or a sub-slot boundary in the repetitive transmission as a new repetitive transmission. In this case, the actual number of the repetitive transmissions may be greater than the configured number of repetitive transmissions.

Method 3. The terminal may drop repetitive transmission over a slot or a boundary of a sub-slot in the repetitive transmission PUCCH. In this case, the actual number of repetitive transmissions may be smaller than the configured number of repetitive transmissions.

Method 4. The terminal may shift the repetitive transmission, that is, the repetitive transmission over a slot or a boundary of a sub-slot to the next slot or sub-slot. The position of the symbol for transmitting the PUCCH through shifting may be the first symbol of the next slot or sub-slot, or a position set as the PUCCH start symbol.

Method 5. The base station may schedule so that there is no repetitive transmission PUCCH, that is the repetitive transmission over a slot or a boundary of a sub-slot. In the repeated transmission PUCCH, scheduling is performed. In this case, the terminal may not expect repetitive transmission across the boundary of a slot or sub-slot. The above-described methods may be similarly applied even when one or more DL symbols exist in a slot or sub-slot, and repeated transmission PUCCH overlaps the DL symbols.

Among the methods, according to Method 1 and Method 2, the lengths of repeatedly transmitted PUCCHs may not be the same. In this case, soft combining between PUCCHs having different lengths may not be performed. Therefore, at least one of the following constraints or PUCCH encoding may need to be changed.

Constraints: The length should be the same between repetitive transmission PUCCHs for the same target TRP, and the length may be different between repetitive transmission PUCCHs for different target TRPs. The reason is that, in the case of repetitive transmissions for different target TRPs, soft combining of PUCCHs received from different TRPs may be difficult due to restrictions on backhaul capacity between TRPs. Therefore, it is not necessary to support soft combining between different TRPs. On the other hand, in the case of repetitive transmission for the same target TRP, although soft combining is possible, if not supported, unnecessary performance degradation may occur.

PUCCH encoding change: When encoding PUCCH according to the length of UCI, Reed-Muller code may be used if the length of UCI is 11 bits or less, and Polar code may be used if the length of UCI exceeds the same. In the case of using the Polar code, if E is the total number of transmittable bits according to the amount of resources allocated to the PUCCH, different encoding methods may be applied according to E for each repeatedly transmitted PUCCH. Therefore, in the case of using the Polar code, it is assumed that the E values of all repeated transmission PUCCHs are the same, and then encoded, and then adaptively transmitted according to the actual resource amount for each repeated transmission PUCCH. For example, if the actual resource amount of the repeatedly transmitted PUSCH is smaller than the E value, a part of the encoded code according to the E value may be dropped (puncturing). Alternatively, if the actual resource amount of the repeatedly transmitted PUCCH is larger than the value E, a part of the encoded code may be repetition according to the actual resource amount. At least one of the following may be included as a criterion for determining the above-described E value.

Reference 1: PUCCH corresponding to a specific order among the repetitive transmission PUCCHs. For example, the first PUCCH.

Reference 2: PUCCH with the largest amount of resources among the repetitive transmission PUCCHs.

Reference 3: PUCCH with the least amount of resources among the repetitive transmission PUCCHs.

Reference 4: Average value for each resource amount by the repetitive transmission PUCCH.

Reference 5: PUCCH transmitted to a specific TRP among the repetitive transmission PUCCHs. For example, PUCCH corresponding to the first beam.

For the repetitive PUCCH transmission, the number of TRPs may be smaller than the number of repeated transmissions. In this case, a mapping rule for which TRP each repetitive transmission is transmitted is required. As an example, a transmission pattern for each TRP may be periodically configured.

Figure 19:
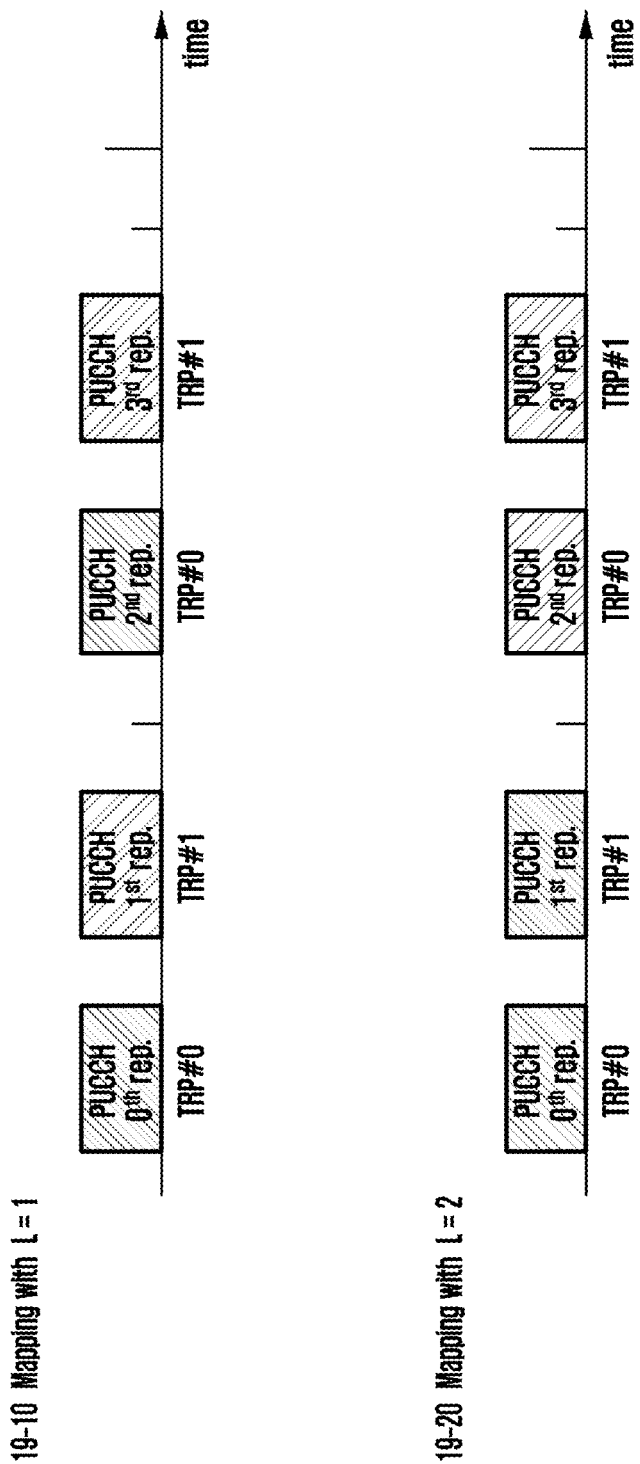
FIG. 19 is a view illustrating an example of a mapping rule between repetitive PUCCH transmission and transmission and reception point (TRP) according to some embodiments.

FIG. 19 is a view illustrating an example of a mapping rule between repetitive PUCCH transmission and transmission and reception point (TRP) according to an embodiment of the disclosure.

Referring to FIG. 19, FIG. 19 illustrates a transmission pattern for each TRP when the total number of repetitive transmissions is N and the number of receptions TRPs is K. Each TRP is allocated to L consecutive repeated transmissions in a round-robin manner. The L value may be configured to one of 1, 2, . . . , $$\lfloor N/K \rfloor, \left\lfloor \frac{N}{K} + 1 \right\rfloor$$

(19-10, 19-20). When the L value is small, TRP switching becomes more frequent, so there is an advantage in that the probability of early termination increases, but there is a disadvantage that more overhead for TRP switching is required. As another example, a transmission pattern for each TRP for all repetitive transmissions may be indicated. For example, when two receiving TRPs are designated for 4 repetitive transmissions and they are named TRP #1 and TRP #2, the pattern for repetitive transmission may be indicated as {TRP #1, TRP #1, TRP #1, TRP #2}.

Embodiment 3-2: Resource Configuration for PUCCH Transmission to Multiple TRPs on Multiple PUCCH Resources The UCI may be transmitted to different TRPs on each of the plurality of PUCCH resources by containing the same UCI on a plurality of PUCCH resources. In this case, different beams may be configured for each of the plurality of PUCCH resources, and when repetitive transmission is configured for PUCCH resources, the entire repetitive transmission may be transmitted to the same TRP. The terminal should determine whether a specific UCI is transmitted on a plurality of PUCCH resources or is transmitted on a single PUCCH resource as in the prior art, and for this, at least one of the following methods may be used.

- Explicit PUCCH set configuration: PUCCH resources for transmitting the same UCI may be grouped into one PUCCH set. The PUCCH set may be explicitly configured, and each PUCCH set may have a different ID. The base station may indicate to the terminal that the UCI is transmitted on a plurality of PUCCH resources by indicating a PUCCH set ID for UCI transmission or a plurality of PUCCH resource IDs belonging to a PUCCH set. Alternatively, by indicating one PUCCH resource ID to the terminal, it may indicate that the UCI is transmitted on one PUCCH resource. Alternatively, a PUCCH set is also defined in a PUCCH resource indicator such as PRI, and it is possible to determine whether to use a plurality of PUCCH resources, based on a PRI value. For example, a specific PRI value may indicate the PUCCH set, while another PRI value may be configured to indicate one PUCCH resource.
- Implicit PUCCH set configuration: When the PUCCH resource group for each TRP is configured, a PUCCH resource is selected according to a specific rule for each group, and PUCCH resources selected for all groups may be determined as a PUCCH set. As an example of the rule, PUCCH resources having the same PUCCH resource ID within a group may be configured as a PUCCH set. In this case, the terminal may determine whether to use a plurality of PUCCH resources according to whether there is one or more PUCCH resources corresponding to the PUCCH resource ID.

A constraint condition for the PUCCH set may be configured. For example, if repetitive transmission for PUCCH resources in the PUCCH set is not set, all PUCCH resources in the PUCCH set may be transmitted in the same slot or sub-slot, at this time, the overlap on the time axis between the PUCCH resources in the PUCCH set may not be allowed. As another example, a maximum value of the maximum number of PUCCH resources in the PUCCH set may be limited. As an example, the maximum value of the number of PUCCH resources may be 2.

Embodiment 4: Terminal Capability for Transmission to Multiple TRPs

Independent terminal capability may be required for each option related to PUCCH transmission to multiple TRPs described above. For example, some of the terminals may not support repeated short PUCCH transmission. Accordingly, the terminal reports whether to support short PUCCH repetition transmission to the base station through the capability report, and the base station may configure short PUCCH repetition only to the terminal supporting short PUCCH repetition transmission after receiving the terminal capability report.

Meanwhile, even if the terminal supports repetitive short PUCCH transmission, the minimum offset value between repetitions that can be supported for each terminal may be different. Accordingly, the terminal may report a minimum offset value between repetitions that can be supported during repeated short PUCCH transmission to the base station through the capability report in a symbol, slot, sub-slot, or absolute time unit.

The base station may schedule the PUCCH with reference to the minimum supportable offset of the terminal after reporting the terminal capability. The minimum offset may be reported with regard to not only an offset between short PUCCH repeated transmissions, but also an offset between short PUCCH-long PUCCH repetitive transmissions, and an offset between long PUCCH-long PUCCH repetitive transmissions.

Meanwhile, the minimum offset may not be an offset applied to all PUCCH repetitive transmissions. For reasons such as guaranteeing the above-described transition time, the minimum offset may be a value applied only between repetitive PUCCH transmissions accompanied by a beam/transmission power change. For the convenience of description, the above description is described only for the repeated transmission of the same PUCCH of the embodiment 3-1, but it is similarly applicable to the transmission of multiple PUCCH resources of the embodiment 3-2.

In addition, the maximum number of repeatedly transmitted PUCCHs in a slot or sub-slot may also be different for each terminal. Accordingly, the terminal may report the maximum number of repeatedly transmitted PUCCHs to the base station through the capability report. Meanwhile, the length of the sub-slot supported by the terminal may also differ for each terminal, and the length of the repeatedly transmitted sub-slot may be reported to the base station through the capability report. In addition, it is possible to report the combination of the above capabilities to the base station. For example, the maximum number of PUCCHs repeatedly transmitted in a slot for each length of a sub-slot may be reported to the base station through capability reporting. For the convenience of description, the above description is described only for the repeated transmission of the same PUCCH of the embodiment 3-1, but it is similarly applicable to the transmission of multiple PUCCH resources of the embodiment 3-2.

Figure 20:
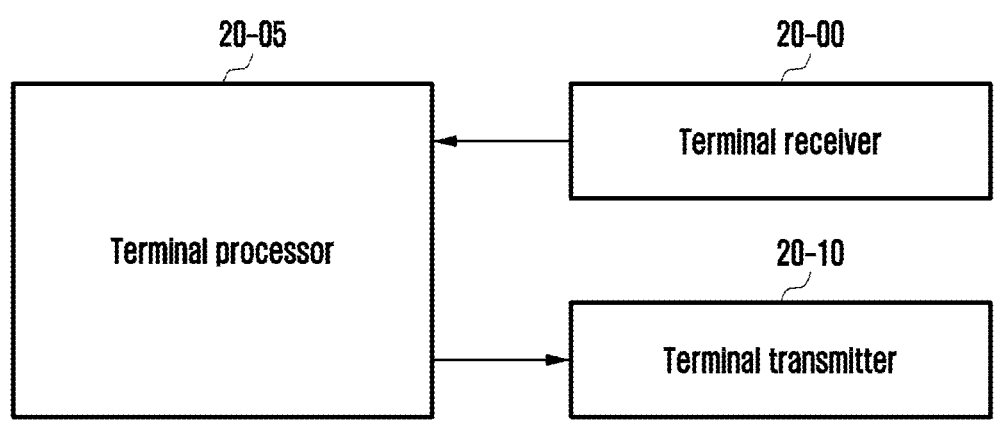
FIG. 20 illustrates a structure of a terminal in a wireless communication system according to an embodiment.

FIG. 20 is a view illustrating a structure of a terminal in a wireless communication system according to an embodiment.

Referring to FIG. 20, the terminal may include a transceiver 20-00, a memory 20-05, and a processor 20-10. The transceiver 20-00 and the processor 20-10 of the terminal may operate according to the above-described communication method of the base station. However, the components of the terminal are not limited to the above-described example. For example, the terminal may include more or fewer components than the above-described components. In addition, the transceiver 20-00, the memory 20-05, and the processor 20-10 may be implemented in the form of a single chip.

The transceiver 20-00 may transmit and receive signals with the base station. Here, the signal may include control information and data. To this end, the transceiver 20-00 may include an RF transmitter that up-converts and amplifies a frequency of a transmitted signal, and an RF receiver that amplifies a received signal with low noise and down-converts a frequency. However, this is only an embodiment of the transceiver 20-00, and components of the transceiver 20-00 are not limited to the RF transmitter and the RF receiver.

In addition, the transceiver 20-00 may receive a signal through a wireless channel, output a signal to the processor 20-10, and transmit a signal output from the processor 20-10 through the wireless channel.

The memory 20-05 may store programs and data necessary for the operation of the terminal. In addition, memory 20-05 may store control information or data included in signals transmitted and received by the terminal. The memory 20-05 may be composed of storage media such as ROM, RAM, hard disk, CD-ROM, and DVD, or a combination of storage media. Also, there may be a plurality of memories 20-05.

In addition, the processor 20-10 may control a series of processes so that the terminal can operate according to the above-described embodiment. For example, the processor 20-10 may control the components of the terminal to receive a DCI composed of two layers and simultaneously receive a plurality of PDSCHs. There may be a plurality of processors 20-10, and the processor 20-10 may perform a component control operation of the terminal by executing a program stored in the memory 20-05.

Figure 21:
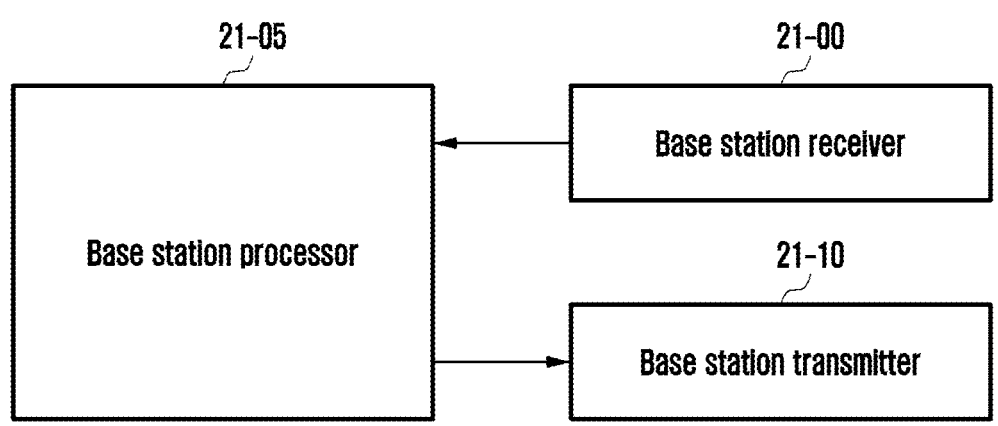
FIG. 21 illustrates a structure of a base station in a wireless communication system according to an embodiment.

FIG. 21 is a view illustrating a structure of a base station in a wireless communication system according to an embodiment.

Referring to FIG. 21, the base station may include a transceiver 21-00, a memory 21-05, and a processor 21-10. The transceiver 21-00 and the processor 21-10 of the base station may operate according to the above-described communication method of the base station. However, the components of the base station are not limited to the above-described example. For example, the base station may include more or fewer components than the above-described components. In addition, the transceiver 21-00, the memory 21-05, and the processor 21-10 may be implemented in the form of a single chip.

The transceiver 21-00 may transmit and receive signals to and from the terminal. Here, the signal may include control information and data. To this end, the transceiver 21-00 may include an RF transmitter that up-converts and amplifies a frequency of a transmitted signal, and an RF receiver that amplifies a received signal with low noise and down-converts a frequency. However, this is only an embodiment of the transceiver 21-00, and components of the transceiver 21-00 are not limited to the RF transmitter and the RF receiver.

In addition, the transceiver 21-00 may receive a signal through a wireless channel, output a signal to the processor 21-10, and transmit a signal output from the processor 21-10 through the wireless channel.

The memory 21-05 may store programs and data required for operation of the base station. In addition, the memory 21-05 may store control information or data included in signals transmitted and received by the base station. The memory 21-05 may be formed of a storage medium such as ROM, RAM, hard disk, CD-ROM, and DVD, or a combination of storage media. Also, there may be a plurality of memories 21-05.

The processor 21-10 may control a series of processes so that the base station can operate according to the above-described embodiment. For example, the processor 21-10 may control each component of the base station to configure and transmit DCIs of two layers including allocation information for a plurality of PDSCHs. There may be a plurality of processors 21-10, and the processors 21-10 may perform component control operations of the base station by executing a program stored in the memory 21-05.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. For example, the embodiments of the disclosure may be partially combined to operate a base station and a terminal. As an example, the methods proposed in the disclosure may be partially combined to operate a base station and a terminal. Further, although the above embodiments have been described by way of the FDD LTE system, other variants based on the technical idea of the embodiments may be implemented in other systems such as TDD LTE, 5G and NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a communication system, the method comprising:
receiving, from a base station, a physical uplink control channel (PUCCH) configuration and a physical downlink shared channel (PDSCH) configuration, the PUCCH configuration including information on a number of slots and information on a length of a subslot;
receiving, from the base station, downlink control information (DCI) including resource allocation information;
receiving, from the base station, data based on the PDSCH configuration and the resource allocation information; and
performing repetition of PUCCH transmission for the data over N slots including a number of symbols indicated by the length of the subslot based on the PUCCH configuration, wherein N indicates the number of slots,
wherein the repetition of the PUCCH transmission is performed based on alternating between multiple transmission and reception points (TRPs) per L repetitions of the PUCCH transmission, and
wherein an offset between the repetition of the PUCCH transmission is identified based on the PUCCH configuration.

2. The method of claim 1, wherein a value of L is 1 or 2, and
wherein the PUCCH includes hybrid automatic repeat request acknowledge (HARQ ACK) information.

3. The method of claim 1, wherein the length of the subslot is one of 2 or 7 symbols.

4. The method of claim 1, wherein the PUCCH configuration further includes information on a number of symbols and an index of a start symbol.

5. A method performed by a base station in a communication system, the method comprising:
transmitting, to a terminal, a physical uplink control channel (PUCCH) configuration and a physical downlink shared channel (PDSCH) configuration, the PUCCH configuration including information on a number of slots and information on a length of a subslot;
transmitting, to the terminal, downlink control information (DCI) including resource allocation information;
transmitting, to the terminal, data based on the PDSCH configuration and the resource allocation information; and
receiving, from the terminal, repetition of PUCCH transmission for the data over N slots including a number of symbols indicated by the length of the subslot based on the PUCCH configuration, wherein N indicates the number of slots,
wherein the repetition of the PUCCH transmission is performed based on alternating between multiple transmission and reception points (TRPs) per L repetitions of the PUCCH transmission, and
wherein an offset between the repetition of the PUCCH transmission is identified based on the PUCCH configuration.

6. The method of claim 5, wherein a value of L is 1 or 2, and
wherein the PUCCH includes hybrid automatic repeat request acknowledge (HARQ ACK) information.

7. The method of claim 5, wherein the length of the subslot is one of 2 or 7 symbols.

8. The method of claim 5, wherein the PUCCH configuration further includes information on a number of symbols and an index of a start symbol.

9. A terminal in a communication system, the terminal comprising:
a transceiver; and
a controller coupled to the transceiver and configured to:
receive, from a base station, a physical uplink control channel (PUCCH) configuration and a physical downlink shared channel (PDSCH) configuration, the PUCCH configuration including information on a number of slots and information on a length of a subslot,
receive, from the base station, downlink control information (DCI) including resource allocation information,
receive, from the base station, data based on the PDSCH configuration and the resource allocation information, and
perform repetition of PUCCH transmission for the data over N slots including a number of symbols indicated by the length of the subslot based on the PUCCH configuration, wherein N indicates the number of slots,
wherein the repetition of the PUCCH transmission is performed based on alternating between multiple transmission and reception points (TRPs) per L repetitions of the PUCCH transmission, and
wherein an offset between the repetition of the PUCCH transmission is identified based on the PUCCH configuration.

10. The terminal of claim 9, wherein a value of L is 1 or 2, and
wherein the PUCCH includes hybrid automatic repeat request acknowledge (HARQ ACK) information.

11. The terminal of claim 9, wherein the length of the subslot is one of 2 or 7 symbols.

12. The terminal of claim 9, wherein the PUCCH configuration further includes information on a number of symbols and an index of a start symbol.

13. A base station in a communication system, the base station comprising:
a transceiver; and
a controller coupled to the transceiver and configured to:
transmit, to a terminal, a physical uplink control channel (PUCCH) configuration and a physical downlink shared channel (PDSCH) configuration, the PUCCH configuration including information on a number of slots and information on a length of a subslot,
transmit, to the terminal, downlink control information (DCI) including resource allocation information,
transmit, to the terminal, data based on the PDSCH configuration and the resource allocation information, and
receive, from the terminal, repetition of PUCCH transmission for the data over N slots including a number of symbols indicated by the length of the subslot based on the PUCCH configuration, wherein N indicates the number of slots,
wherein the repetition of the PUCCH transmission is performed based on alternating between multiple transmission and reception points (TRPs) per L repetitions of the PUCCH transmission, and
wherein an offset between the repetition of the PUCCH transmission is identified based on the PUCCH configuration.

14. The base station of claim 13, wherein a value of L is 1 or 2, and
wherein the PUCCH includes hybrid automatic repeat request acknowledge (HARQ ACK) information.

15. The base station of claim 13, wherein the length of the subslot is one of 2 or 7 symbols, and wherein the PUCCH configuration further includes information on a number of symbols and an index of a start symbol.

* * * * *